(12) United States Patent
Honda

(10) Patent No.: US 7,215,815 B2
(45) Date of Patent: May 8, 2007

(54) HANDWRITING INFORMATION PROCESSING APPARATUS, HANDWRITING INFORMATION PROCESSING METHOD, AND STORAGE MEDIUM HAVING PROGRAM STORED THEREIN FOR HANDWRITING INFORMATION PROCESSING

(75) Inventor: Tadashi Honda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 798 days.

(21) Appl. No.: 10/338,831

(22) Filed: Jan. 9, 2003

(65) Prior Publication Data

US 2003/0185444 A1  Oct. 2, 2003

(30) Foreign Application Priority Data

Jan. 10, 2002 (JP) .............................. 2002-002946

(51) Int. Cl.
*G06K 9/00* (2006.01)

(52) U.S. Cl. ...................... 382/187; 382/186; 382/188; 382/189

(58) Field of Classification Search ................ 382/119, 382/186, 187, 188, 189, 313, 314, 315; 345/173, 345/179, 180, 181, 182, 183, 158; 178/18.03
See application file for complete search history.

(56) References Cited

U.S. PATENT DOCUMENTS

| | | | |
|---|---|---|---|
| 5,517,578 A | | 5/1996 | Altman et al. |
| 5,880,743 A | * | 3/1999 | Moran et al. ............... 345/473 |
| 6,356,866 B1 | * | 3/2002 | Pratley et al. .................. 704/9 |
| 6,393,395 B1 | * | 5/2002 | Guha et al. .................. 704/232 |
| 6,600,834 B1 | * | 7/2003 | Su et al. ...................... 382/187 |
| 6,931,153 B2 | * | 8/2005 | Nakao et al. ................ 382/188 |
| 7,039,234 B2 | * | 5/2006 | Geidl et al. ................. 382/187 |
| 2002/0009226 A1 | * | 1/2002 | Nakao et al. ................ 382/177 |
| 2002/0049796 A1 | * | 4/2002 | Dresevic et al. ............ 707/541 |

FOREIGN PATENT DOCUMENTS

| | | |
|---|---|---|
| JP | 8-510854 | 11/1996 |
| JP | 9-46370 | 2/1997 |
| JP | 9-319503 | 12/1997 |

(Continued)

OTHER PUBLICATIONS

U.S. Appl. No. 10/125,493, filed Apr. 19, 2002, unknown.

(Continued)

*Primary Examiner*—Jingge Wu
*Assistant Examiner*—Brian Le
(74) *Attorney, Agent, or Firm*—Oblon, Spivak, McClelland, Maier & Neustadt, P.C.

(57) ABSTRACT

A handwriting information processing apparatus is provided, having: a coordinate input part that detects a handwriting input made by a user and outputs a coordinate value; a processing part that performs predetermined processes based on the above coordinate value output from the coordinate input part; and a display part that displays an output of the processing part. The processing part further includes a coordinate value storing part that stores all of the coordinate values output by the coordinate input part along with stroke information and line information of the handwriting input; and a handwritten character recognition part that recognizes handwritten characters in a batch based on the coordinate values, the stroke information, and the line information stored in the coordinate value storing part.

10 Claims, 44 Drawing Sheets

FOREIGN PATENT DOCUMENTS

| | | |
|---|---|---|
| JP | 11-66238 | 3/1999 |
| JP | 2000-43485 | 2/2000 |
| JP | 2000-76380 | 3/2000 |
| JP | 2000-99223 | 4/2000 |
| JP | 2000-105671 | 4/2000 |
| JP | 2001-14103 | 1/2001 |
| WO | WO 94/28505 | 12/1994 |

OTHER PUBLICATIONS

U.S. Appl. No. 10/338,831, filed Jan. 9, 2003, Honda.

* cited by examiner

FIG.2

| | | | |
|---|---|---|---|
| DISPLAY POSITION | DISPLAY SIZE | | 1414mm × 1061mm (70 INCH, 1768 DIAGONAL) |
| | EFFECTIVE DISPLAY SIZE | | 1410mm × 1057mm (1762 DIAGONAL) |
| | ASPECT RATIO | | 4:3 |
| | DISPLAY PIXELS | | 1024 × 768 DOTS (XGA) |
| | DISPLAY COLORS | | 16.77 MILLION COLORS |
| | SCREEN | | ACRYL (NON-GLARE PROCESSED SCREEN) |
| | VIEWING ANGLE | | HORIZONTAL:160° , VERTICAL:80° |
| | INTENSITY | | 500 CANDELAS |
| IMAGE | INPUT | RGB SIGNAL | 3 CHANNELS (1 CHANNEL IS FOR INTERNAL USE)<br>(1)FRONT: MINI D-SUB15P<br>(2)BACK: MINI D-SUB15P |
| | | VIDEO SIGNAL | 2 CHANNELS (VIDEO 1, VIDEO 2)<br>(1)FRONT: RCA PIN JACK/ S VIDEO (S VIDEO PRIORITY)<br>(2)BACK: RCA PIN JACK/ S VIDEO (S VIDEO PRIORITY) |
| | OUTPUT | RGB SIGNAL | 1 CHANNEL (VIDEO SIGNAL CHANNEL IS NOT OUTPUT)<br>(1)BACK: MINI D-SUB15P |
| SOUND | RGB SIGNAL | | 3 CHANNELS (1 CHANNEL IS FOR INTERNAL USE)<br>(1)FRONT RGB: RCA PIN JACK (L, R)<br>(2)BACK RGB: RCA PIN JACK (L, R) |
| | VIDEO SIGNAL | | 2 CHANNELS<br>(1)FRONT VIDEO: RCA PIN JACK (L, R)<br>(2)BACK VIDEO: RCA PIN JACK (L, R) |
| | OUTPUT | | 2 CHANNELS (OPERATING WITH THE SELECTED IMAGE CHANNEL)<br>(1)INTERNAL SPEAKER:10+10W<br>(2)LINEOUT: RCA PIN JACK (L, R) |
| TOUCH INPUT APPARATUS | METHOD | | OPTICAL THIN FILM SHIELD DETECTION METHOD |
| | INPUT METHOD | | FINGER OR ATTACHED PEN |
| | TOUCH RESOLUTION | | 1.38mm/POINT |
| | SIGNAL INTERFACE | TOUCH SIGNAL | 3 CHANNELS (OPERATING WITH THE SELECTED RGB SIGNAL)<br>(1)FRONT: USB B TYPE/ SERIAL D-SUB9P (USB PRIORITY)<br>(2)BACK: USB B TYPE/ SERIAL D-SUB9P (USB PRIORITY) |
| | | HUB FOR USB SIGNAL | USB HUB OPERATING WITH THE SELECTED RGB SIGNAL CHANNEL<br>FRONT CONNECTOR: A TYPE × 2 |
| | CONTROL SOFTWARE | | RICOH TOUCH PANEL DRIVER (RTD)<br>for windows95/98 (INCLUDED) |
| GENERAL | OUTER DIMENSIONS | | W: 1600mm D: 770mm H: 1860mm (KEYBOARD TABLE NOT INCLUDED) |
| | FRAME DIMENSIONS | | UPPER PORTION:W: 490mm D: 550mm H: 190mm |
| | | | LOWER PORTION:W: 490mm D: 550mm H: 175mm<br>PARTITION BOARD:±52mm・104mm (MOVABLE, DETACHABLE) |
| | KEYBOARD TABLE | | UPPER DIMENSIONS: WIDTH: 590mm LENGTH: 260mm<br>HEIGHT FROM THE FLOOR: 375mm<br>SUSTAINABLE WEIGHT: 3kg (DETACHABLE) |
| | ENDURABLE TEMPERATURE/ HUMIDITY RANGE | | TEMPERATURE: 0-40°C HUMIDITY: 20-80%<br>(ON CONDITION THAT CONDENSATION DOES NOT OCCUR) |
| | ELECTRIC SOURCE VOLTAGE | | 100V(50/60Hz) |
| | ELECTRIC POWER CONSUMPTION | | APPROX. 350W |
| | MASS | | APPROX. 185kg |
| | INCLUDED COMPONENTS (NOT INCLUDING SOFTWARE) | | TOUCH PEN (1), WIRELESS OPERATION REMOTE CONTROL,<br>WIRELESS IMAGE ADJUSTMENT REMOTE CONTROL, GUARANTEE CERTIFICATE,<br>USER MANUAL, CONVERSION ADAPTER, VARIOUS CABLES<br>(ONE OF EACH CRT CABLE, SERIAL I/F CABLE, PC AUDIO CABLE),<br>PARTITION BOARD OF FRAME, HOOK PIN FOR PARTITION BOARD,<br>METAL STOPPER PIECE, KEYBOARD TABLE, CLEANING CLOTH, SPANNER,<br>SERVICE ADJUSTMENT PIN |

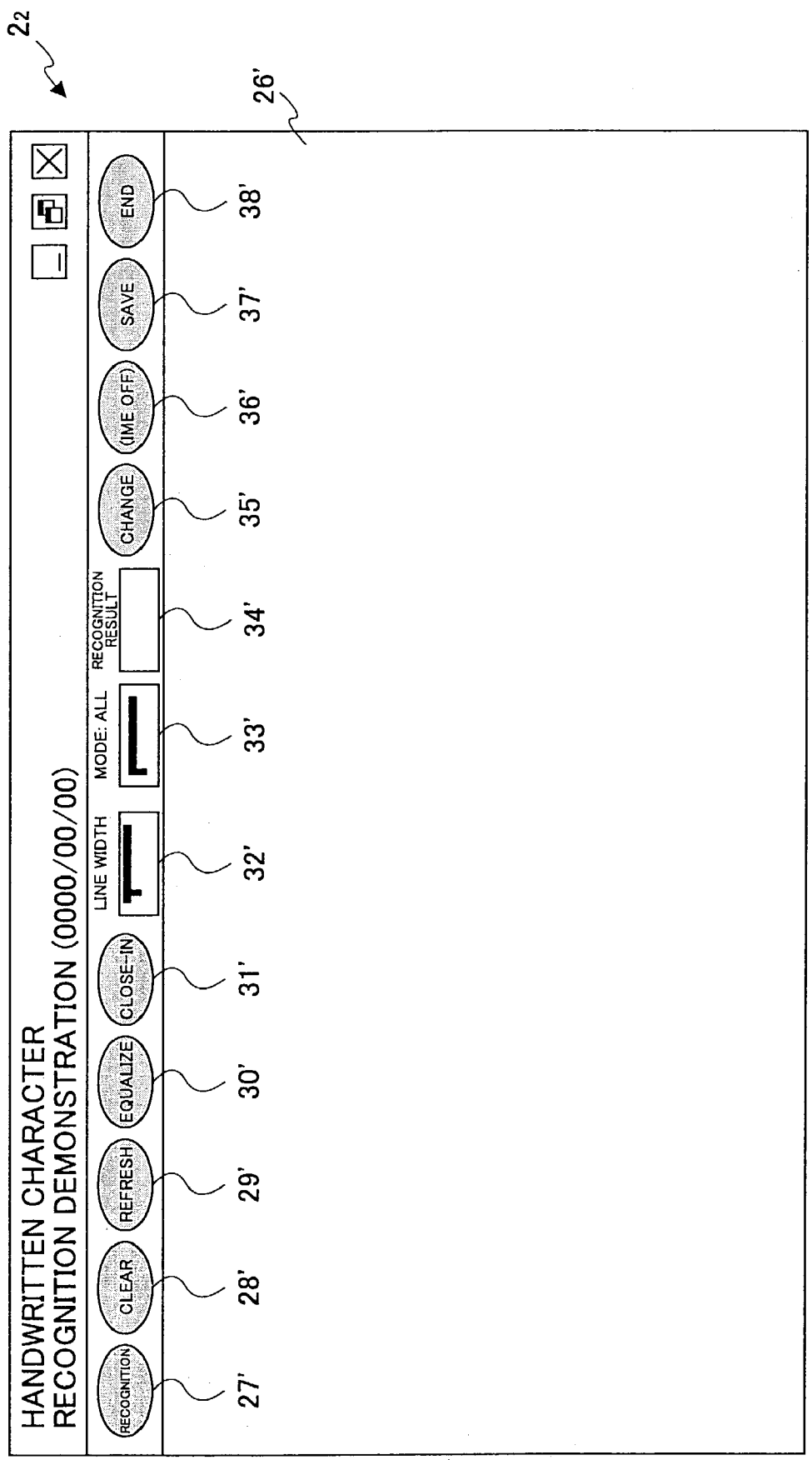

FIG.11
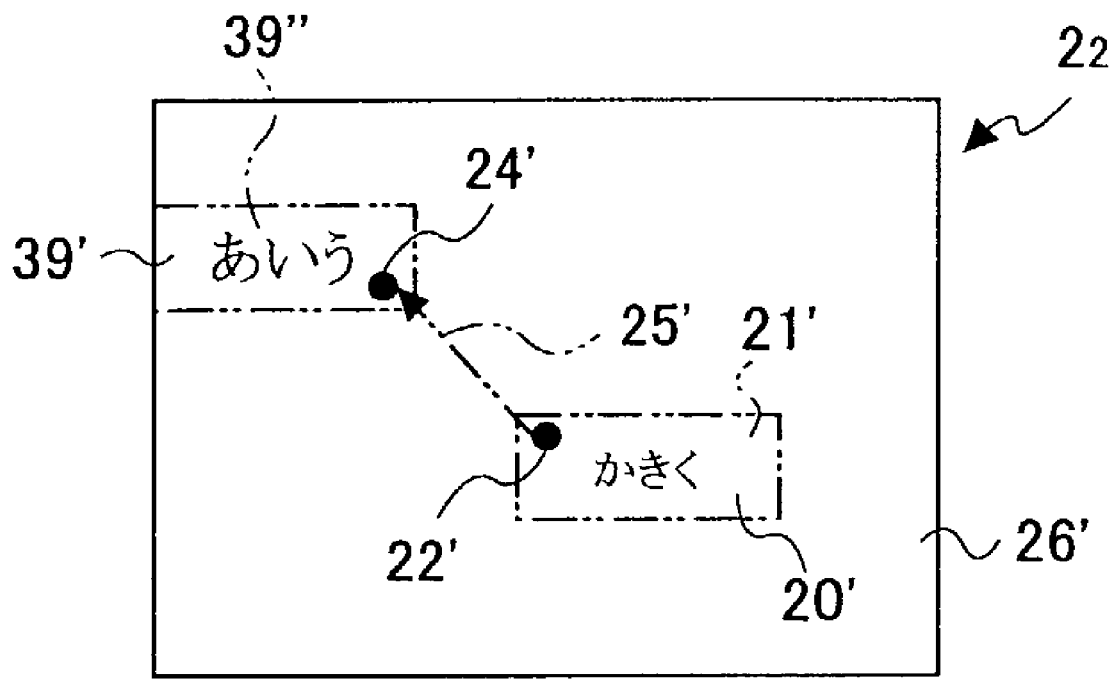
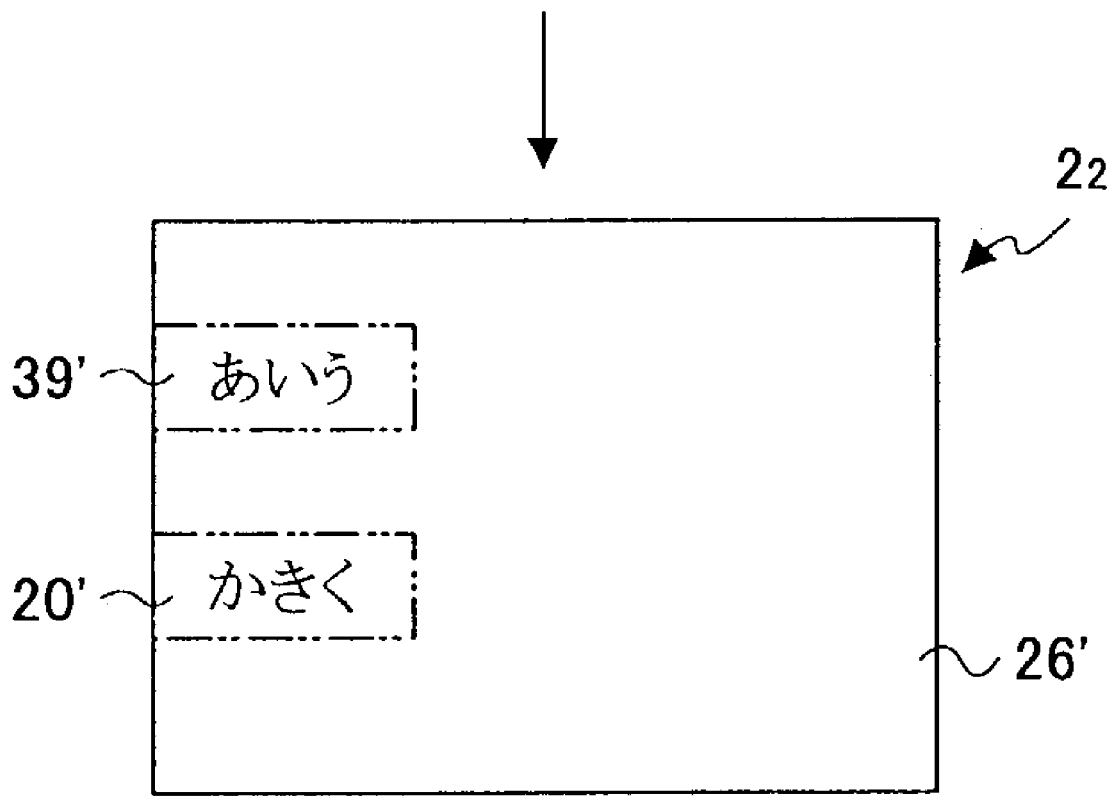

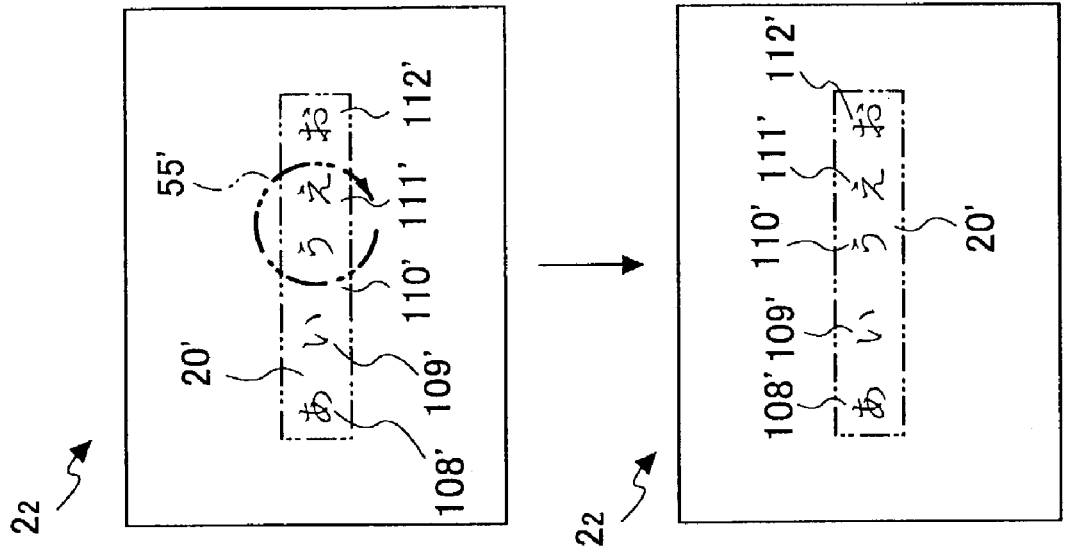
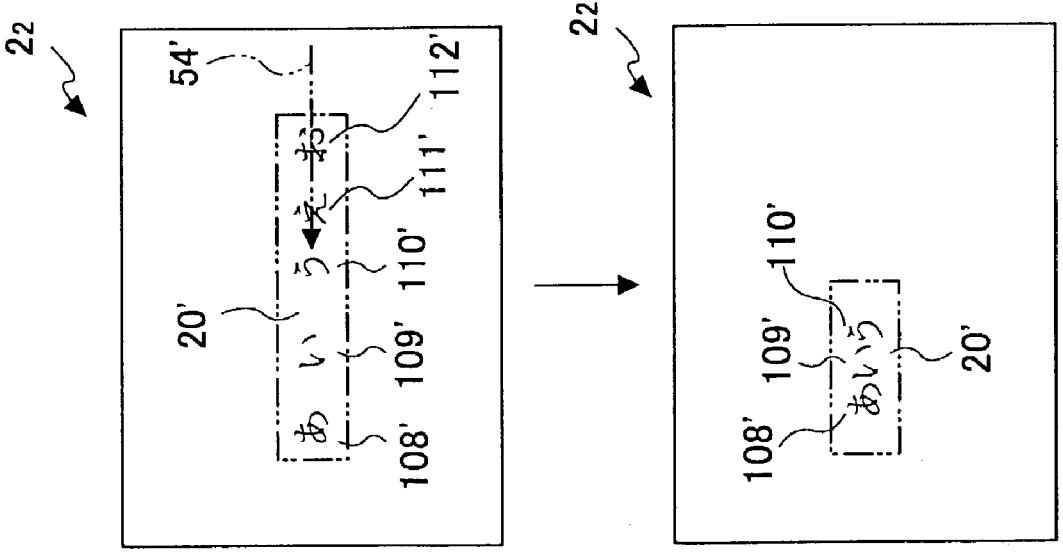

FIG.24
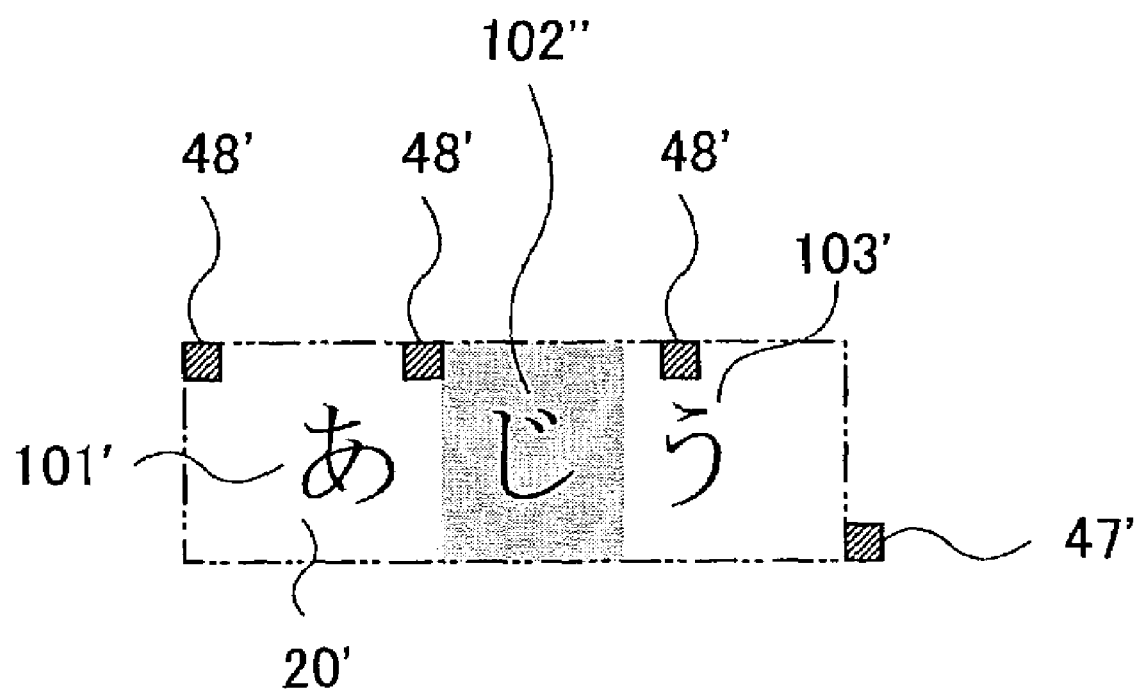
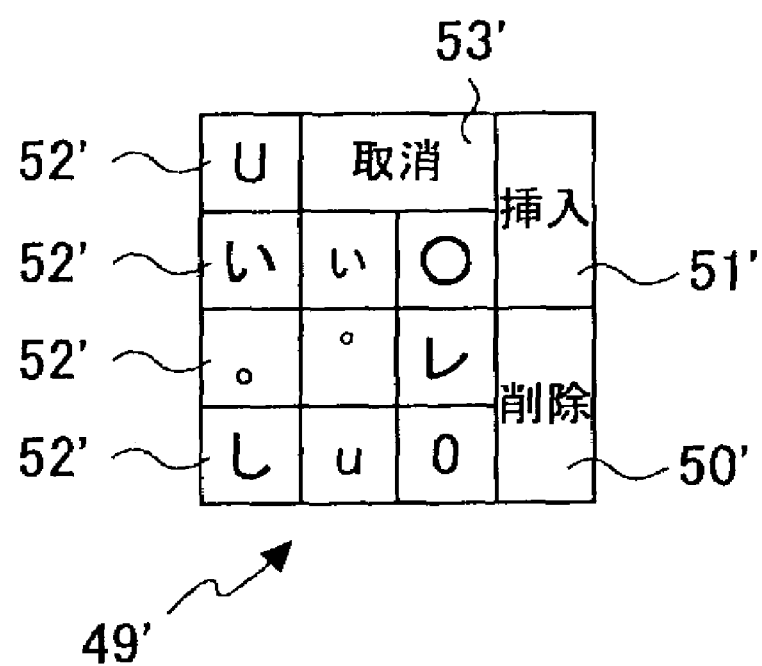

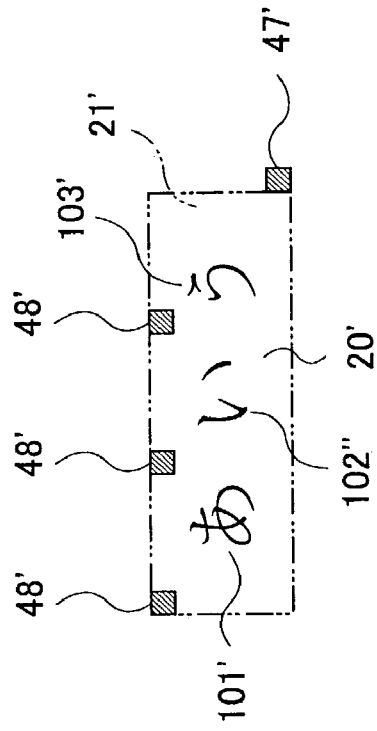
FIG.25A
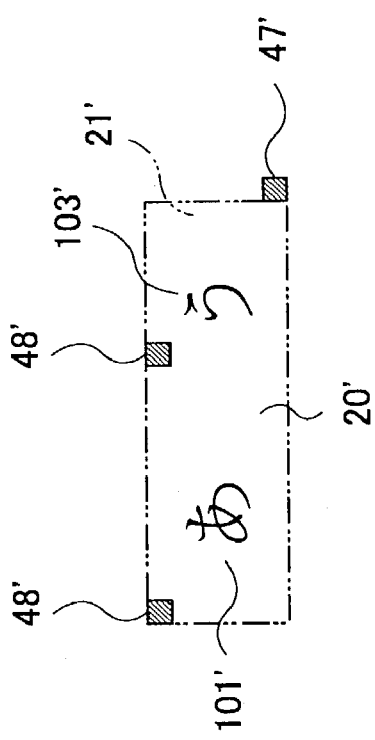
FIG.25C
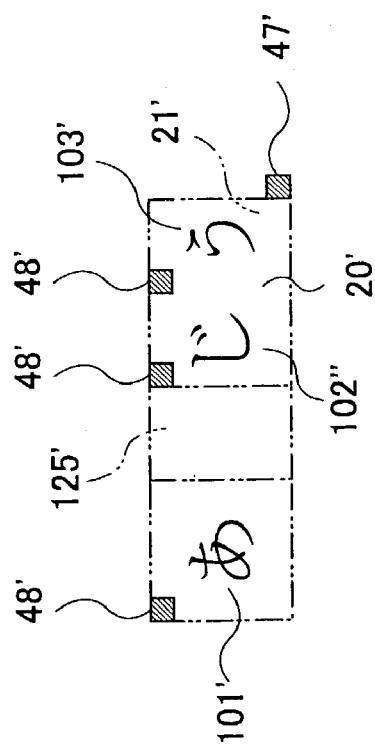
FIG.25B
FIG.25D

FIG.28
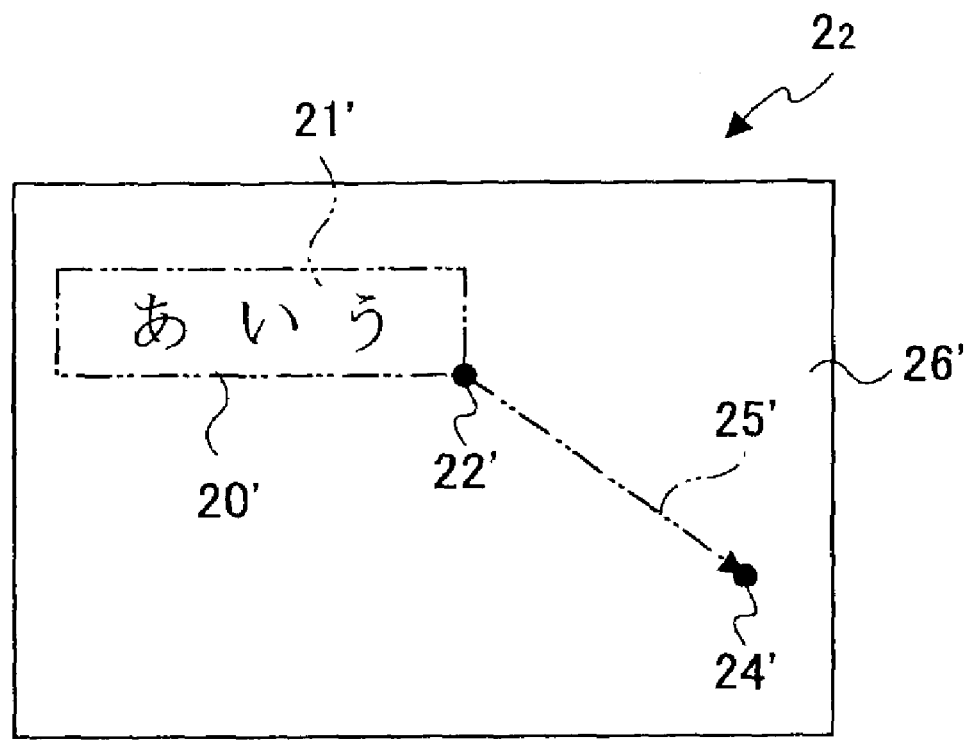
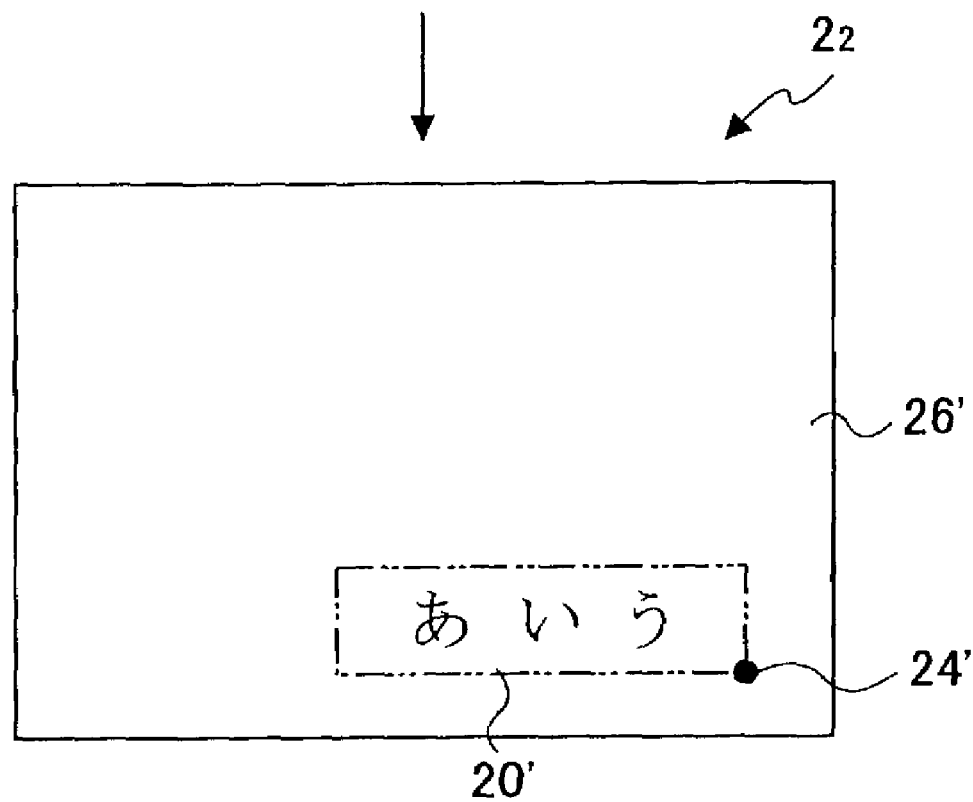

●: COORDINATE POINT

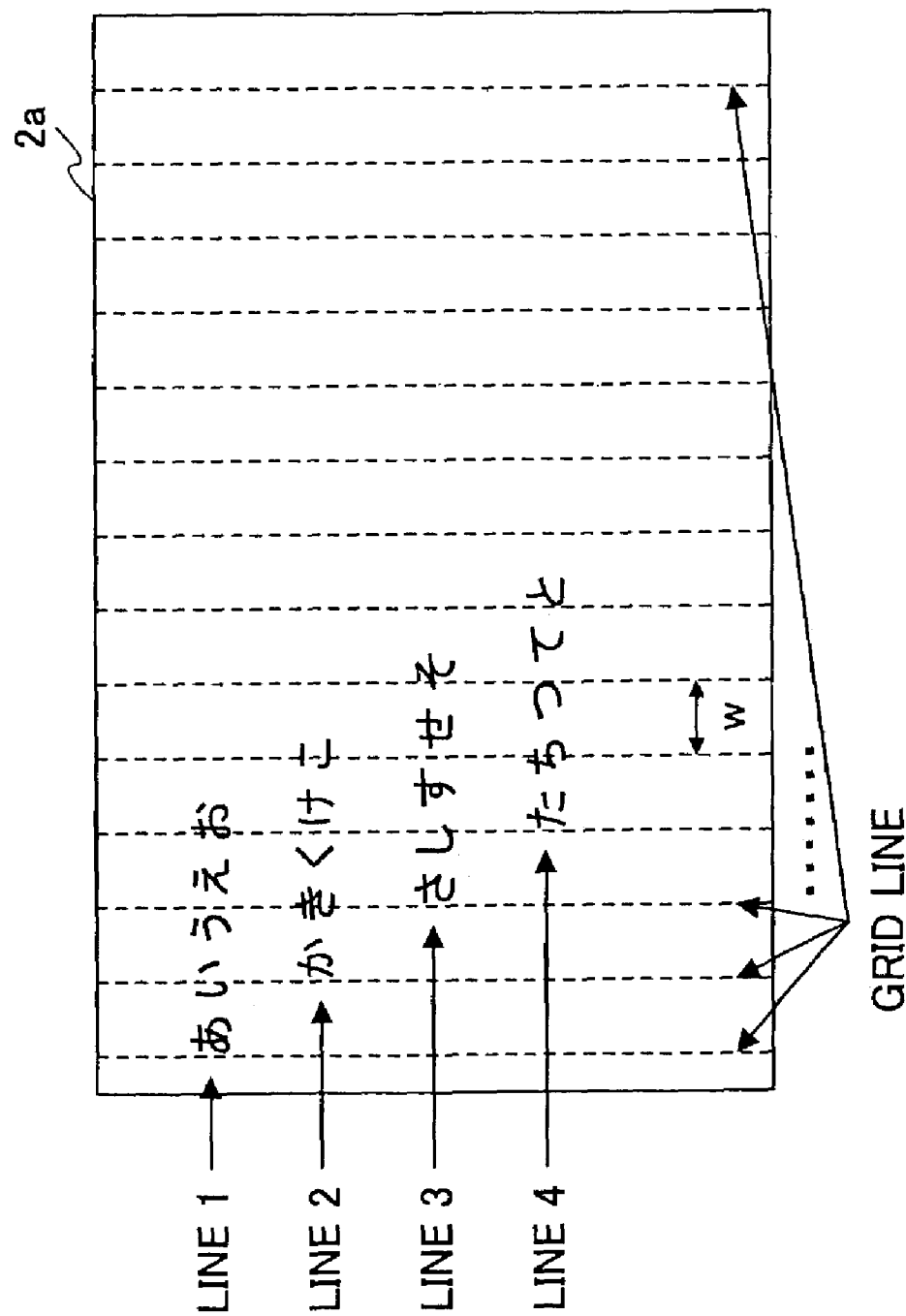

HANDWRITING INFORMATION PROCESSING APPARATUS, HANDWRITING INFORMATION PROCESSING METHOD, AND STORAGE MEDIUM HAVING PROGRAM STORED THEREIN FOR HANDWRITING INFORMATION PROCESSING

BACKGROUND OF THE INVENTION

1. Field of the Invention

The present invention relates generally to a handwriting information processing technique, and more particularly, the present invention relates to a handwriting information processing technique for allowing the user to input handwritten characters and convert them into typed text at a desired timing so as to be displayed on a display apparatus.

2. Description of the Related Art

Examples of a handwriting information processing apparatus having means for recognizing handwriting in the related art are described below.

(1) In Japanese Patent Laid-Open No. 2000-099223, a data processor (handwriting information processing apparatus) having an interface with fixed handwriting input spaces wherein recognition errors can be easily corrected is disclosed. In this data processor, a character code corresponding to the handwriting is sent to the relevant application.

(2) In Japanese Patent Laid-Open No. 2001-014103, a character input device (handwriting information processing apparatus) having an interface with fixed handwriting input spaces, as in the invention of (1), wherein an input method can be switched in an efficient manner is disclosed.

(3) In Japanese Patent Laid-Open No. 2000-076380, a handwriting input device (handwriting information processing apparatus) that allows inputting of the handwritten characters in any direction without having to consider fixed input spaces or designated text format upon inputting handwritten characters on a touch panel is disclosed.

(4) In Japanese Patent Laid-Open No. 09-319503, a text processing apparatus (handwriting information processing apparatus) that can be easily manipulated to perform text inputting and text editing using a combination of a written character string input method wherein the handwritten characters do not go through a recognition process and are handled as stroke (a plurality of points connecting one end to the other in the, handwritten character) data, and a recognized character string input method wherein the handwritten characters are recognized and converted into character code is disclosed.

(5) In Japanese Patent Laid-Open 2000-043485, an electronic blackboard (handwriting information processing apparatus) for use in a conference and the like, wherein handwritten characters input to a touch panel are processed for character recognition, converted into typed text, and displayed on the touch panel is disclosed. According to this invention, neat typed text can be obtained in place of a sloppy handwritten version of the topic and minutes of a conference, for example.

The above descriptions of the related art are samples of prior inventions relating to handwritten character recognition apparatuses, particularly, to the user interface of the apparatus. The handwritten character recognition user interface can be roughly divided into two types. One type is for the likes of inventions (1) and (2) wherein fixed input spaces are provided and the user is required to input one character in each space. This type is the most conventional user interface. In this type of user interface, it is unnecessary to perform a cut-out process for each of the characters and recognition errors due to an error in the cut-out process can be avoided. However, this type of interface imposes a great burden on the user and is far from being user-friendly (hereinafter, handwritten character recognition in such a type of user interface is referred to as 'fixed space handwritten character recognition'). The other type of user interface includes the above inventions (3) and (4), wherein no fixed input spaces are provided so that the user can write freely into the handwriting input region, and a cut-out process for each of the characters is performed in order to recognize the handwritten characters. In this type of user interface, recognition error does occur as a result of the character cut-out process; however, this type of interface is advantageous in that the user can input characters with the ease of writing with a conventional pencil (hereinafter, the handwritten character recognition in such a type of user interface is referred to as 'free handwritten character recognition').

The conventional methods of handwritten character recognition are the above-described fixed space handwritten character recognition and the free handwritten character recognition. In these conventional recognition methods, although conversion into typed text is performed based on information on the shapes of the hand written characters, no process is undertaken concerning the position at which the characters are written nor the size thereof. Thus, in the conventional method, the handwritten characters input by the user are displayed at a predetermined character position and converted into a code character of the same size regardless of the size or the position in which the original handwritten characters have been input. For example, in a handwritten text of the minutes of a conference and the like, the user may want to emphasize a word/phrase, to enlarge the characters of an important word/phrase, or leave a blank to be filled in later In the conventional art, it is impossible to perform all of these operations in the initial text conversion process. Thereby, the user has to perform individual processes after the text conversion process for changing the font size of a particular word/phrase or moving the existing characters by inputting spaces in the desired area to add a word/phrase.

Since performing such operations imposes a great burden on the user, it is preferable that the conversion process be simpler. Thus, a handwriting information processing apparatus with a user interface that is capable of reflecting the intentions of the user inputting the handwritten characters, such as displaying typed characters in a large font for the corresponding handwritten characters that should be emphasized or providing a blank space between characters.

Also, when the user is able to write freely into the input region of the handwriting information processing apparatus, it is difficult to realize 100% character recognition, that is, a 100% probability of the handwritten characters being converted to the code characters originally intended by the user, due to the handwriting peculiarities of each user. Thus, it is necessary to edit the code characters displayed in response to the handwritten character input. This also imposes a burden on the user, and therefore, it is preferable that very simple operations enable various editing processes. Also, editing operations that are intuitive in nature and easily associated or unexpected and amusing are more likely to be accepted by the user since the learning of these various editing operations can be facilitated.

In a conference and the like, it is imperative that important subjects and propositions that are discussed be organized in well-devised minutes so that all members of the conference are able to comprehend the discussion in a restricted time period. Thus, in the user interface of a handwriting information processing apparatus used in a conference such as an electronic blackboard, operations such as emphasizing a heading, adding a postscript, and the like should be made simple for the user.

Further in the conventional art, recognition processing is performed for each character or for a string of characters accumulated until a certain length is reached, after which the recognized character string is shown and the user determines the desired character (changes to the character string). This method of progressively converting the handwritten characters is not very suitable for use in a conference. That is, the necessity of checking the recognition results of the handwritten characters right in the middle of a discussion may arise, which may result in an interruption in the flow of thoughts. Thus, in converting handwritten information during a conference into type text, the handwritten information is preferably saved as coordinate values, wherein the actual conversion of the information into typed text is completed when the discussion sinners down or at the end of the conference.

Additionally, in a conference, the positioning of the written character strings is quite important and a character string usually has a meaningful relationship with the character strings written above and below it. Thus, it is preferable that the outline of the character strings that are represented as a list or in an indent format, for example, be represented as they are written. Further, if the outlined character strings can be easily saved in a file or sent to another person, the information generated from the conference can be put to effective use.

Also, in the conventional method, when a user wants to convert handwritten characters input as 'hiragana' characters into Chinese characters, the user has to take an action such as pushing a Chinese character conversion button and the like. In such a case, the IME (Input Method Editor) by Windows (registered trademark) performs Chinese character conversion only for the 'hiragana' character portion of the character string even when it contains both 'hiragana' and Chinese characters, thereby leaving the portion originally handwritten in Chinese characters unconverted. Thus, it is preferable that the Chinese character conversion and the handwriting information processing into typed text be performed simultaneously.

SUMMARY OF THE INVENTION

The present invention has been developed in response to the above-mentioned problems of the related art, and its object is to provide a handwriting information processing apparatus, a handwriting information processing method, a handwriting information processing program, and a storage medium storing the handwriting information processing program, wherein adapted characters are displayed according to the size and position of a handwritten character input, editing operations of the adapted characters are arranged to be simple and amusing, handwritten character input and editing operations are realized in an efficient manner, and a user interface with user-friendly features enabling easy learning of its operation is provided. Accordingly, in the present invention, a character recognition process based on a handwritten character input to an information input region, the selection of a character code corresponding to the handwritten character, a character adaptation process on a code character assigned to the character code based on an input state of the handwritten character, and display of the obtained adapted character from the character adaptation process on a display apparatus are performed.

It is a further object of the present invention to provide a handwriting information processing apparatus wherein handwritten information is stored along with the stroke information and the line information and converted in a batch at arbitrary timing chosen by the user rather than being progressively converted into typed text, and an outline of the character strings is drafted by obtaining the indents of the character strings based on information on the positions of the handwriting input. Accordingly, a handwriting information processing apparatus of the present invention includes:

a coordinate input part that detects a handwriting input made by a user and outputs a coordinate value;

a processing part that performs predetermined processes based on the coordinate value output from the coordinate input part; and a display part that displays an output of the processing part;

wherein the processing part includes:

a coordinate value storing part that stores all of the coordinate values output by the coordinate input part along with stroke information and line information of the handwriting input;

a handwritten character recognition part that recognizes handwritten characters in a batch based on the coordinate values, the stroke information, and the line information stored in the coordinate value storing part;

a Chinese character conversion part that performs a Chinese character conversion by handing a character string obtained by the handwritten character recognition part to an Input Method Editor;

an outline drafting part that calculates an indent position of each line based on the coordinate values and the line information stored in the coordinate value storing part, obtains outline information of a character string, and drafts an outline;

a result storing part that stores the character string obtained by the handwritten character recognition part and the outline information obtained by the outline drafting part; and an edit processing part that corrects the outline information based on information stored in said result storing part.

It is also an object of the present invention to enable the storage of the above drafted outline of character strings in a storage medium, or to enable its transmission to another person via electronic mail by entering an e-mail address and a title. Accordingly the above handwriting information processing apparatus further includes:

an outline draft storing part that stores the character string of the drafted outline in a storage medium; and an outline draft transmitting part that converts the character string of the drafted outline for e-mail transmission., and sends the converted outline draft to a designated e-mail address.

A further object of the present invention is to provide a storage medium that stores a program readable by a central processing unit that performs a handwriting information processing method, wherein the handwriting information processing method includes steps of storing handwritten information along with the stroke information and the line information, performing a batch-conversion on the handwritten information at arbitrary timing chosen by the user rather than progressively converting the handwritten characters into typed text, drafting an outline of the character strings by obtaining the indents based on information on the positions of the handwriting input, and correcting the above drafted outline of the character strings.

Further, it is an object of the present invention to provide a program that executes a handwriting information processing method including steps of storing handwritten information along with the stroke information and the line information, performing a batch conversion on the handwritten information at arbitrary timing chosen by the user rather than progressively converting the handwritten characters into typed text, drafting an outline of the character strings by obtaining the indents based on information on the positions of the handwriting input, and correcting the above drafted outline of the character strings.

BRIEF DESCRIPTION OF THE DRAWINGS

FIG. 2 is a diagram showing an example of the specification of a display apparatus having a handwriting input apparatus that is used in the handwriting information processing apparatus according to the present invention;

FIG. 4 is a diagram showing a screen display of the handwriting information processing apparatus according to the first embodiment when a handwriting information processing program is initiated;

FIG. 11 is a diagram for illustrating a character property association process, wherein the font size and the character spacing of the adapted characters in two different character line blocks on the display apparatus are caused to conform;

FIGS. 12A and 12B are diagrams for illustrating a gesture editing process;

FIG. 24 shows a state in which an editing panel is displayed;

FIGS. 25A–25D are diagrams illustrating how the one-character editing process is performed;

FIG. 28 is a diagram for illustrating a moving process on the character line block;

FIG. 47 is a diagram showing the state of the handwriting input region when the editing process is performed;

DESCRIPTION OF THE PREFERRED EMBODIMENTS

In the following, a description of the preferred embodiments of the present invention is given with reference to the accompanying drawings.

Figure 1A:
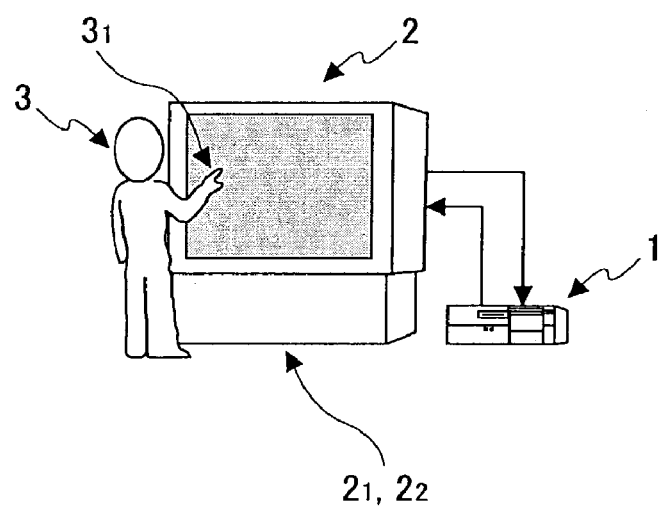
FIGS. 1A and 1B are diagrams illustrating exemplary outline configurations of a handwriting information processing apparatus according to the present invention.
Figure 1B:
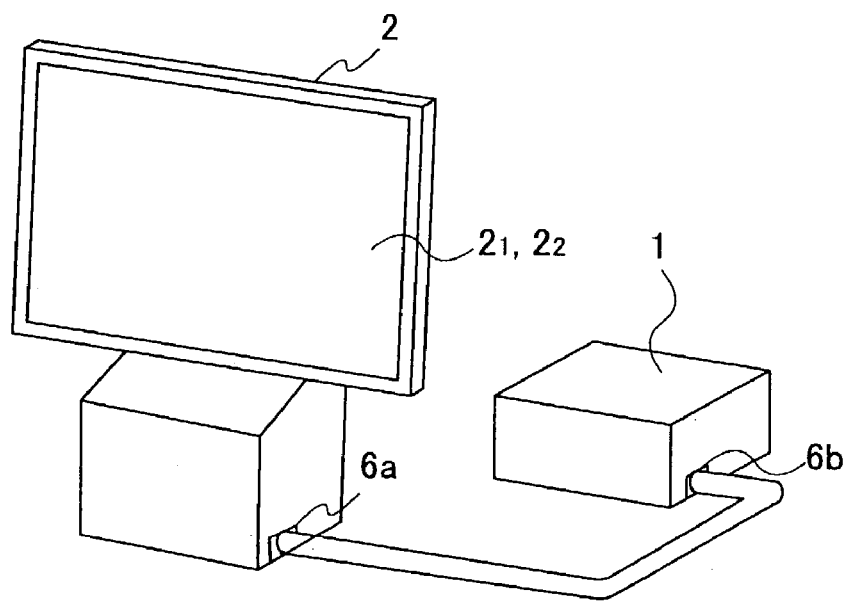

FIGS. 1A and 1B are diagrams showing exemplary outline configurations of a handwriting information processing apparatus according to the present invention that is used in a conference system; and FIG. 2 is a diagram showing an example of the specification of a display apparatus having a handwriting input apparatus that is used in the handwriting information processing apparatus according to the present invention.

As shown in FIGS. 1A and 1B, the handwriting information processing apparatus of the present invention includes a computer 1 as the handwriting information processing apparatus and a display apparatus 2 having a handwriting input apparatus such as the Media Site by Ricoh Ltd, which has the specification shown in FIG. 2. The display apparatus 2 having a coordinate input apparatus has a data I/O interface 6a connecting it to the computer 1 and the computer 1 has an I/O interface 6b connecting it to the display apparatus 2, as shown in FIG. 1B. In the following, the display apparatus 2 having a coordinate input apparatus is referred to as 'handwriting input/display apparatus 2', and the screen part of this handwriting input/display apparatus 2 is referred to as 'handwriting input/display screen 2'. The handwriting input/display screen 2 is referred to as 'coordinate input apparatus $2_1$' when used as the coordinate input apparatus, and as 'display apparatus $2_2$' when used as the display apparatus. That is, the handwriting input/display screen 2 has display functions for displaying processing information and data sent from the computer 1 through the I/O interface 6a and handwriting information inputting functions for detecting the input positions of handwriting information, for example, by detecting the laser-shielded positions on the screen that has laser emitted thereon from its edges, as is disclosed in Japanese Patent Laid-Open 2000-105671, thereby enabling the user 3 to input handwriting information just by lightly touching the screen with an indication part $3_1$ shown in FIG. 1A such as a finger or an input pen. As for the handwriting input/display apparatus 2, a mouse or a tablet may be used as the coordinate input apparatus, and a CRT or a projector may be used as the display apparatus. The handwriting input/display apparatus 2 may be a combination of a coordinate input apparatus and a projector that is already in the market such as the Mimio by Virtual Ink and the eBeam by EFI.

In the following, a description of the configuration of a handwriting information processing apparatus according to a first embodiment of the present invention is given.

The handwriting information processing apparatus according to the first embodiment performs a character recognition process and a character adaptation process on handwritten characters input to the handwriting input/display apparatus 2 and displays the results of these processes or edits the results based on a handwriting editing operation input.

Herein, the character recognition process is a process of selecting a code character (character corresponding to a character code) that is determined as having the closest shape to a handwritten character being processed based on a character code conforming to a standard such as the JIS, unicode or ASCII. This process is a publicly known process and therefore its description is omitted from this specification. The character adaptation process is a process of adjusting the size of a character to be displayed based on the size information of the input handwritten character and/or adjusting the display position of the character based on the position information of the input handwritten character. A detailed description of this process is given later on.

Figure 3:
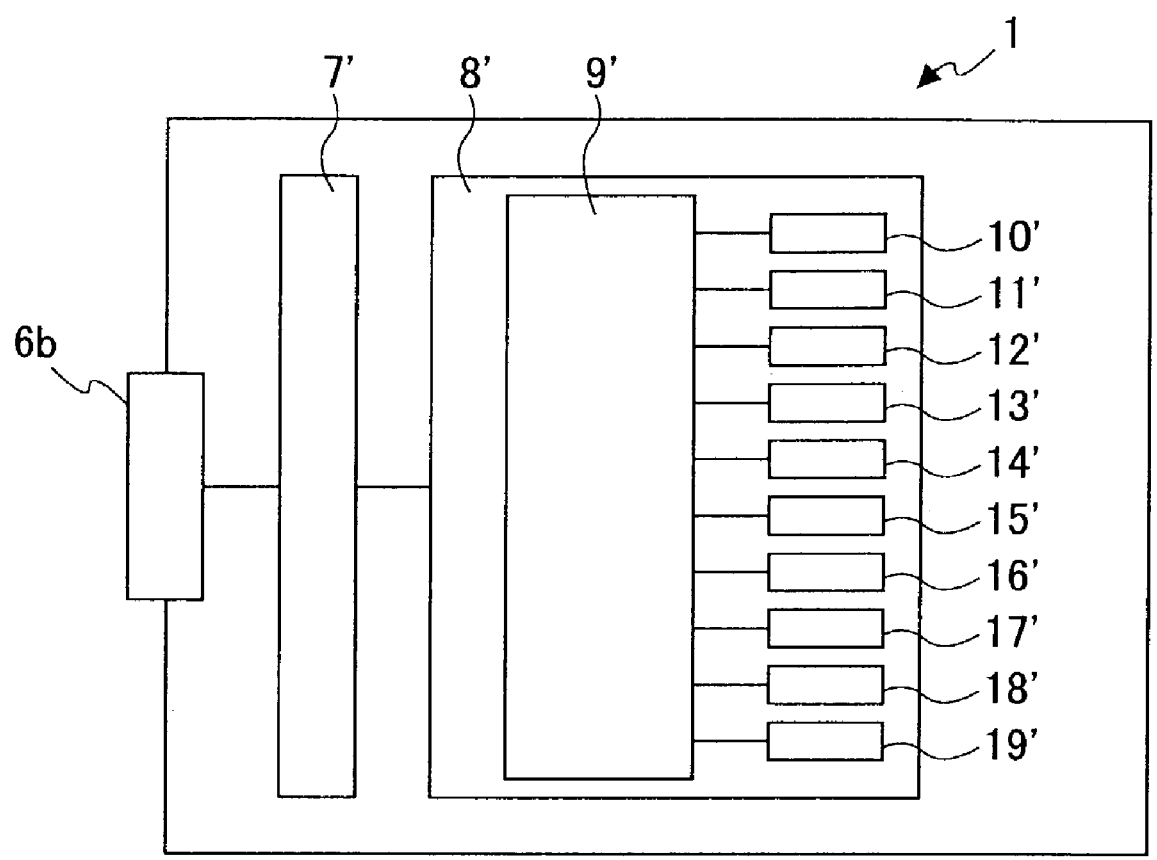
FIG. 3 is a block diagram showing the inside configuration of the computer used in the handwriting information processing apparatus of a first embodiment of the present invention.

With reference to FIG. 3, the computer 1 in the present embodiment includes the data I/O interface 6b for inputting data from the handwriting input/display apparatus 2 and outputting data to the same apparatus, a hard disk 8' having a signal processing unit 7' and a memory.

In the above hard disk 8', a handwriting information processing program 9' is provided. This handwriting information processing program 9' is a program that enables the computer 1 to perform the above character recognition process and the character adaptation process, which in turn enables the adapted characters, generated from performing the above character recognition process and adaptation process on a handwritten character input to the handwriting input screen 2, to be displayed on the display apparatus $2_2$ of the handwriting input screen 2, or the editing operation on the adapted characters to be performed based on the editing operation input at the handwriting input screen 2.

With the activation of the above program 9, a screen display such as that shown in FIG. 4 appears on the display apparatus $2_2$. The above screen display of FIG. 4 has an input region (information input region) 26 into which handwritten characters and handwritten editing operations can be input.

Further, in the upper portion of this screen display, a recognition button 27', a clear button 28', a refresh button 29', a justification button 30', a character close-in button 31', a line width slider 32', a mode selection slider 33', a recognition result display space 34', a change button 35', a Chinese character conversion button 36', a save button 37', and an end button 38' are provided.

The recognition button 27' is a button for immediately initiating the character recognition process. The clear button 28' is a button for erasing all the writing displayed in the input region 26' and for initializing the contents in a coordinate value memory 10', a recognition-adaptation result memory 11', and a character line block region memory 13', which are described in the subsequent paragraphs. The refresh button 29' is a button for temporarily deleting the writing displayed in the input region 26' and re-displaying the cleared data. This is used mainly in cases where an inconvenience arises in the screen display and the screen display needs to be recovered.

The justification button 30' is for justifying the character-spacing of the adapted characters displayed in the input region 26'. The character close-in button 31' is for closing in the character spacing of the adapted characters displayed in the input region 26'.

The line width slider 32' is for changing the width of a line in which the handwriting is input. The mode selection slider 33' is for selecting the mode in which the character recognition process is performed, the selection being made depending on which type of characters from among the likes of the 'hiragana' characters, the 'katakana' characters, and the alphabet should be predominantly recognized.

The recognition result display space 34' is a display space for displaying the code character selected as a result of the character recognition process. The change button 35' is for changing the code character with a keyboard, for example, which is not shown in the drawing, and is used when character recognition based on the handwriting information is difficult. The Chinese character conversion button 36' is for converting the code characters shown in the recognition result display space 34' into Chinese characters.

The save button 37' is for saving the adapted characters shown in the input region 26' as text data or html data. The end button 38' is for ending this handwriting information processing (handwritten character conversion) program.

The hard disk 8' includes a coordinate value memory 10', a recognition-adaptation result memory 11', a character edit memory 12', a character line block region memory 13', a character line block region edit memory 14', a gesture edit memory 15', character code data 16', Chinese character conversion dictionary data 17', Japanese dictionary data 18', and Japanese-English dictionary data 19'.

Figure 5A:
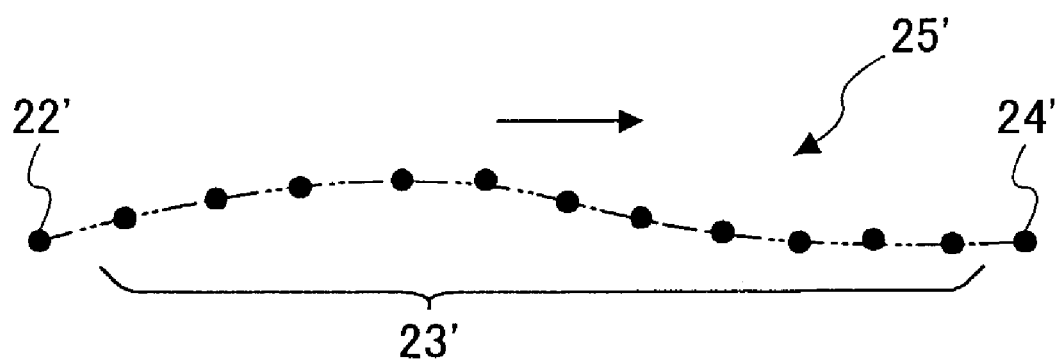
FIG. 5A and FIG. 5B illustrate input strokes of a handwriting information input that are input at differing speeds.

The coordinate value memory 10' is for storing the coordinate values of the handwriting information input to the input region 26'. With reference to FIG. 5A, the coordinates of an input starting point 22' at which the user touches the handwriting input screen 2 with an input pen or the like thereby initiating the handwriting input; and if the input point is moved on the input region 26', the coordinates of input points in between the input starting point 22' and an input ending point 24', namely, the coordinates of partway input points 23' that are detected at fixed time intervals (approximately 10 msec intervals) of an input stroke 25'; and the coordinates of the input ending point 24' at which the input pen is let go from the input region 26' thereby ending the handwriting input are stored in the coordinate value memory 10'.

Figure 5B:
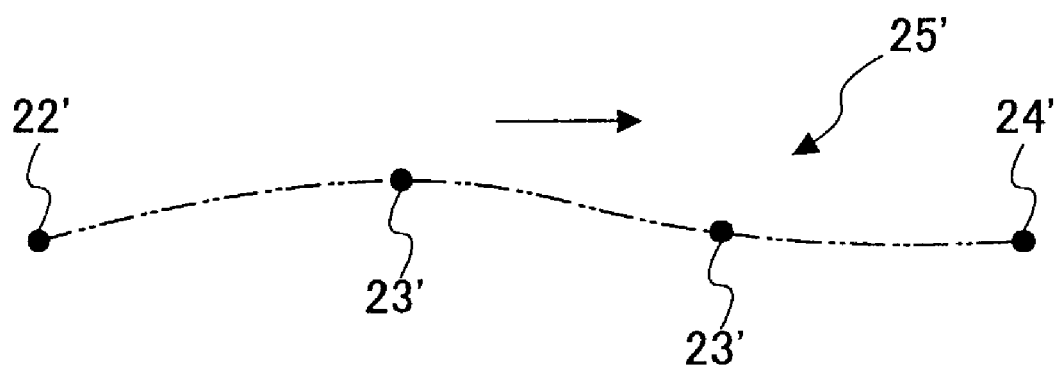

Since the coordinates of the partway input points 23' of the input stroke 25' are obtained at fixed time intervals, there will be fewer partway input points 23' obtained, as shown in FIG. 5B, when the stroke is input at a fast pace. Thus, based on each of the coordinates for the input starting point 22', the partway input points 23', and the input ending point 24', and the number of the partway input points 23', information on the input stroke 25' such as the moving speed, the moving direction, and the shape can be obtained.

Figure 6:
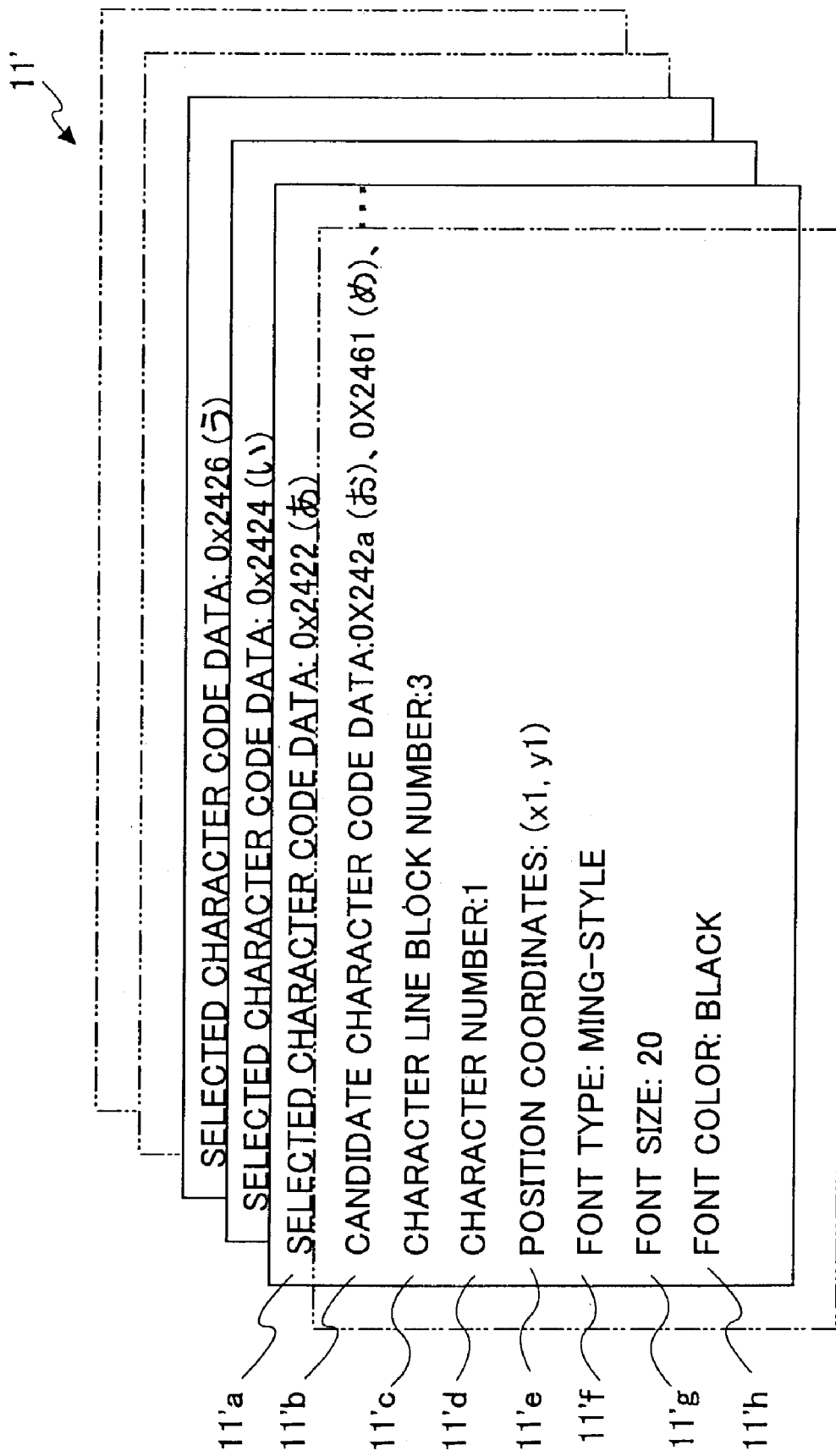
FIG. 6 is a diagram showing the data composition of a recognition-adaptation result memory.

The recognition-adaptation result memory 11' is for storing the recognition-adaptation result from the character recognition process and the character adaptation process performed on the handwritten characters by the handwriting information processing program 9'. The recognition-adaptation result memory 11' contains character data 11p' ('p' being a variable) for each character, as shown in FIG. 6. The character data for each character contains information on the display properties of the character such as selected character code data 11a' indicating the result from selecting the character code closest to the handwritten character upon performing the character recognition process, candidate character code data 11b' indicating the other candidates considered in the selection process, a character line block number 11c' indicating the line block to which the adapted character corresponding to the handwritten character belongs, a character number 11d' indicating the position of the adapted character within the above character line block, position information 11e' indicating the position of the adapted character in the region on the screen, font type 11f', font size 11g', and font color 11h'.

The character line block refers to a set of characters assembled together as one block when a series of handwritten characters are input, the block being the unit on which various editing processes are performed. In this embodiment, when handwritten characters are not input for a predetermined period of time, the handwritten characters input prior to the elapse of this predetermined time period are determined to belong to a character line block, and the character recognition process is performed in a batch for each of these character line blocks. Thus, in a case where a plurality of handwritten characters are input to the handwriting input screen 2, the character line block constitutes a plurality of adapted characters corresponding to the above plurality of handwritten characters. On the other hand, when handwritten characters are not input for a predetermined time period after the input of one handwritten character, the adapted character corresponding to this one handwritten character becomes a character line block.

For example, FIG. 6 shows character data 11p' for the first handwritten character "あ" in a series of handwritten 'hiragana' characters "あいう" input as one character line block, the input starting at coordinates (x1, y1) on the input region 26' and the character line block having a property setting in which the font type 11f' is Ming-style (Mincho), the font size is 20 points, and the font color is black.

In a case where "あ" is selected as the code character, a JIS character code "0x2422" corresponding to the 'hiragana' character "あ" is kept in the selected character code data 11a'. In the candidate character code data 11b' a plurality of JIS character codes corresponding to characters that have structures similar to that of the handwritten character "あ" and are candidate characters not selected in the character recognition process such as the JIS character code "0x242a" for the 'hiragana' character "お", and the JIS character code "0x2461" for the 'hiragana' character "め" are kept.

If this character line block corresponding to the series of characters "あいう" is the third character line block that has been handwritten onto the input region 26', the character line block number will be "3". Also, the character number 11d' will be "1" since the character "あ" is the first character among the three characters "あいう" making up this character line block.

The character edit memory 12' contains information on the specific processes of the editing process performed on each of the adapted characters displayed on the display apparatus 2₂. In this embodiment, the character edit memory 12' contains information on a character deletion process, a character insertion process, an adapted character changing process to another candidate character, and a character rewriting process, each of which is associated with a predetermined editing operation input. The above predetermined editing operation input corresponds to the selection of an edit button in an edit panel, which will be described later.

Figure 7:
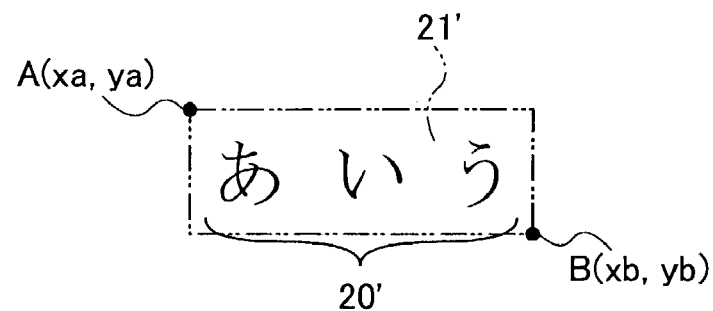
FIG. 7 is a diagram for illustrating a character line block region.

Referring to FIG. 7, the character line block region memory 13' contains position information for identifying a character line block region 21', which is a predetermined region surrounding a character line block 20' on the display apparatus 2₂. In this embodiment, the character line block region memory 13' holds information on the coordinates (xa, ya) of a top left-hand corner point A and the coordinates (xb, yb) of a bottom right-hand corner point B of the character line block region 21'. When a plurality of character line blocks are displayed on the display apparatus 2₂, information on the coordinate points of the character line block region for each of the character line blocks is stored in the character line block region memory 13'.

The character line block edit memory 14' holds information on each of the specific processes of the editing process performed on the entire character line block 20'. In this embodiment, information on a font size changing process, a character line block moving process, a character aligning process, a character translation process in a character line block, and a adapted character property association process are stored in the character line block edit memory 14'.

Each of the editing processes stored in the character line block edit memory 14' is associated with an action of inputting an editing operation to the input region 26'. That is, a specific editing process is performed according to the moving direction, the moving speed, and the moving distance of an input stroke 25'.

Figure 8A:
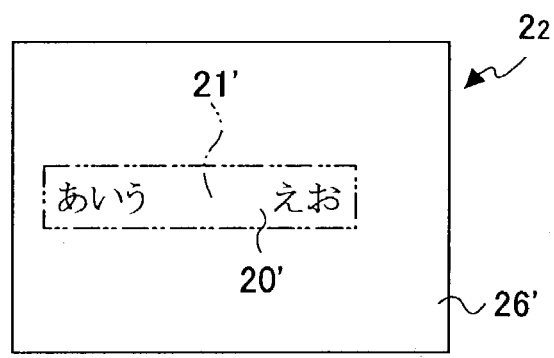
FIGS. 8A–8C are diagrams for illustrating a character alignment process.
Figure 8B:
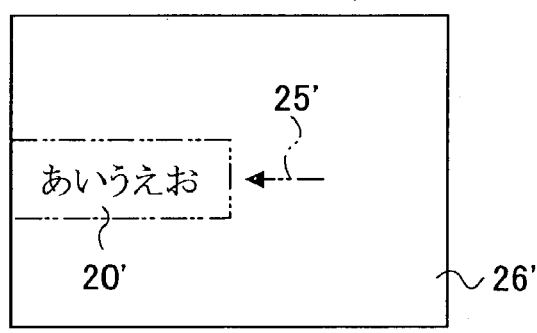
Figure 8C:
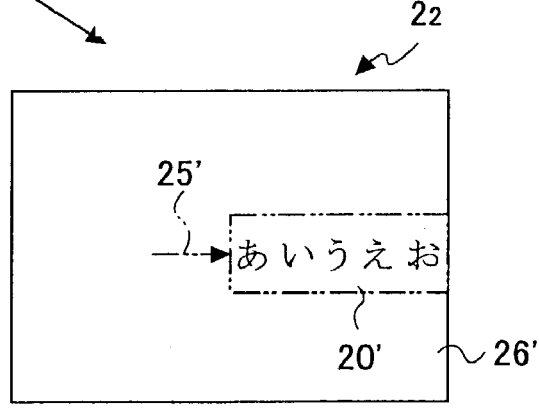

Herein, the character aligning process refers to the editing process of indenting the character line block 20' displayed at a suitable position on the display apparatus 2₂, as shown in FIG. 8A, to the left side of the input region 26', as shown in FIG. 8B, or to the right side of the input region 26', as shown in FIG. 8C. At the same time, the adapted characters in the character line block 20' can be positioned closer to each other (i.e. closing in the space between the characters, as shown in FIG. 8B), or justified (i.e. equally spacing out the characters within the character line block region 21' while maintaining the character line block 20' at its original length, as shown in FIG. 8C) in the above indent operation.

Figure 9:
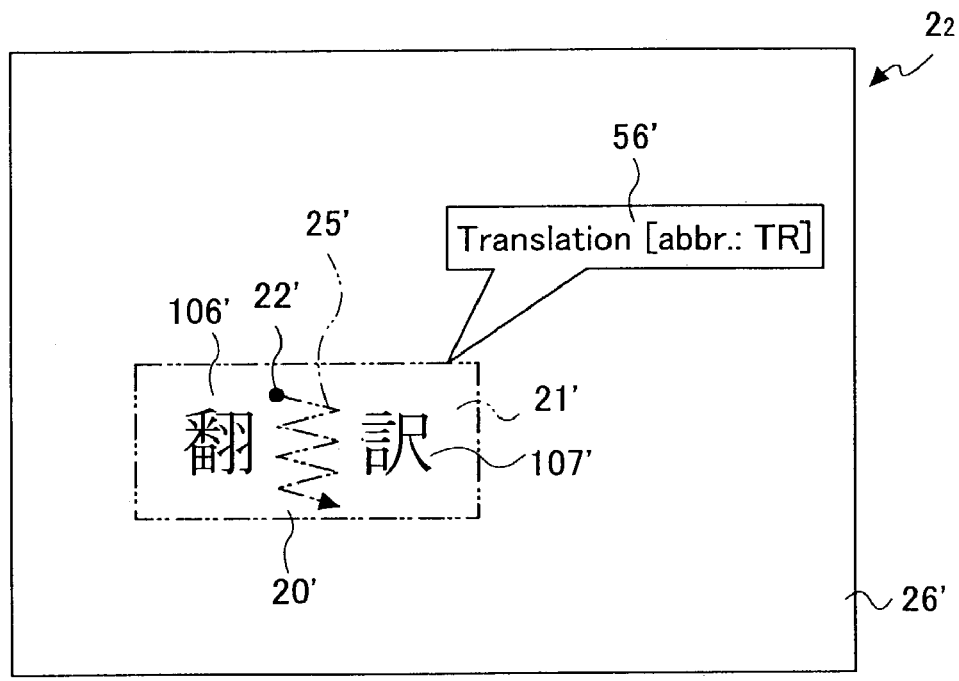
FIG. 9 is a diagram for illustrating a character translation process, wherein an English translation of a word is indicated on the display screen.
Figure 10:
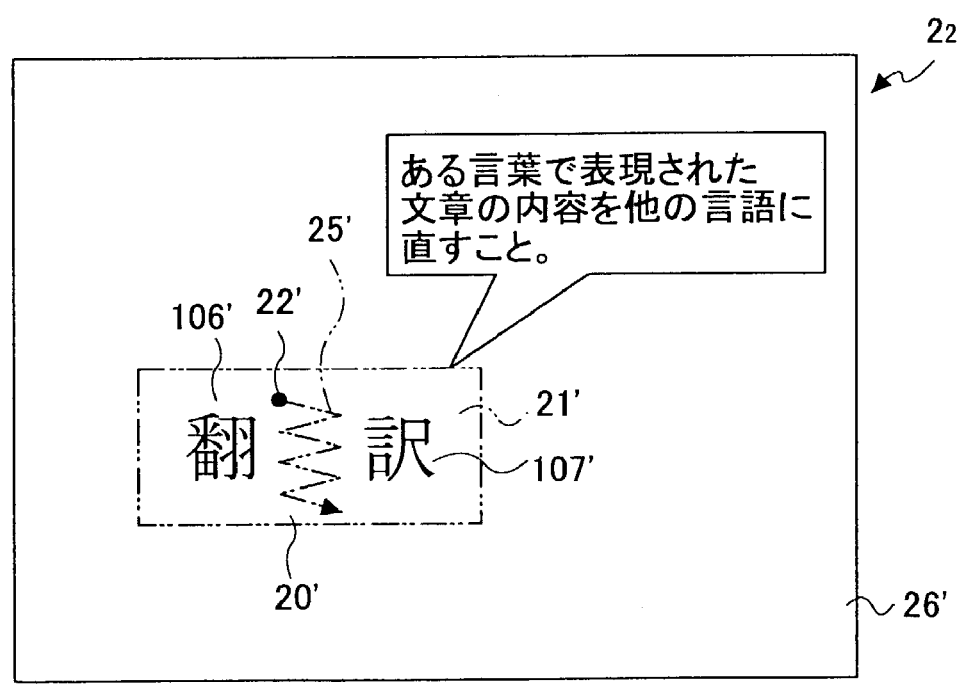
FIG. 10 is a diagram for illustrating a character translation process, wherein the meaning of a word is indicated on the display apparatus.

Referring to FIG. 9, the translation process of the characters in a character line block is a process of translating a word/phrase formed by the adapted characters displayed on the character line block 20' into English based on the Japanese-English dictionary data 19' and indicating the result on the display apparatus 2₂. To the contrary, when the word/phrase formed by adapted characters shown in the character line block 20' is in English, a Japanese translation of the above English word/phrase can be indicated on the display apparatus 2₂ based on English-Japanese dictionary data not shown in the drawing. Also, the meaning of a word/phrase formed by the adapted characters of the character line block 20' can be displayed on the display apparatus 2₂ based on the Japanese dictionary data 18', as shown in FIG. 10.

The character properties association process is a process of associating the character properties of the adapted characters in different character line blocks having differing character properties for the adapted characters making up each character line block. For example, in a case where two character line blocks 20' and 39' having different font size properties and character spacing properties are displayed on the display apparatus 2₂, as shown in FIG. 11, the font size and the character spacing of the adapted characters "かきく" making up the character line block 20' are made to conform with the font size and the character spacing of the adapted characters "あいう" making up the character line block 39' upon moving the character line block 20' into the character line block region of the character line block 39', the two character line blocks then being displayed in an organized layout. This process is used for such occasions as displaying separately handwritten character blocks 20' and 39' in a well-organized list format.

The gesture edit memory 15' holds information on the gesture editing processes that correspond to each form of gesture input. Herein, gesture inputs refer to characteristic forms of editing operation inputs, each assigned to a predetermined editing process, provided in order to facilitate the complicated and numerous editing operation inputs for the character line block 20'.

For example, in the present embodiment, when a gesture input 54' of slashing from right to left across the adapted characters "えお" of the character line block 20' made up of the adapted characters "あいうえお" is made, as shown in FIG. 12A, the adapted characters "えお" will be deleted and the character line block will contain the adapted characters "あい" う. Also, when a gesture input 55' of encircling the adapted characters "うえ" of the character line block 20' made up of the adapted characters "あいうえお" is made, as shown in FIG. 12B, the font color of the adapted characters "うえ" will be changed.

Other gesture inputs of characteristic shapes such as "レ", "□", "△", and the like also correspond to various editing processes, and the information on the editing processes corresponding to these gesture inputs are stored in the gesture edit memory 15'. However, in this embodiment, the specific descriptions of each of these gesture inputs are omitted.

The character code data 16' has character codes conforming to the Japanese Industrial Standards (JIS) and code characters, which are the typed text characters corresponding to this character code. Upon character recognition, the selected character code data 11a' and the candidate character code data 11b' corresponding to a handwritten character are extracted from this character code data 16'.

The Chinese character conversion dictionary data 17' is used for converting 'hiragana' characters into Chinese characters when a Chinese character conversion mode is selected with a Chinese character conversion button 36'. The Japanese dictionary data 18' and the Japanese-English dictionary data 19' are used for indicating the meaning of a word/phrase formed by the displayed adapted characters, and for indicating the English translation thereof, respectively, as shown in FIGS. 9 and 10.

Figure 13:
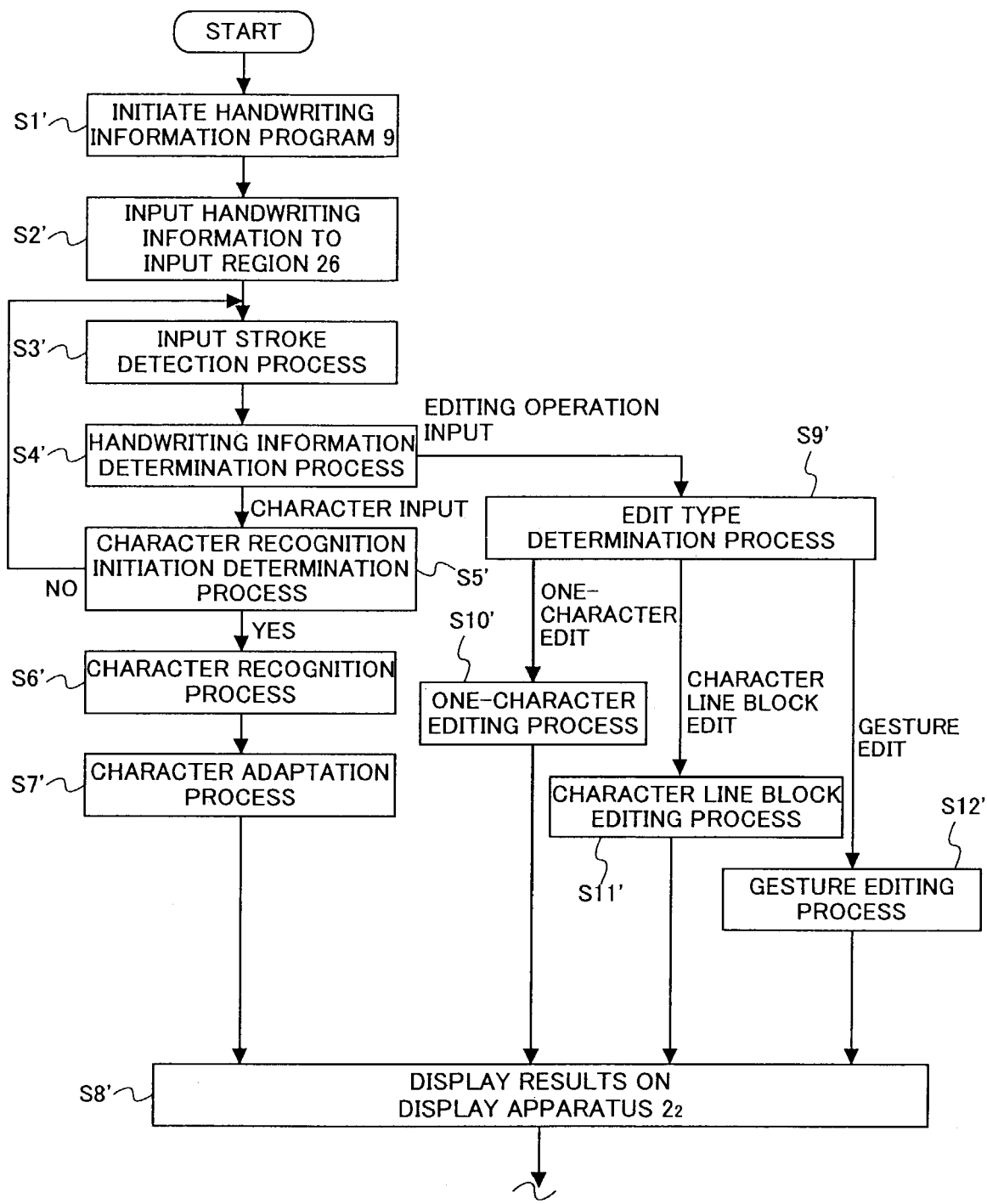
FIG. 13 is a flow chart for illustrating the operation of the handwriting information processing apparatus according to the first embodiment of the present invention.

In the following, the operation of the handwriting conversion apparatus according to the first embodiment of the present invention is described with reference to the flow chart shown in FIG. 13.

Upon the initiation of the handwriting information processing program 9' (step S1'), the input region 26' is displayed on the display apparatus 2₂, as shown in FIG. 4. When the user inputs handwriting information to the input region 26' with an input pen (step S2'), the input is detected and the input information is sent to the computer 1 having input stroke detection functions, thereby initiating an input stroke detection process.

Next, the input stroke detection process is described in further detail with reference to FIG. 14.

Figure 14:
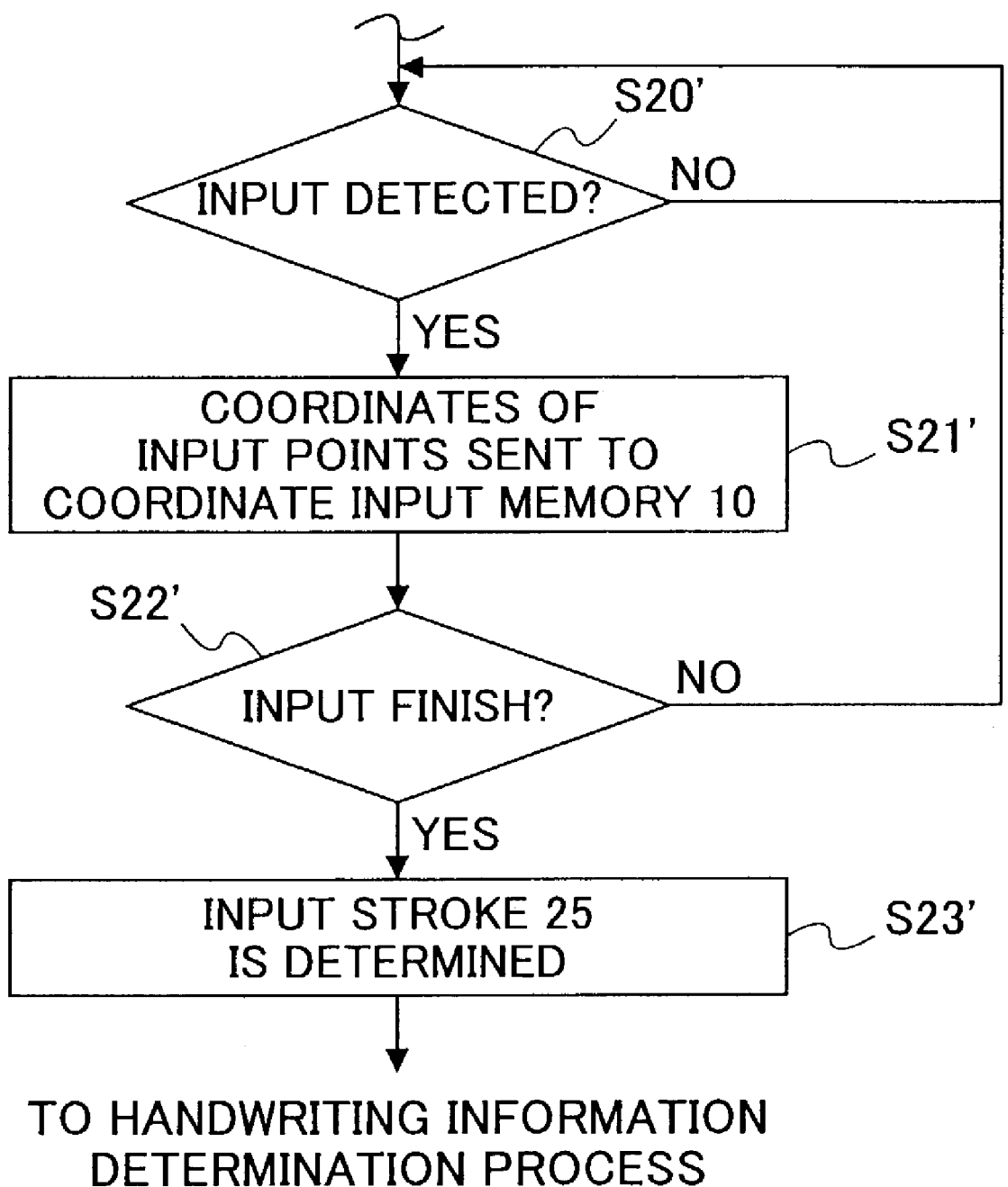
FIG. 14 is a flow chart for illustrating the procedures of an input stroke detection process.

As shown in FIG. 14, the computer 1 having input stroke detection functions detects the input stroke 25' (the path displayed by an input operation) of the input handwritten information (step S3'). Specifically, the computer 1 constantly monitors the process to see if a handwriting input on the input region 26' has been detected (step S20'), and when a handwriting input is detected, the coordinates of the input points are sent to the coordinate value memory 10' (step S21'). In this handwriting information processing apparatus, the computer 1 detects the handwriting input on the input region 26' which is made by shielding (blocking the beam of) the laser emitted along the surface of the handwriting input screen 2. The input coordinates of the handwriting input are detected at predetermined time intervals (approximately 10 msec) by the computer 1, and all the coordinates of the detected input points 22'–24' are sent to the coordinate value memory 10' (see also FIG. 5). The coordinate value memory 10' stores the received input coordinates.

Then the computer 1 determines whether or not the input has been completed (step S22'), and if the input has not been completed, the detection of the input is continued. When the input has been completed, the input stroke 25' is determined (step S23'), and a handwriting information determination process is initiated. The input completion of the handwritten information input is detected upon the termination of the shielding of the laser emitted along the surface of the handwriting input screen 2.

The input stroke 25' includes the input starting point 22' at which the input is initiated, the partway input points 23' that is detected in the middle of the stroke, and the input ending point 24' at which the input is terminated, as one stroke, and its movement and shape are identified and determined by the computer 1. The input stroke 25' is displayed on the handwriting input screen upon its input.

Now, the handwriting information determination process is described in further detail with reference to FIG. 15.

After the determination of the input stroke 25', the computer 1 having handwriting information determination functions determines whether the above determined input stroke 25' is a handwriting character input or a editing operation input (step S4').

Figure 15:
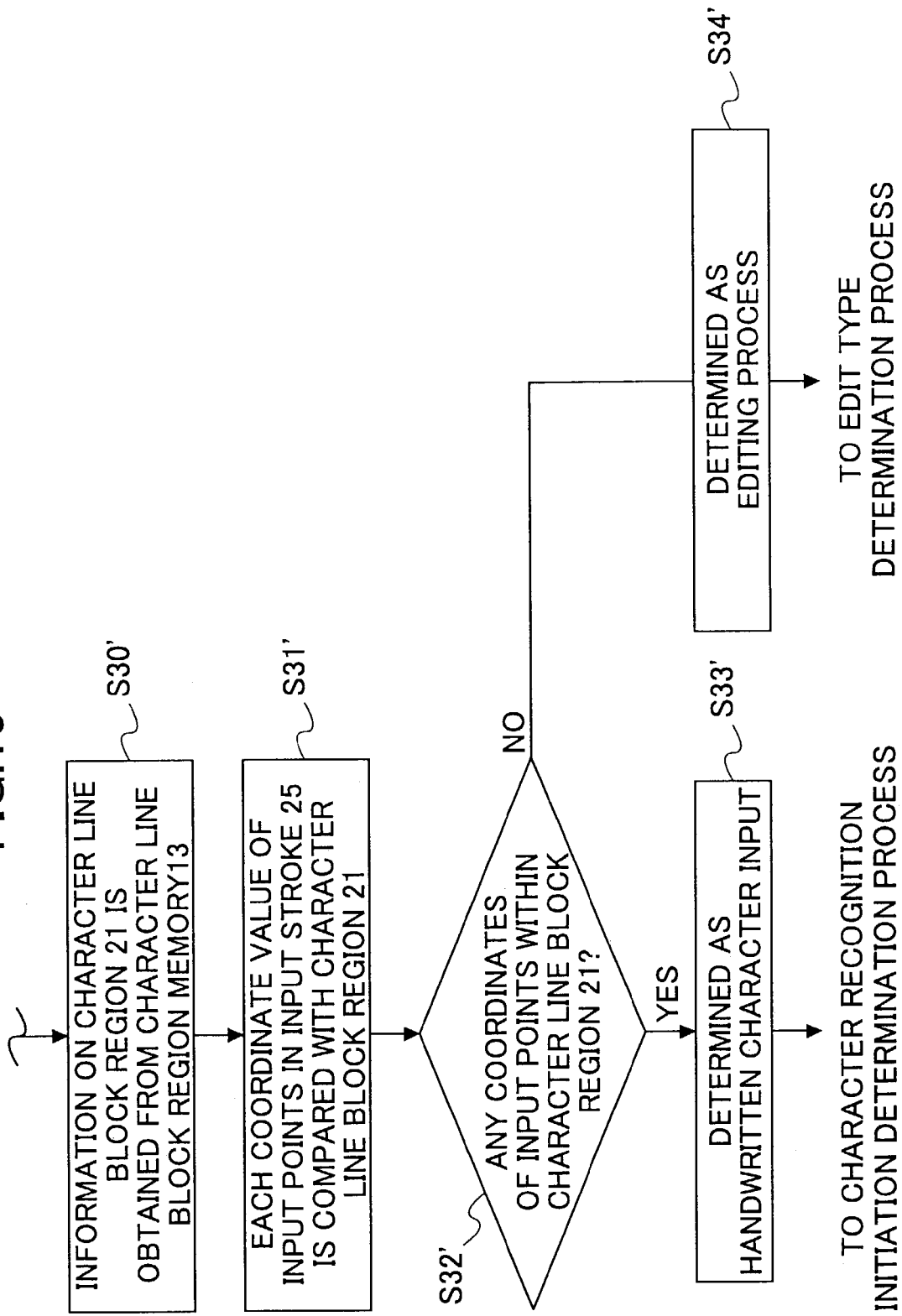
FIG. 15 is a flow chart for illustrating the procedures of a handwriting information determination process.

FIG. 15 shows the specific procedures for the above handwriting information determination process.

First, information on the character line block region 21' of the character line block 20' displayed on the display apparatus 2$_2$ is obtained from the character line block region memory 13' (step S30'). This character line block region 21' is determined by the coordinates (xa, ya) of a top left-hand corner point A and the coordinates (xb, yb) of a bottom right-hand corner point B, as shown in FIG. 7.

Next, each of the coordinates of the input points 22'–24' of the input stroke 25' and the character line block region 21' are compared (step S31'). Then it is determined whether or not any one of the coordinates of the input points 22'–24' is within the character line block region 21' (step S32'). If at least one coordinate point is determined to be in the character line block region 21', it is determined that the input stroke 25' is an input stroke of an editing operation input (step S34') and an editing operation type determination process is initiated.

Figure 16:
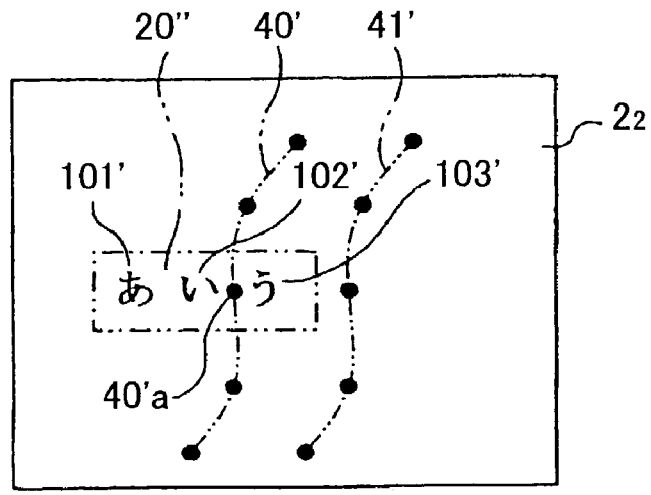
FIG. 16 is a diagram showing an input stroke that has input points within a character line block and an input stroke that does not have any input points in a character line block.

For example, when a character line block 20" made up of adapted characters 101'–103' ("あいう") is displayed on the display apparatus 2$_2$, as shown in FIG. 16, input stroke 40' is determined to be an input stroke of an editing operation input since one of its input points 40*a*' is in the character line block region of the character line block 20". On the other hand, input stroke 41' is determined to be an input stroke of a handwritten character input since none of its input points are situated in the character line block region of the character line block 20".

Also, in the above handwriting information determination process, if no adapted characters are displayed on the display apparatus 2$_2$, the input stroke 25' is determined to be an input stroke of a handwritten character input.

In the following, the character recognition initiation determination process is described in further detail with reference to FIG. 17.

When the input stroke 25' is determined to be an input stroke of a handwritten character input, the computer 1 having character recognition initiation determination functions determines whether or not the character recognition should be initiated (step S5'). The character recognition initiation determination process is performed according to the specific procedures shown in FIG. 17.

Figure 17:
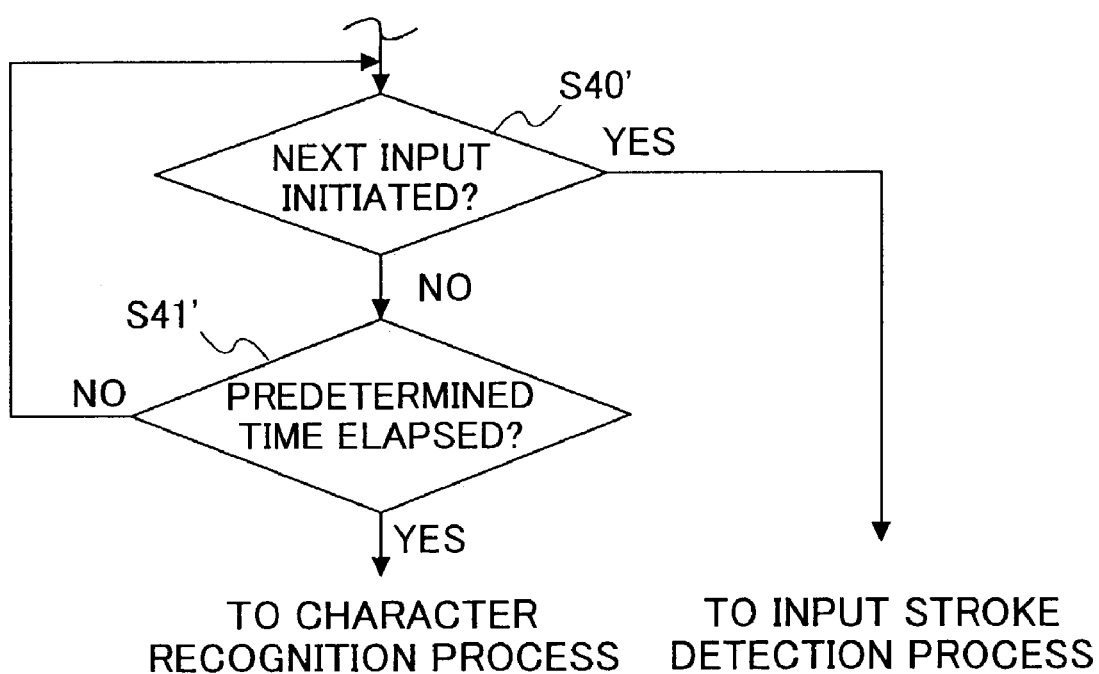
FIG. 17 is a flow chart for illustrating the procedures of a character recognition initiation process.

In FIG. 17, the computer 1 determines whether or not a next input has been initiated (step S40'). If a next input is detected, the process goes back to the input stroke detection process and new input stroke detection is initiated. If a next input is not detected, it is determined whether or not a prerequisite time has elapsed (step S41'), and if no input is detected before the elapse of the above prerequisite time, the character recognition process is initiated.

The above prerequisite time can be changed according to the preferences of the user; however, in this handwriting information processing apparatus, the prerequisite time is pre-set to 1.5 sec.

Figure 18:
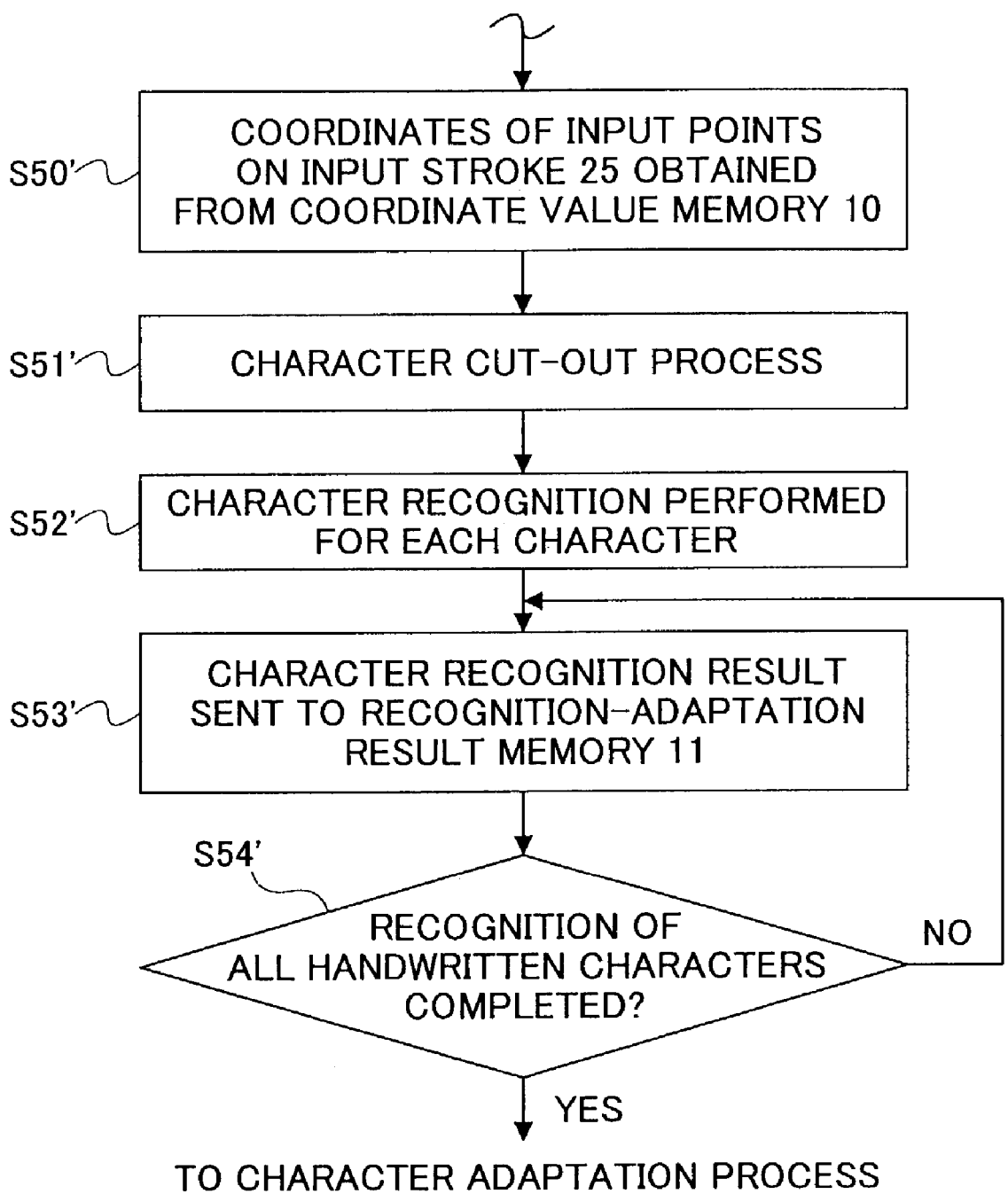
FIG. 18 is a flow chart for illustrating the procedures of a character recognition process.

Next, in the following, the character recognition process is described in further detail with reference to FIG. 18.

With the determination to initiate the character recognition of the handwritten characters, the computer 1 having character recognition processing functions initiates the character recognition process (step S6'). The specific procedures for the above character recognition process are described below with reference to FIG. 18.

First; the coordinate values of each of the input points in the input stroke 25' are obtained from the coordinate value memory 10'. When a plurality of input strokes exists, the coordinate values of the input points in all of these input strokes are obtained. Based on the coordinates of each input point, a character cut-out process (step S51') and a character recognition process (step S52') are performed.

The above character cut-out process is a process of subdividing the plurality of input strokes of a handwritten character input into sets of input strokes corresponding to a character. The character recognition process is a process of selecting character code data that is closest to the input handwritten character using a well-known character recognition engine (character recognition processing program). These processes are both well-known in this technical field and therefore, their descriptions are omitted.

In the handwriting information processing apparatus according to this embodiment, the character code data that is closest to the originally input handwritten character is selected (selected character code data 11*a*'), and character code data of candidate characters that are quite similar in shape to the above handwritten characters and have been considered as candidates for the above selection are also extracted (candidate character code data 11*b*') The selected character code data 11*a*' and the candidate character code data 11*b*' are sent to the recognition-adaptation result memory 11' as results from the character recognition process (step S53'). In this manner, the character recognition process is successively performed for each of the handwritten characters, and when the character recognition process is completed for all the handwritten characters (step S54'), the character adaptation process is initiated.

Figure 19:
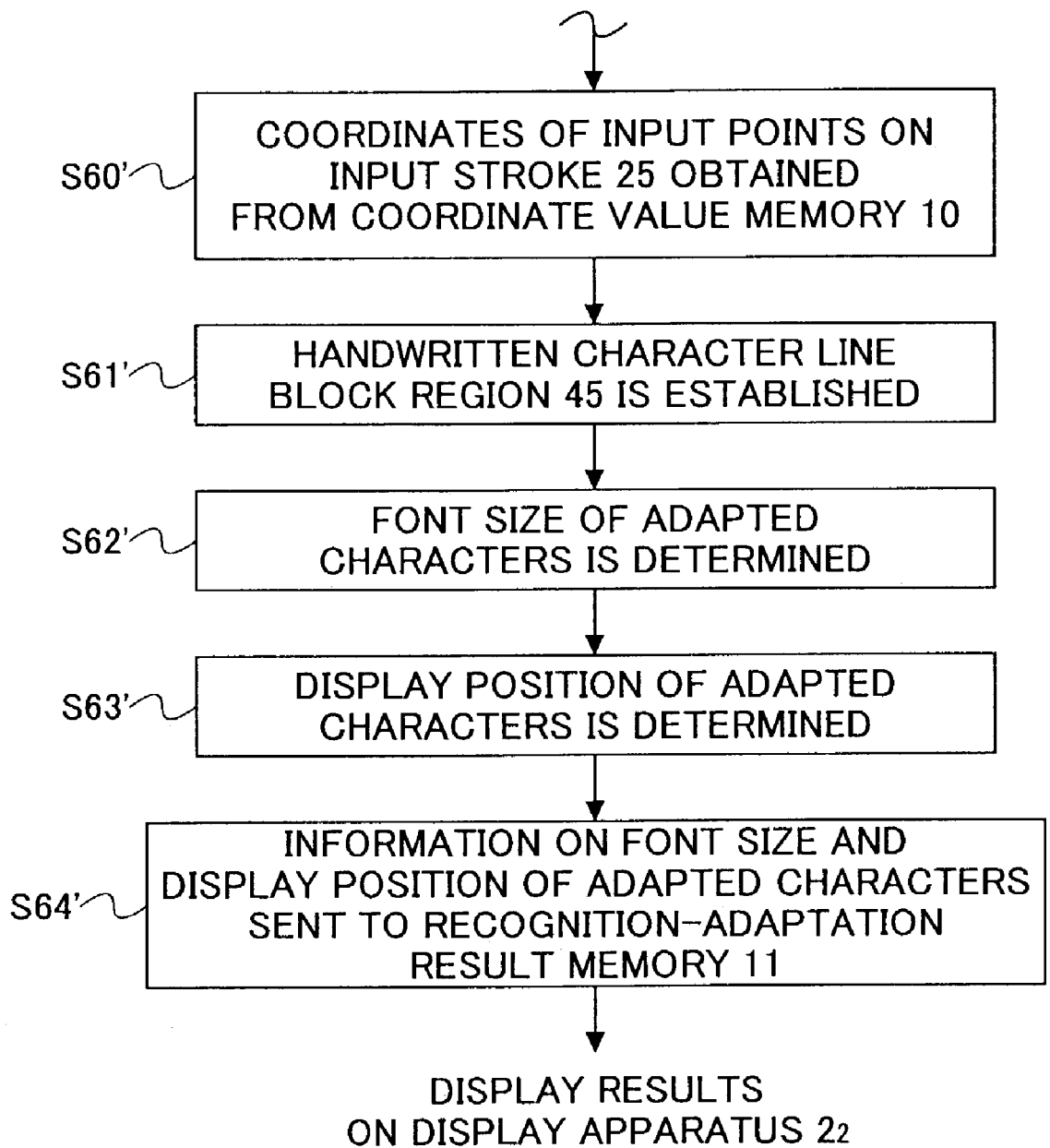
FIG. 19 is a flow chart for illustrating the procedures of a character adaptation process.

Now, the character adaptation process will be described below with reference to FIG. 19.

With the termination of the character recognition process, the computer 1 having character adaptation processing functions initiates the character recognition process (step S7'). The specific procedures for the above character adaptation process are described below with reference to FIG. 19.

First, the coordinates of each of the input points in the input stroke 25' are obtained from the coordinate value memory 10' (step S60'). When a plurality of input strokes exist, the coordinates of each of the input points in all of the above input strokes are obtained.

Figure 20:
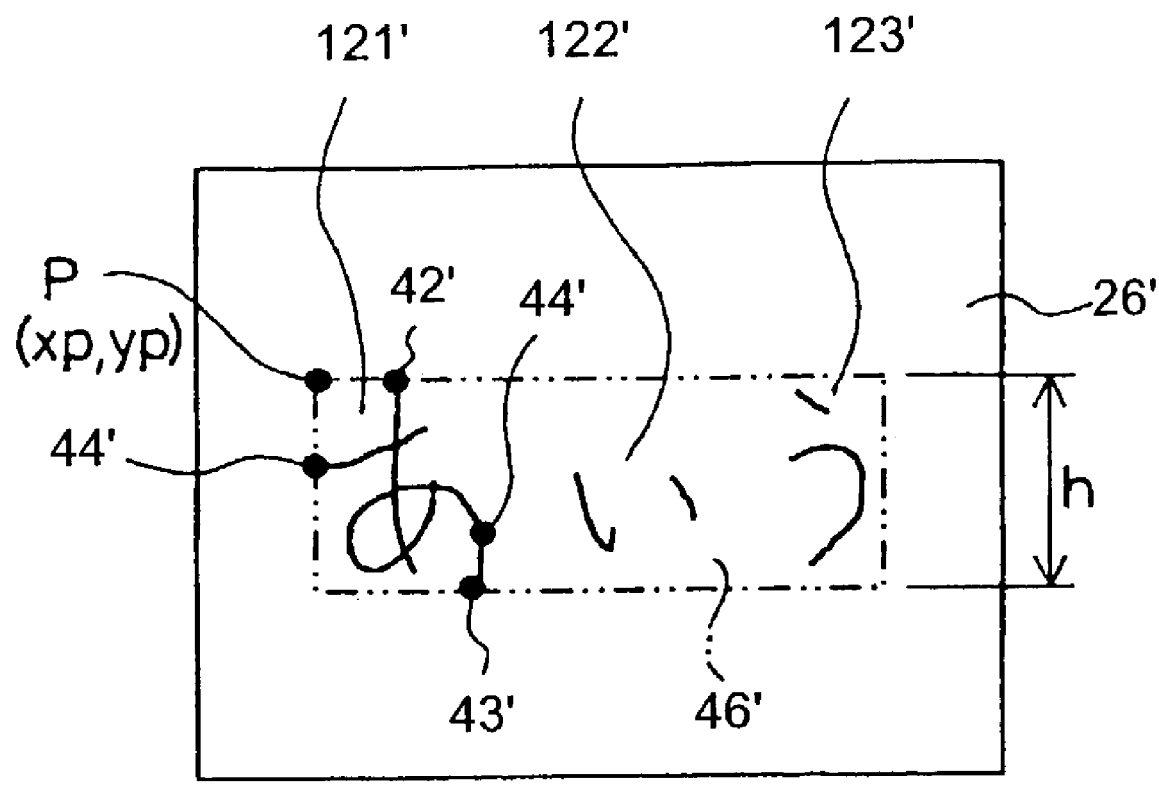
FIG. 20 illustrates how a handwritten character line block region is established;.

Then, based on the coordinates of each of the input points in the input stroke 25' of a handwritten character input, a handwritten character block region 46', indicated by dotted lines in FIG. 20, is calculated and established (step S61'). As shown in FIG. 20, when handwritten characters 121'–123' corresponding to the 'hiragana' characters "あいう" are input to the input region 26', coordinates (xp, yp) of a base point P and the height h of the handwritten character block region 46' for the above handwritten characters 121'–123' ("あいう") are calculated, the handwritten character block region 46' being established based on the coordinates of the uppermost point 42', the lowermost point 43', and the leftmost point 44' of the input strokes of the foremost character 121' ("あ") among the handwritten characters 121'–123'.

The above base point P functions as a reference position for displaying the adapted characters 101'–103' corresponding to the handwritten characters, and the above-obtained height h is a reference for setting the font size of the adapted characters. Specifically, when the font height of the adapted characters is denoted as h and the horizontal to vertical ratio of the above font is denoted as t, the reference coordinate position in displaying the $n^{th}$ adapted character counting from the foremost character is: (xp+(n–1)×t×h, yp).

In accordance with the above calculation method, the font size of the adapted characters corresponding to the handwritten characters is determined (step S63') as well as their display positions (step S64'). The information on the font size and display position of the adapted characters is sent to the recognition-adaptation result memory 11' as font size 11g' and position information 11e'.

In this embodiment, the case in which the handwritten characters 121'–123' are written in a horizontal direction is described; however, it is also-possible to have the handwritten, character 121'–123' written vertically. In the latter case, coordinates (xp, yp) of the base point P and the height h of the handwritten character block region 46' for the above handwritten characters 121'–123' ("あいう") are calculated based on the coordinates of the uppermost point 42', the leftmost point 44', and the rightmost point 45' of the input strokes of the foremost character 121' ("あ").

Upon the determination of the font size and the display position of the adapted characters corresponding to the handwritten characters, the adapted characters having the above determined properties are displayed on the display apparatus $2_2$.

In the above, the configuration of the handwriting information apparatus according to the first embodiment has been described. In the following, the editing operation of the above handwriting information apparatus will be described.

Figure 21:
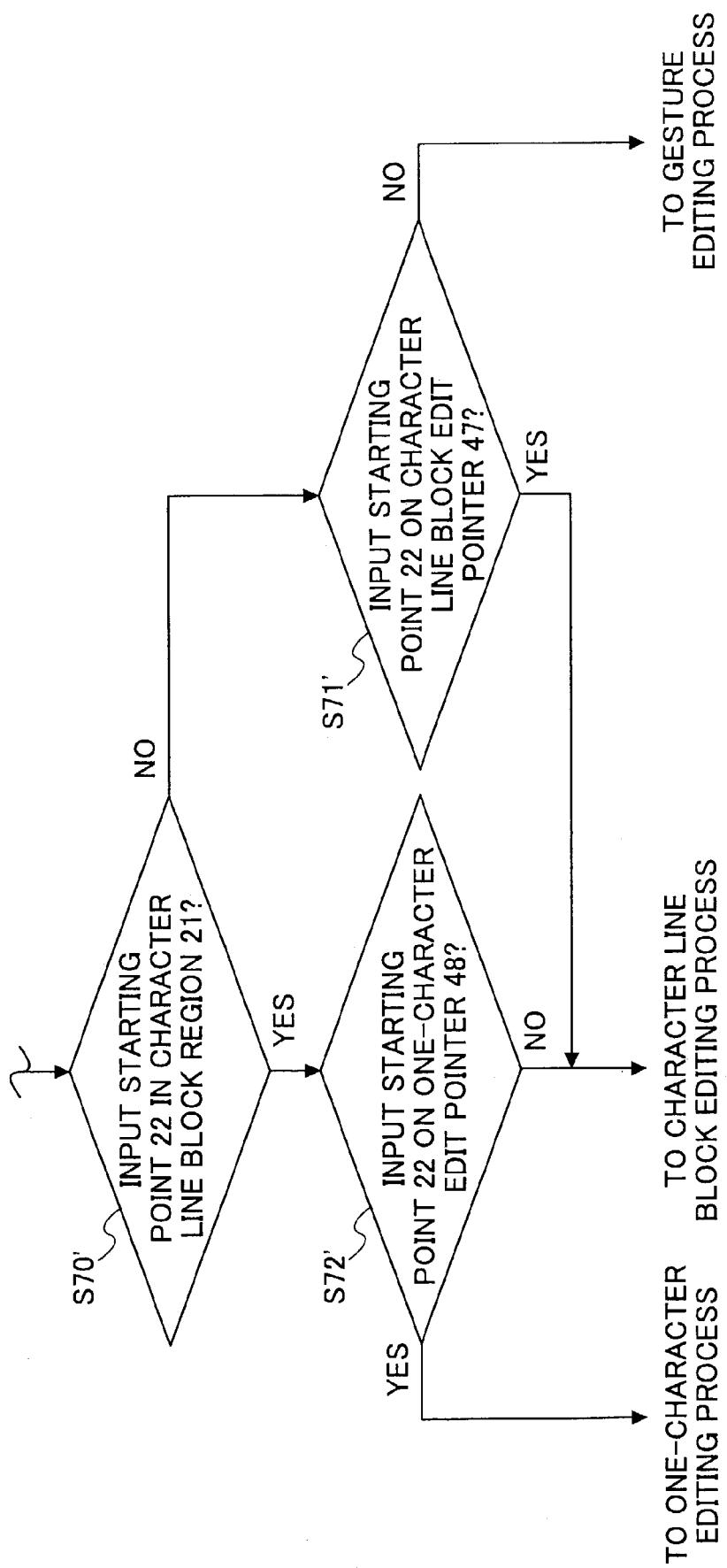
FIG. 21 is a flow chart for illustrating the procedures of an editing process type determination process.

When the input stroke 25' is determined to be an input stroke of an editing operation input, the computer 1 having edit process type determination processing functions determines the type of editing process corresponding to the editing operation input (step S9'). The specific procedures for this edit process type determination process are described below with reference to FIG. 21.

First, it is determined whether or not the input starting point 22' of the input stroke 25' is situated within the character line block region 21' (step S70'), and if the input starting point 22' is not in the character line block region 21', it is determined whether or not the input starting point 22' is on a character line block edit pointer 47' (step S71').

Figure 22:
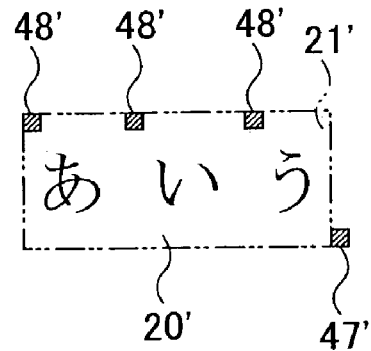
FIG. 22 shows a state in which a one-character edit pointer and a character line block edit pointer are displayed.

Herein, the character line block edit pointer 47' is the small square-shaped area assigned to each character line block and displayed on the display apparatus $2_2$ for performing an editing process on the entire character line block 20' ("あいう"), as shown in FIG. 22. Also, on the display apparatus $2_2$, a one-character edit pointer 48', which is a small square-shaped pointer assigned to each character for performing an editing process on each character, is provided. In the present embodiment, the character line block edit pointer 47' is provided outside the character line block region 21', and the one-character edit pointer 48' is provided within the character line block region 21' for each of the characters. These editing pointers may be displayed at the same time the adapted characters 101'–103' ("あいう") are displayed on the display apparatus $2_2$, or they may be displayed after the character line block 21' is selected with an input pen.

When the input starting point 22' is on the character line block edit pointer 47', it is determined that the editing operation input is for performing an editing process of changing the font size for the entire character line block 20', thereby initiating the character line block editing process. On the other hand, when the input starting point 22' is not on the character line block edit pointer 47', it is determined that the editing operation input is for performing a gesture editing process, thereby initiating the gesture editing process.

When the input starting point 22' is within the character line block region 21', it is further determined whether or not the input starting point 22' is on the one-character edit pointer 48' (step S72'). When the input starting point 22' is on the one-character edit pointer 48', it is determined that the editing process is for one character, thereby initiating a one-character editing process. When the input starting point 22' is not on the one-character edit pointer 48', it is determined that the editing process is for the entire character line block 20', thereby initiating a character line block editing process.

Figure 23:
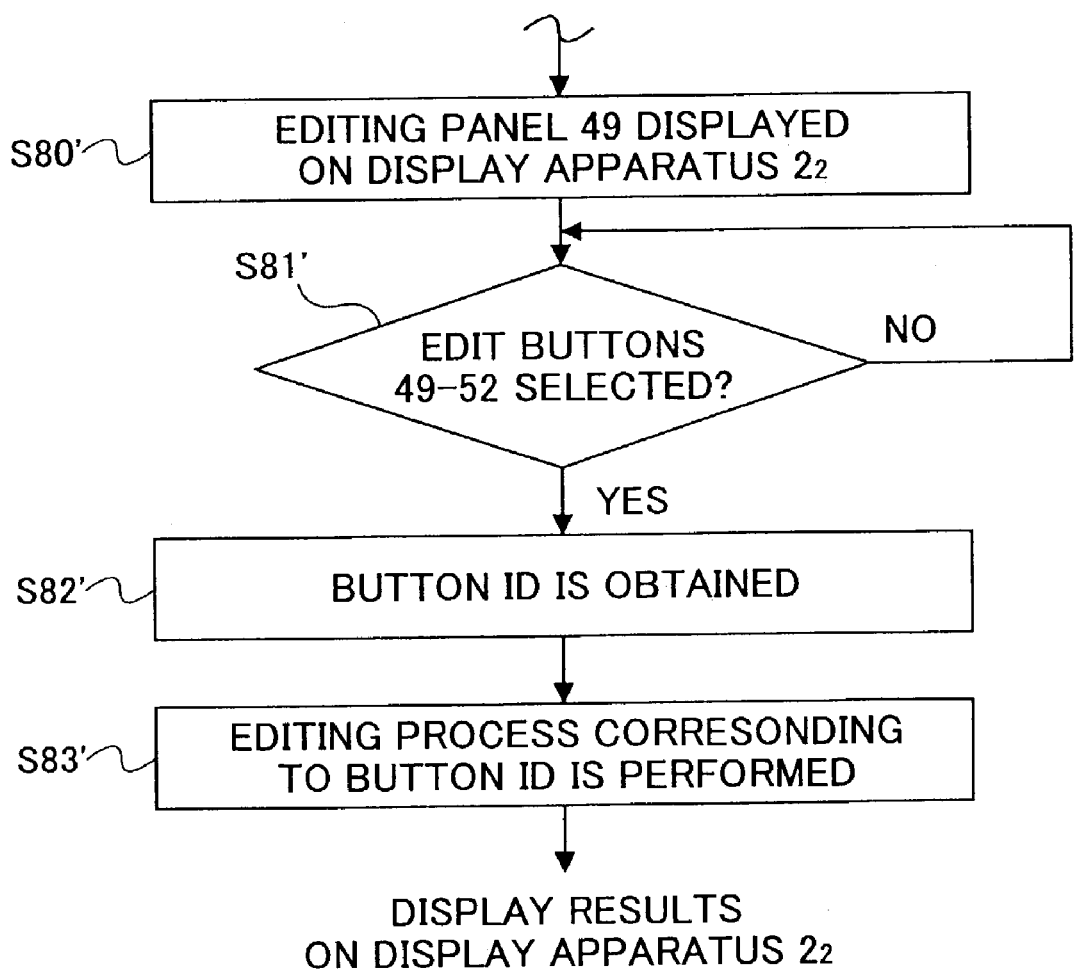
FIG. 23 is a flow chart for illustrating the procedures of a one-character editing process.

In the following, the one-character editing process is described in further detail with reference to FIG. 23.

When the input starting point 22' is on the one-character edit pointer 48', it is determined that the one-character edit pointer 48' has been selected, and the computer 1 having one-character edit processing functions initiates the one-character editing process (step S10') The specific procedures of the above one-character editing process are described below with reference to FIG. 23.

First, with the selection of the one-character edit pointer 48', an editing panel 49' is displayed on the display apparatus $2_2$ (step S80'). For example, referring to FIG. 24, if the user wishes to edit the adapted character 102" ("じ") in the character line block 20' having the adapted characters 101', 102", and 103' ("あじう"), the user may select the one-character edit pointer 48' corresponding to the adapted character 102" ("じ") and in response, the editing panel 49' is displayed in the vicinity of the adapted character ("じ"). At the same time, the-adapted character 102"("じ") is highlighted on the display apparatus $2_2$.

The above editing panel 49' includes a delete button 50', an insert button 51', candidate character buttons 52', and an escape button 53'. An ID is pre-assigned to each of the above buttons. That is, the delete button 50' has a process of deleting a character assigned thereto, the insert button 51' has a process of inserting a space assigned thereto, and the candidate character button 52' has a process of replacing a character with a different candidate character assigned thereto. Data on the above one-character editing processes of the editing panel 49' are linked to their respective button IDs and stored in the edit memory 12'.

Upon the selection of one of the buttons within the editing panel 49' (step S81'), the button ID of the selected button is obtained (step S82'), and an editing process corresponding to the above-obtained button ID is performed (step S83').

For example, when the delete button 50' is selected, the adapted character 102' ("じ") is deleted, as shown in FIG. 25A, and when the insert button 51' is selected, a space 125' is inserted between the adapted character 101' ("あ") and the adapted character 102" ("じ"), as shown in FIG. 25B. Also, when a button corresponding to the code character "ヾ" among the candidate character buttons 52' is selected, the adapted character 102" ("じ") is replaced with the adapted character 102' ("ヾ"), thereby obtaining the character line block 20' with the adapted characters 101', 102', and 103' ("あいう"), as shown in FIG. 25C.

Further, if a new handwritten character 104' ("き") is input to the position where the adapted character 102"("じ") is placed, at the time the editing panel 49' is displayed, the new handwritten character ("き") is recognized and adapted via the respective processes and the adapted character 102" ("じ") is deleted to obtain the adapted characters 101', 104', and 103' ("あきう") in the character line block 20', as shown in FIG. 25D. The escape button is a button for canceling the one-character editing process, and the editing panel 49' disappears upon pressing this button.

When the one-character editing process is performed, the editing result is reflected and displayed on the display apparatus 2₂.

Next, the character line block editing process is described with reference to FIG. 26.

Figure 26:
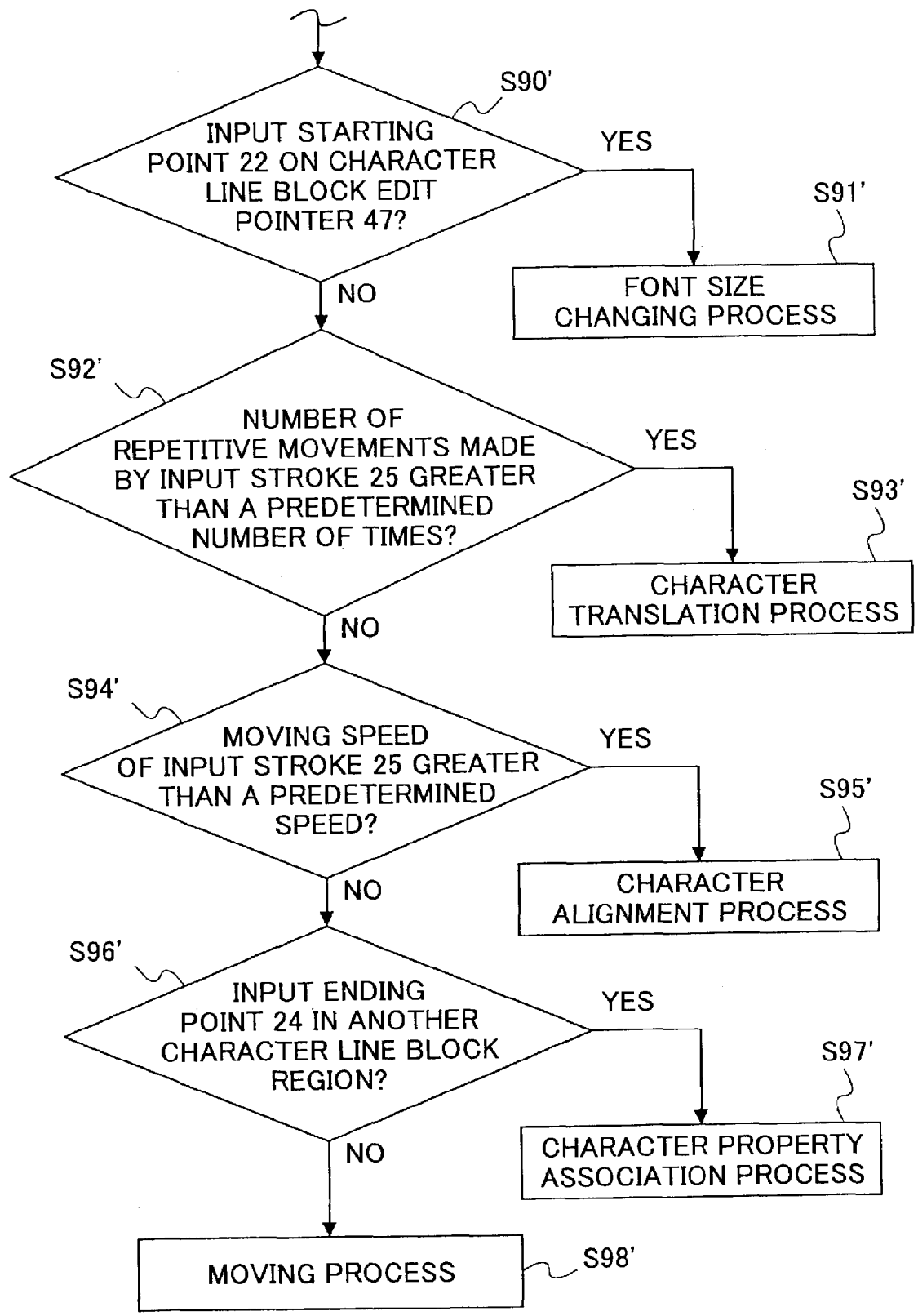
FIG. 26 is a flow chart for illustrating the procedures of a character line block editing process.

As shown in FIG. 26, when the computer 1 having character line block edit processing functions initiates the character line block editing process (step S11'), it is first determined whether or not the input starting point 22' of the input stroke 25' is on the character line block edit pointer 47' (step S90') If the input starting point 22' is on the character line block edit pointer 47', it is determined that the editing process is a font size changing process for the entire character line block (step S91').

Figure 27:
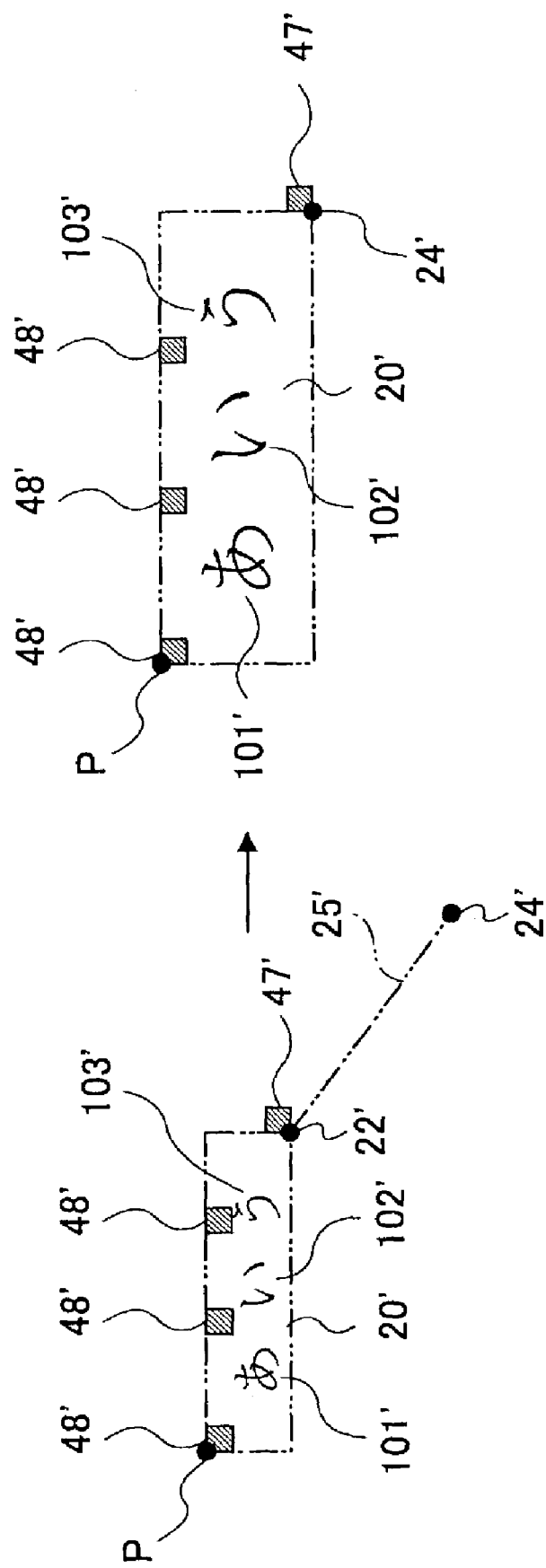
FIG. 27 is a diagram for illustrating a font size changing process in the character line block.

The above font size changing process is a process of changing the font size of the adapted characters in the character line block 20' based on the moving direction and the moving distance of the input stroke 25' passing through the input points from the input starting point 22' to the input ending point 24'. For example, as shown in FIG. 27, when the input stroke 25' starting at the character line block edit pointer 47' of the character line block 20' having the adapted characters 101'–103' ("あいう") moves diagonally in an lower-right direction to end at the input ending point 24', the font size of the adapted characters 101'–103' ("あいう") in the character line block 20' is enlarged with base point P as the pivot.

In this case, the font size of the adapted characters 101'–103' ("あいう") in the character line block 20' may be changed while maintaining the horizontal-to-vertical ratio of the character line block 20', by making the change based on only one of either the moving distance in the left-to-right direction or the moving distance in the up-down direction of the input stroke 25'. Alternatively, the font size of the adapted characters 101'–103' ("あいう") in the character line block 20' may be changed by considering both the moving distance in the left-to-right direction and the moving distance in the up-down direction of the input stroke 25' so that the horizontal-to-vertical ratio of the character line block 20' is also changed.

In the case where the input starting point 22' is not on the character line block edit pointer 47', it is determined whether or not the number of repetitive movements in a predetermined direction made by the input stroke 25' exceeds a predetermined number of times (step S92'). If the number of repetitive movements in a predetermined direction made by the input stroke 25' exceeds the predetermined number of times, the character translation process is performed (step S93').

The above character translation process is a process of indicating a translation of a word/phrase represented by the characters in the character line block 20'. For example, in FIG. 9, adapted characters 106' and 107' making up the word "翻訳" are shown in the character line block 20', and when the input stroke 25' makes repetitive movements in a left-to-right direction for a predetermined number of times in the character line block region 21', reference is made to the Japanese-English dictionary data 19' in the hard disk 8' and an English translation 56 ("Translation") of the word "翻訳" is displayed on the display apparatus 2₂.

Alternatively, in a case where alphabets are input to the input region 26', and are recognized and adapted into adapted characters of the alphabet, and an English word/phrase formed by the characters is displayed in the character line block 20', the above-described character translation process may be a process of referring to the English-Japanese dictionary data and indicating a Japanese translation of the above English word/phrase. Also, as shown in FIG. 10, the above character translation process may be a process of indicating the meaning of the word formed by the adapted characters 106' and 107' ("翻訳") shown in the character line block 20' using the Japanese dictionary data.

As the criteria for starting the character translation process, the predetermined number of repetitive movements may be set to 3–6 times, for example, so that it can be ascertained that the above repetitive movement is an intentional move by the user but the repetition will not impose a significant burden. In this embodiment, the direction of the repetitive movement is in a left-to-right direction; however, this can also be in an up-down direction, or different character translation processes may be assigned to each of the left-to-right direction movement and the up-down direction movement, respectively.

Additionally, other various processes may be assigned to different repetitive movements of over a predetermined number of times in a predetermined direction made by the input stroke 25' such as a process of displaying 'rubi' characters or a process of displaying an explanation of a coined term, and the like.

If the number of repetitive movements of the input stroke 25' is below the predetermined number of times, it is determined whether or not the moving speed of the input stroke 25' is greater than a predetermined speed (step S94'), and if the moving speed of the input stroke 25' is greater than a predetermined speed, the character alignment process is performed (step S95') This character alignment process is a process of aligning the adapted characters to the edge of the display apparatus 2₂ according to the moving direction of the input stroke 25'.

For example, in FIG. 8A, the character line block 20' containing the characters "あいうえお" is displayed around the center of the display apparatus 2₂, and when the input stroke 25' is input from within the character line block region 21' to the left at a faster speed than the predetermined speed, the character line block 20' is indented to the left side of the input region 26' of the display apparatus 2₂, as shown in FIG. 8B. At the same time, the adapted characters in the character line block 20' are rearranged closer together for a more presentable appearance.

When the moving direction of the above input stroke 25' is to the right, the character line block 20' is indented to the right side of the input region 26' of the display apparatus 2₂, as shown in FIG. 8C. At the same time, the adapted characters in the character line block 20' are assigned equal spacing for a more presentable appearance. Alternatively, when the input stroke 25' moves up or down, the character line block 20' can be moved to the upper edge or bottom edge of the input region 26', respectively.

When the moving speed of the input stroke 25' is below the predetermined speed, it is determined whether or not the input ending point 24' of the input stroke 25' is in the region of another character line block (step S96'). If the input ending point 24' of the input stroke 25' is in the region of another character line block, the character property association process is performed.

The above character property association process is the process of associating the properties of the adapted characters in different character line blocks that are displayed on the display apparatus $2_2$.

For example, in FIG. 11, the input starting point 22' of the input stroke 25' is within the character line block region 21' of the character line block 20', and the input ending point 24' is in the character line block region 39'' of the character line block 39'. Thus, the font size and the character spacing of the adapted characters "かきく" in the character line block 20' are associated with and made to conform to the font size and character spacing of the adapted character "あいう" in the character line block 39', and the adapted characters "あいう" and "かきく" are displayed in the same font size and with the same character spacing.

In the present embodiment, the character property association process corresponds to the process of causing the conforming of the font size and character spacing; however, this may be a process of causing the conforming of the font type, font color, or other character properties. Also, this process is not limited to causing the conforming of the properties; thus, in the above example, the adapted characters in the character line block 20' may be arranged to have a font size that is half the size of the font of the adapted characters in the character line block 39'.

If the input ending point 24' of the input stroke 25' is not in the region of another character line block, the moving process is performed. This moving process corresponds to a process of moving the entire character line block to the moving direction of the input stroke 25'.

For example, with reference to FIG. 28, when the input stroke 25' starts from within the character line block region 21' and ends at a predetermined point in the input region 26' that is outside of another character line block region, the character line block 20' is moved along the path of the input stroke 25' from the input starting point 22' to the input ending point 24'.

When the above character line block editing process is performed, the editing results are reflected and displayed on the display apparatus $2_2$.

In the following, the gesture editing process is described in further detail with reference to FIGS. 12 and 29.

When the input starting point 22' of the input stroke is neither in the character line block region 21' nor on the character line block edit pointer 47', the computer 1 having gesture edit processing functions initiates the gesture editing process (step S12').

The above gesture editing process is for performing various editing processes on the adapted characters based on the input form of the input stroke 25'. As mentioned earlier, if none of the input points of the input stroke 25' from the input starting point 22' to the input ending point 24' is within the character line block region 21', then this input stroke 25' is determined to be a handwritten character input. Thus, in order for the gesture editing process to be initiated, at least one input point of the input stroke 25' needs to be in the character line block region 21'. For example, an input stroke 25' that starts from outside the character line block region 21' and ends at a point in the character line block region 21', or an input stroke 25' that starts from outside the character line block region 21', enters the character line block region 21', and ends at a point outside the character line block region 21' both fit into the above case.

Figure 29:
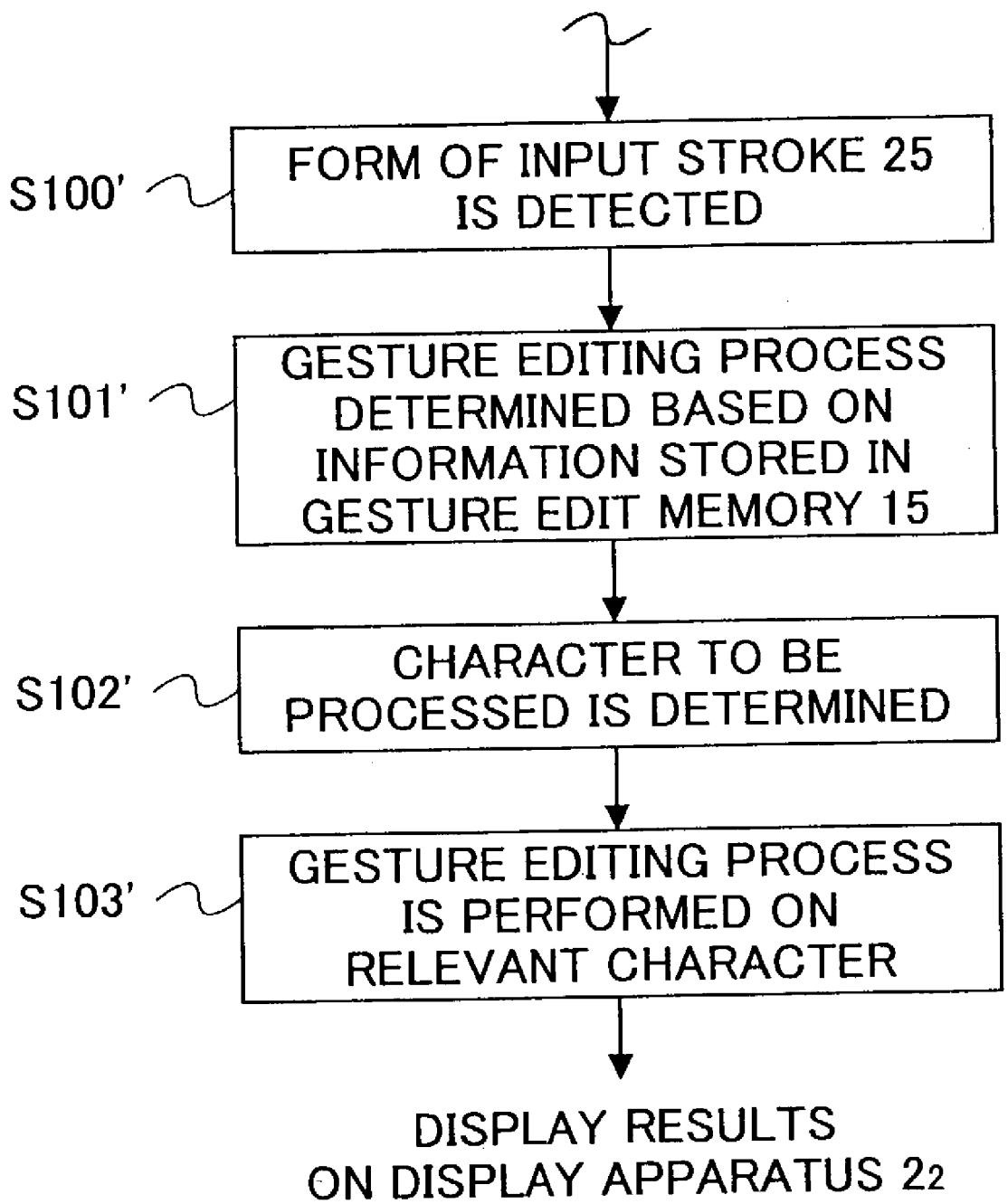
FIG. 29 is a flow chart for illustrating the procedures of a gesture editing process.

As shown in FIG. 29, when the gesture editing process is initiated, first of all, the shape of the input stroke is identified (step S100'). In the gesture edit memory 15' of the hard disk 8', data on the gesture editing processes assigned to the respective shapes (forms) of the input stroke are stored. For example, an input stroke in the form of slashing across the characters from right to left corresponds to a deletion process on the slashed characters. Also, an input stroke in the form of encircling a character corresponds to a process of changing the font color of the circled character.

The input form of the input stroke 25' is identified based on the information stored in the gesture edit memory 15'; in turn, the gesture editing process is determined according to the form of the input stroke 25' (step S101'). At the same time, the character on which the editing process is performed is also determined based on the form of the input stroke 25' (step S102').

For example, as shown in FIG. 12A, when a gesture input 54', which is the input stroke 25' in the form of slashing across the adapted characters 111' and 112' ("えお") in a right-to-left direction, is made on the character line block 20' made up of the adapted characters 108'–112' ("あいうえお"), the adapted characters 111' and 112' ("えお") are deleted by the gesture editing process and the displayed characters in the character line block 20' will be the adapted characters 108'–110' ("あい う").

Also, as shown in FIG. 12B, when a gesture input 55' of encircling the adapted characters 110' and 111' ("うえ") in the character line block 20' made up of the adapted characters 108'–112' ("あいうえお") is made, the font color of the adapted characters 110' and 111' ("うえ") will be changed by the gesture editing process.

In this way, the gesture editing process is performed on the respective character based on the input form of the input stroke 25' (step S103'). When the gesture editing process is performed, the edit results are reflected and displayed on the display apparatus $2_2$.

The components of each of the one-character editing process, the character line block editing process, and the gesture editing process and the allocation of the input operations to the respective editing processes are not limited to the above-described embodiment and various changes and modifications are possible as long as the components of each of the editing processes and the respective editing operation inputs are allocated beforehand and stored in the panel edit memory 12', the character line block edit memory 14', the gesture edit memory 15', and the like.

Now, referring back to FIG. 1, a description of a handwriting information processing apparatus according to a second embodiment of the present invention will be given.

According to this embodiment, the coordinate input apparatus $2_1$ of FIG. 1 is an apparatus that detects a signal input thereto as a coordinate value, the signal being input by an operator (user) 3 using an indication part $3_1$ such as a finger or a pen. The coordinate input apparatus $2_1$ then sends this information to the computer 1. The computer 1 stores all the information on the collective set of coordinate values (referred to as 'stroke' hereinafter) sent from the coordinate input apparatus $2_1$, performs character recognition in a batch upon receiving instructions to perform the handwritten character recognition from the user (operator) 3, and displays the obtained processing results on the display apparatus $2_2$.

Figure 30:
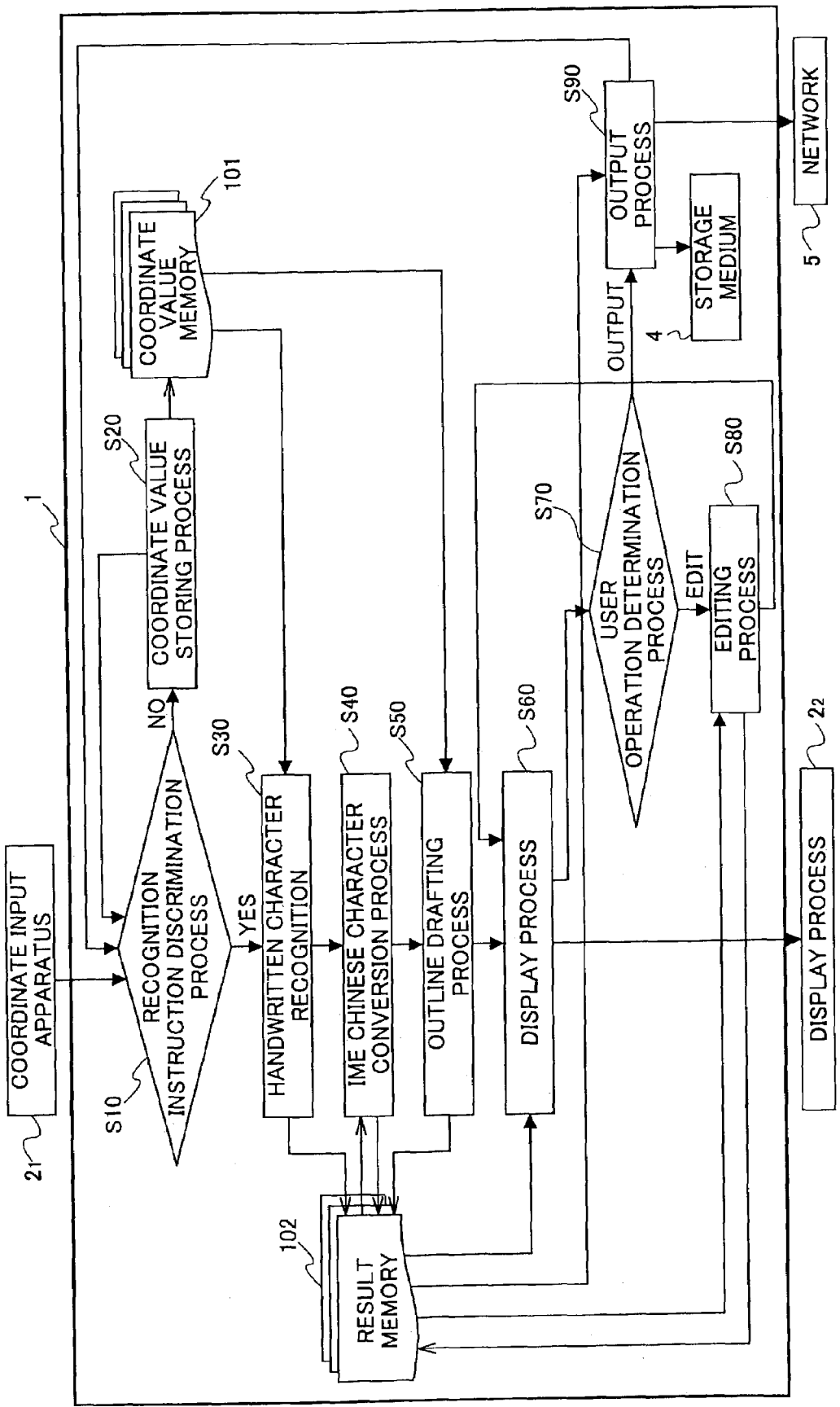
FIG. 30 is a flow chart for illustrating the handwriting information processing apparatus according to a second embodiment of the present invention.

FIG. 30 is a flow chart of a handwriting information processing apparatus according to the second embodiment of the present invention.

Referring to FIG. 30, the coordinate input apparatus $2_1$ and the display apparatus $2_2$ make up the handwriting input/display apparatus 2 shown in FIG. 1, and the process illustrated in between the two blocks $2_1$ and $2_2$ in FIG. 30 is performed in the computer 1 (referred to as 'PC 1' hereinafter).

First, in a recognition instruction discrimination process, it is determined whether or not an instruction to perform a recognition process on the coordinate values output from the coordinate input apparatus $2_1$ is sent by the user (step S10) When the recognition instruction is not detected (step S10-No), the coordinate values input to the handwriting input region are stored in the coordinate value memory 101 by a coordinate value storing process (step S20) after which the process goes back to step S10 where the monitoring for a recognition instruction from the user is continued. When a recognition instruction is detected (step S10-Yes), the handwritten character recognition process is performed by referring to the coordinate values memory 101, and character strings obtained from this process are stored in the result memory 102 (step S30).

Then, an IME (Input Method Editor) Chinese character conversion is performed by referring to the result memory 102, wherein the character strings obtained from the handwritten character recognition process are converted into Chinese characters, and the results of this process are stored in the result memory 102 (step S40).

Further, an outline drafting process is performed wherein information on the positions in which the handwritten characters are written is obtained by referring to the coordinate values memory 101, and an indent position is calculated from the positions of the character strings and stored in the result memory 102 (step S50).

Next, a display process is performed by referring to the result memory 102, wherein the results of the process are output to the display apparatus $2_2$ (step S60), and at the same time, a user operation determination process is initiated (step S70). The user operation determination process of step S70 is a process of determining the reaction of the user to the results displayed on the display apparatus $2_2$ in the display process of step S60. After the user operation determination process of step S70, the process in the PC 1 can go in two different directions. In one case the user edits the displayed results (step S70-Edit). For example, the editing can be a correction of the indent position obtained from the outline drafting process of step S50. Thereby, in step S80, an editing operation is performed within an editing process by referring to the result memory 102, and the results are output to the display process of step S60. In the other case, the user outputs the displayed results (step S70-Output). The outputting of the results is performed within an outputting process by referring to the result memory 102, wherein the data organized in a predetermined format are output to a storage medium 4 such as a hard disk or an optical disk, or the data with an address and a title entered thereto are output to a network 5 as mail for transmission and the like (step S90)

After the outputting process of step S90 is completed, the process goes back to the recognition instruction discrimination process of step 10, so that handwritten characters can be newly input to the handwriting input/display apparatus 2.

In the following, each of the steps shown in FIG. 30 is described in further detail.

First, the recognition instruction discrimination process will be described.

Figure 31:
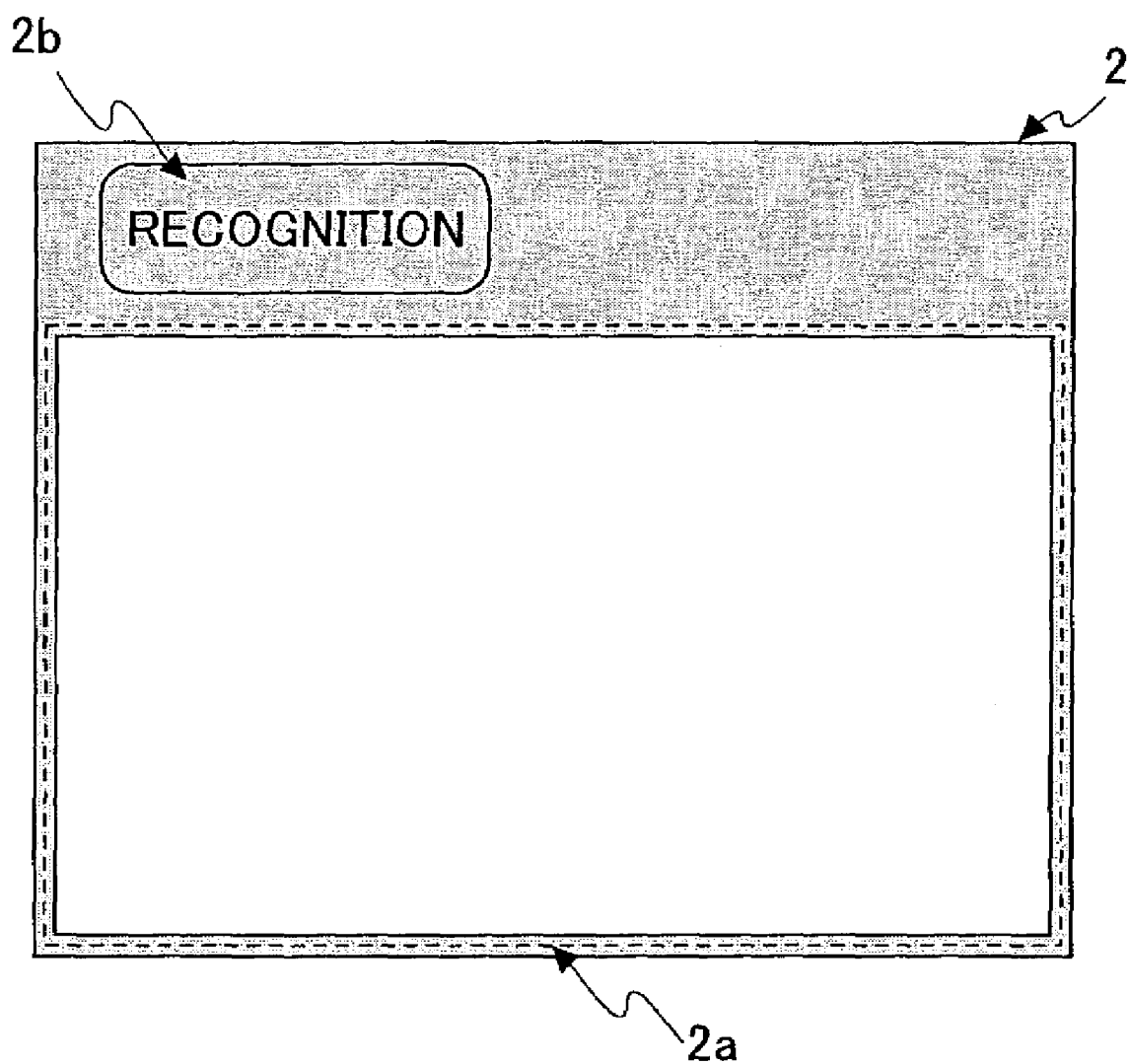
FIG. 31 is a diagram showing a screen display of the handwriting information processing apparatus according to the second embodiment when the recognition instruction discrimination process is performed.

FIG. 31 shows an example of the state of the handwriting input screen of the display apparatus $2_2$ when the recognition instruction discrimination process is to be performed.

As shown in FIG. 31, the handwriting input screen 2 is prepared, wherein a part of the handwriting input screen 2 surrounded by a dotted line is the region in which handwriting is input (handwriting input region 2a), and a recognition button is provided above the handwriting input region 2a. By monitoring the position of the user's input to the handwriting input screen 2, it is possible to determine whether or not the user has initiated a recognition process. The output of the recognition instruction discrimination process of step S10 can go in two different directions. In one case, the user inputs handwritten characters to the handwriting input region 2a, and the process moves onto step S20 wherein a coordinate value storing process is performed. In the other case, the user pushes the recognition button 2b at a discretionary timing, and the process moves onto step S30 wherein the handwritten character recognition process is performed.

Next, the coordinate value storing process, which is the first one of the output destinations for the recognition instruction discrimination process, will be described.

Figure 32:
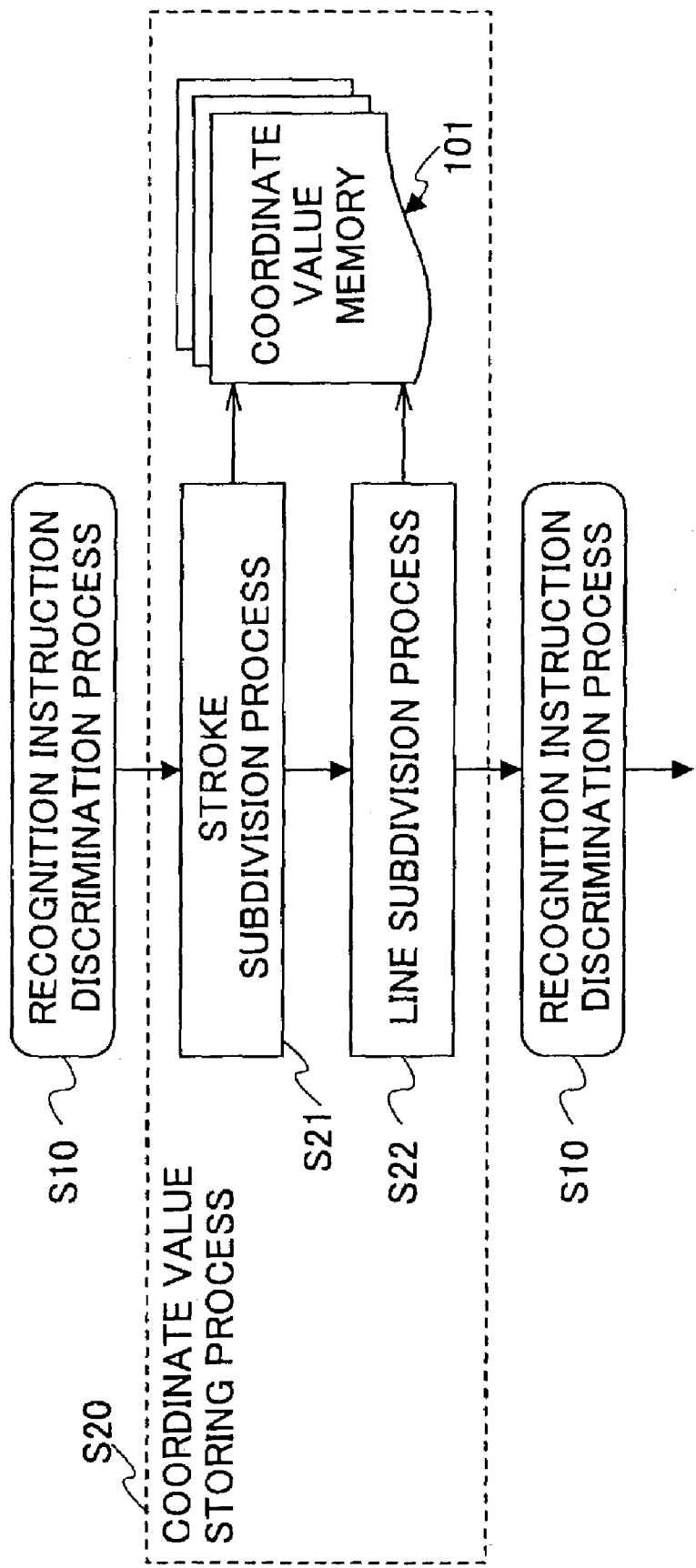
FIG. 32 is a flow chart for illustrating a coordinate value storing process.

FIG. 32 is a flow chart for illustrating the coordinate value storing process.

First, as shown in FIG. 32, the coordinate values of the handwritten characters input to the handwriting input region 2a by the user are subdivided into each stroke unit by a stroke subdividing process, the results therefrom being stored in the coordinate value memory 101 (step S21). For example, the user's touching the coordinate input apparatus $2_1$ of the handwriting input/display apparatus 2 corresponds to clicking the left button of a mouse. In an operating system such as Windows (registered trademark), the messages MouseDown, MouseMove, MouseUp are assigned to the left-click operation. The coordinate input apparatus $2_1$ of the handwriting input/display apparatus 2 instructs the operating system to generate these messages for each detection of a coordinate value. Note that the above-described stroke is a collection of coordinate values detected from a MouseDown point to a MouseUp point.

Next, a line subdivision process is performed wherein an inquiry is made to determine which of the strokes belong to one particular line, the results of this process being stored in the coordinate value memory 101 (step S22).

Finally, the process is moved back to the recognition instruction discrimination process of step S10. Thereby, the coordinate value storing process of step S20 runs in a loop until a recognition instruction is made by the user.

Figure 33:
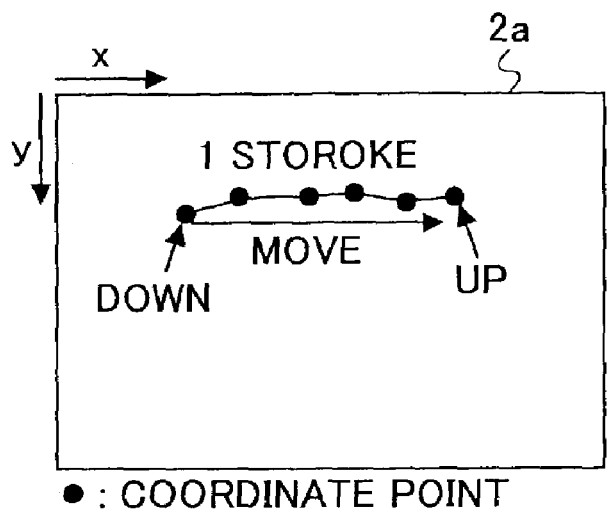
FIG. 33 is a diagram for illustrating a stroke subdivision process.

FIG. 33 is a diagram for illustrating the stroke subdivision process.

The stroke subdivision process of step 21 included in the above-described coordinate value storing process of step S20 is a process of storing a collective set of coordinate values belonging to one stroke of a character in the coordinate value memory 101, the above-described one stroke being the coordinate values detected from the point where the user touches the handwriting input region 2a with the indicating part $3_1$ to move it along the surface of the handwriting input region 2a until the point where the user leaves off, as shown in FIG. 33.

Figure 34:
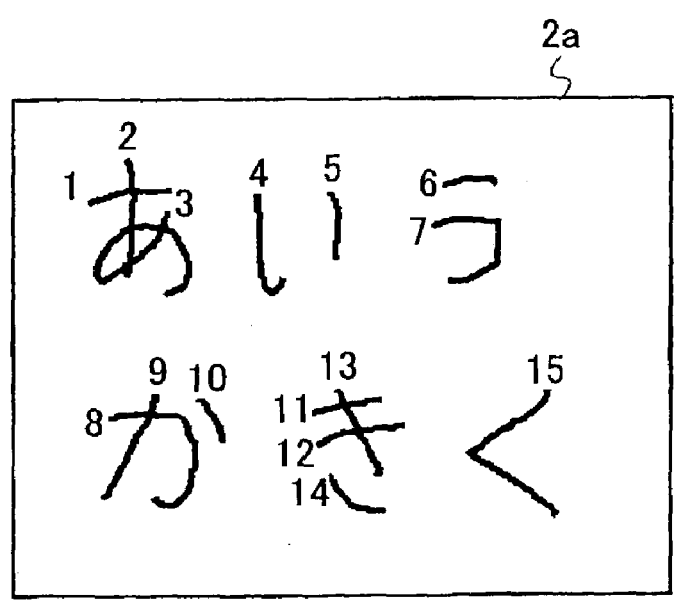
FIG. 34 is a diagram for illustrating a line subdivision process.

FIG. 34 is a diagram for illustrating the line subdivision process.

For example, it is supposed that in the first line of the handwriting input region 2a a character string "あいう" is written, and in the second line, a character string "かきく" is written, as shown in FIG. 34. When these character strings are subdivided into their respective lines, the character string "あいう" in the first line contains the first to seventh strokes, and the character string "かきく" in the second line contains the eighth stroke to the fifteenth stroke.

FIG. 35 is a diagram for illustrating the operation of the line subdivision process.

Figure 35A:
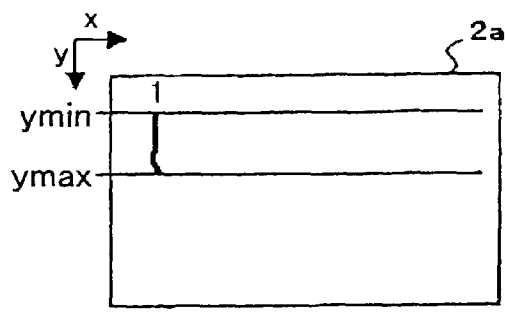
FIGS. 35A, 35B, 35B', 35C, and 35C' are diagrams for illustrating the operation of the line subdivision process.
Figure 35B:
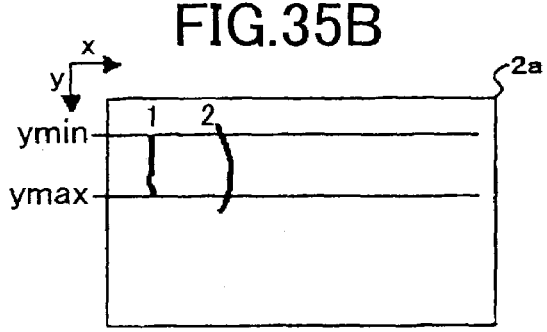
Figure 35C:
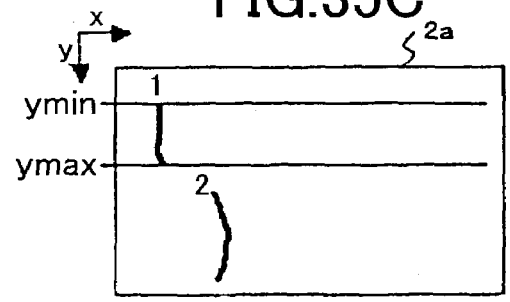
Figure 35B:
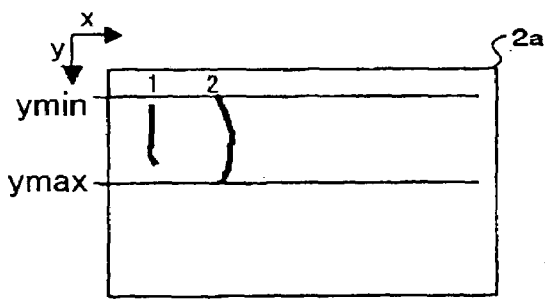
Figure 35C:
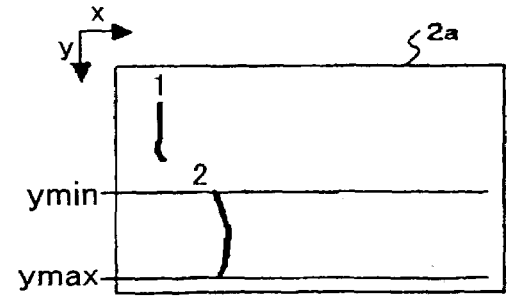

The above-described line subdivision process of step S22 is performed in the following manner. First, a stroke 1 is drawn in the handwriting input region 2a, and a maximum value ymax and a minimum value ymin of the y coordinates corresponding to the coordinate values that belong to the stroke 1 are obtained, as shown in FIG. 35A. Then, a second stroke 2 is drawn, and when there is at least one coordinate point belonging to the stroke 2 that has a y coordinate value that is within the maximum value ymax and the minimum value ymin, as shown in FIG. 35B, the stroke 2 is regarded as being in the same line as stroke 1. Consequently, the maximum value ymax and the minimum value ymin are recalculated, as shown in FIG. 35B' and information on the line is stored in the coordinate value memory 101. On the other hand, when there is no point belonging to the stroke 2 that has a y coordinate value that is within the maximum value ymax and the minimum value ymin, as shown in FIG. 35C, the stroke 2 is regarded as the beginning of a new line. Consequently, the maximum value ymax and the minimum value ymin are newly calculated for the stroke 2, as shown in FIG. 35C' and a new line number is stored in the coordinate value memory 101.

Figure 36:
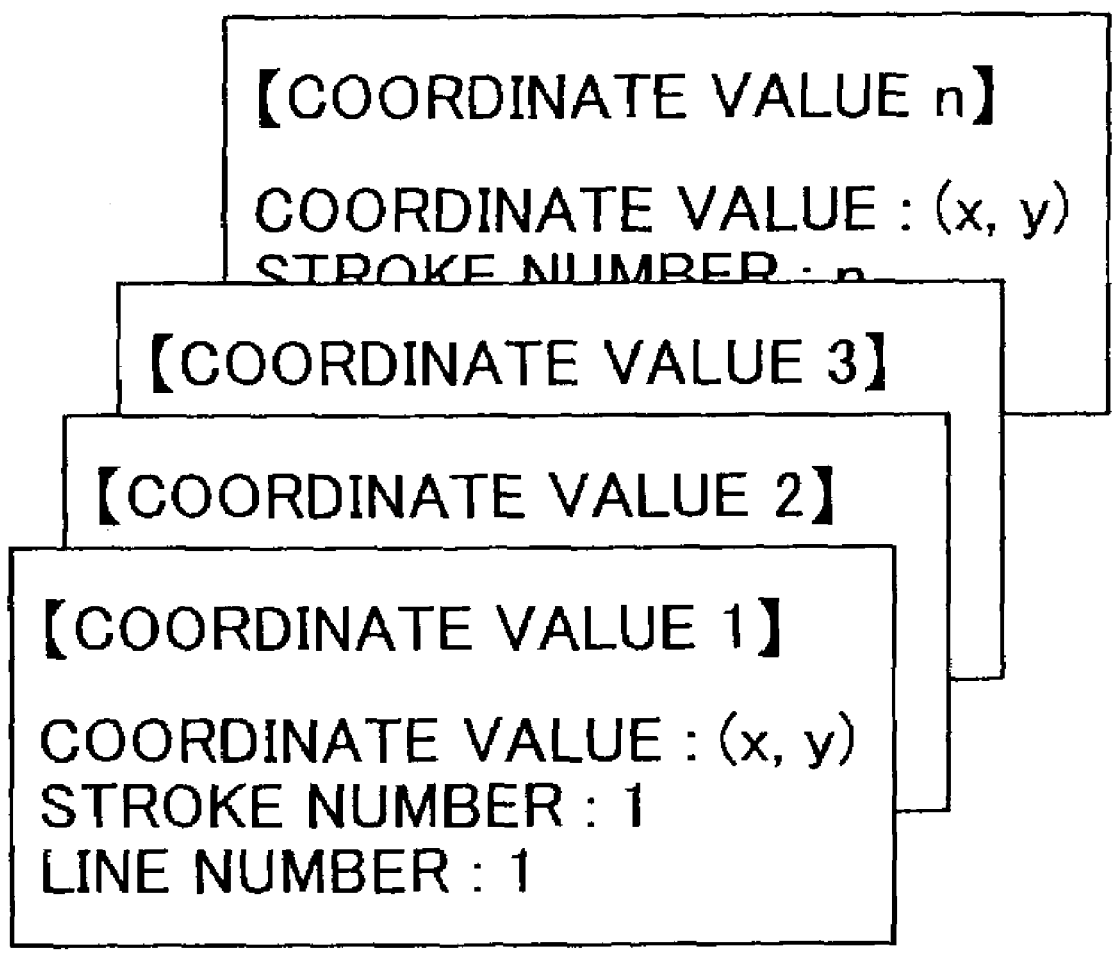
FIG. 36 is a diagram showing an example of the coordinate value, the stroke information, and the line information stored in a coordinate value memory as a result of a coordinate value storing process.

FIG. 36 is a diagram showing an example of the coordinate value, the stroke information, and the line information stored in the coordinate value memory as a result of the coordinate value storing process.

The information to be stored in the coordinate value memory 101 as a result of the process of step S21 and step S22 includes a coordinate value (x, y), the stroke number, and a line number for each coordinate point, as shown in FIG. 36.

Next, the handwritten character recognition process, which is the second one of the output destinations for the recognition instruction discrimination process, will be described.

Figure 37:
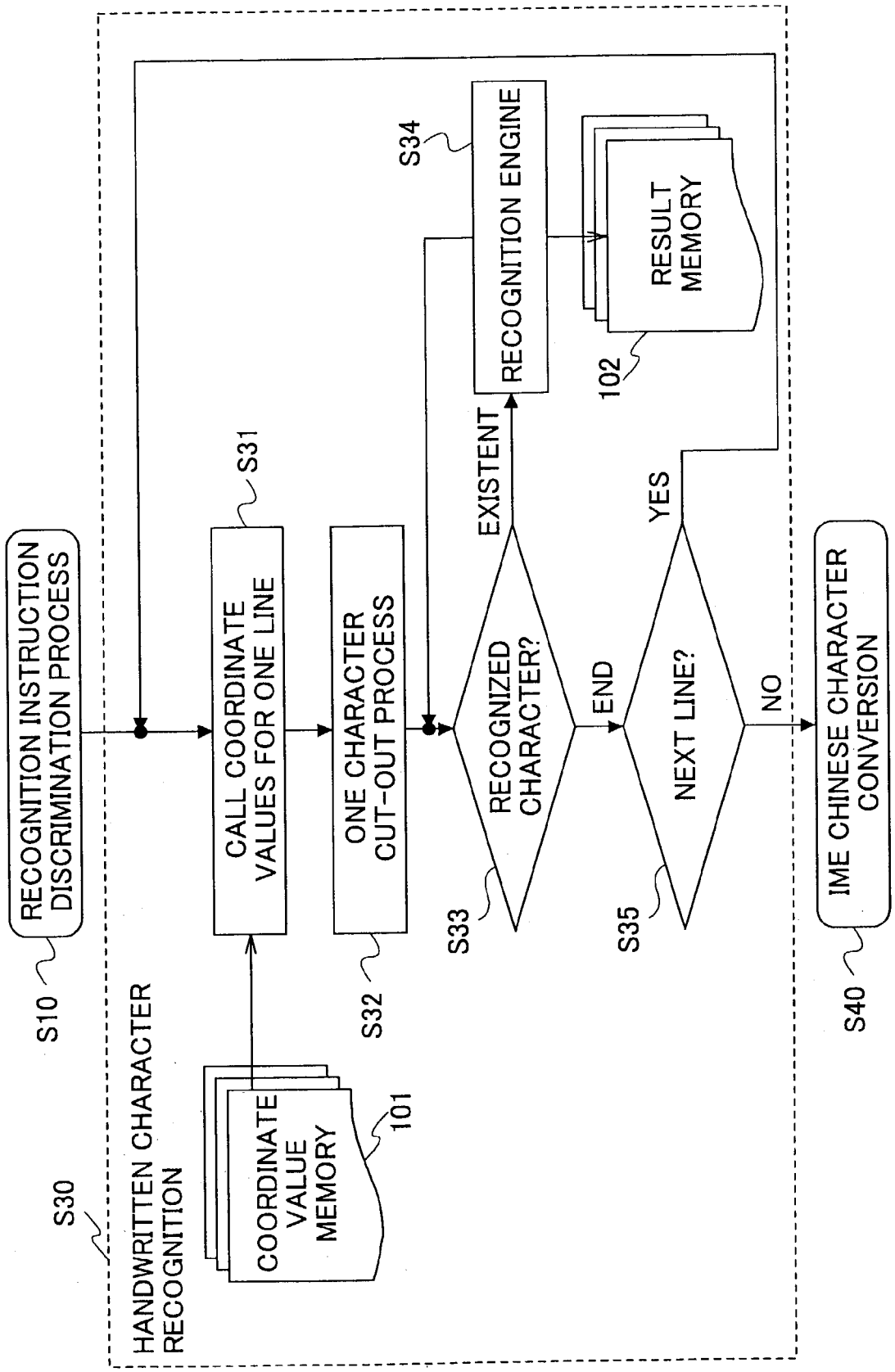
FIG. 37 is a flow chart illustrating a handwritten character recognition process.

FIG. 37 is a flow chart illustrating the handwritten character recognition process, which is described in detail below.

First, referring to the coordinate value memory 101, the coordinate values of one line are called (step S31). Then, a process of cutting out each one of the characters is performed on the coordinate values that have been called (step S32). There are various methods for the above process of cutting out each one of the characters, and any method can be used for this process. The process of cutting out each one of the characters is performed in step S32 in order to determine which of the strokes constitute a character.

Next, a determination of whether or not there is a character to be recognized is made (step S33), and when a character to be recognized does exist (step S33-Yes), then the coordinate values cut out for each of the characters are sent to a recognition engine. The character codes recognized in the recognition engine are stored in the result memory 102 for each line number (step S34). There are also numerous configurations of the recognition engine, and again, any type of recognition engine can be used in this embodiment.

Subsequently, the process is moved back to step S33 where it is determined whether or not a character to be recognized still exists, and when a character to be recognized does exist (step S33-Yes), this is sent to the recognition engine. When a character that is to be recognized does not exist (step S33-No), it is determined whether or not a line to be determined still exists (step S35). When the line does exist (step S35-Yes), the process goes back to step S31 wherein a process of calling the coordinate values of one line is performed and the above-described processes in the steps S31-S35 are repeated. When such a line does not exist (step S35-No), the process moves on to a IME Chinese character conversion process of step S40.

Figure 38:
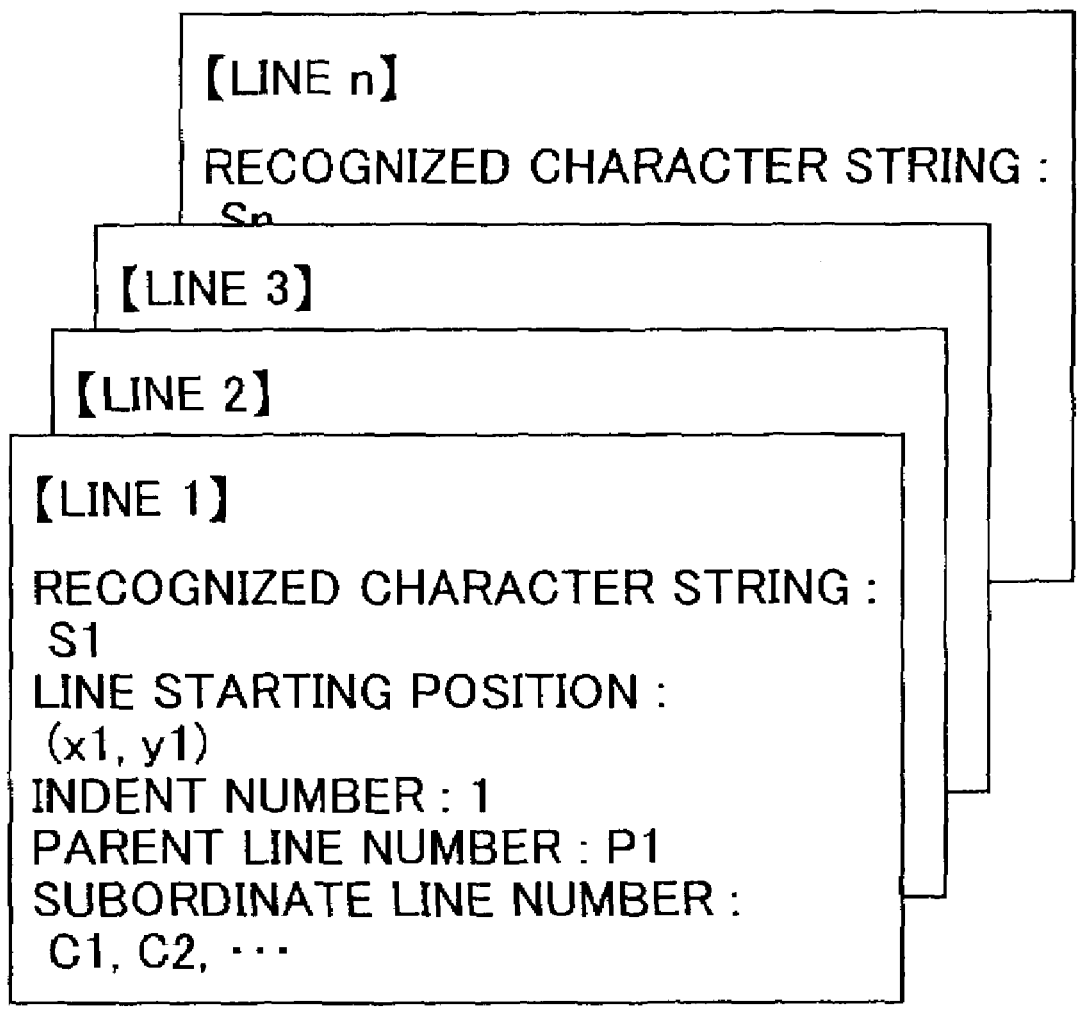
FIG. 38 is a diagram showing an example of the information stored in a result memory as a result of a handwritten character recognition process.

FIG. 38 is diagram showing an example of the information stored in the result memory as a result of the handwritten character recognition process.

The information stored in the result memory 102 as a result of the above-described processes of the steps S31–S35 is of the recognized character strings for each line. In the result memory 102, indent information including a line starting position, an indent number, a parent line number, and a subordinate line number, is also stored; however, the description thereof is given later in the description of the outline drafting process.

Next, a description of the IME Chinese character conversion process following the handwritten character recognition process is given.

Figure 39:
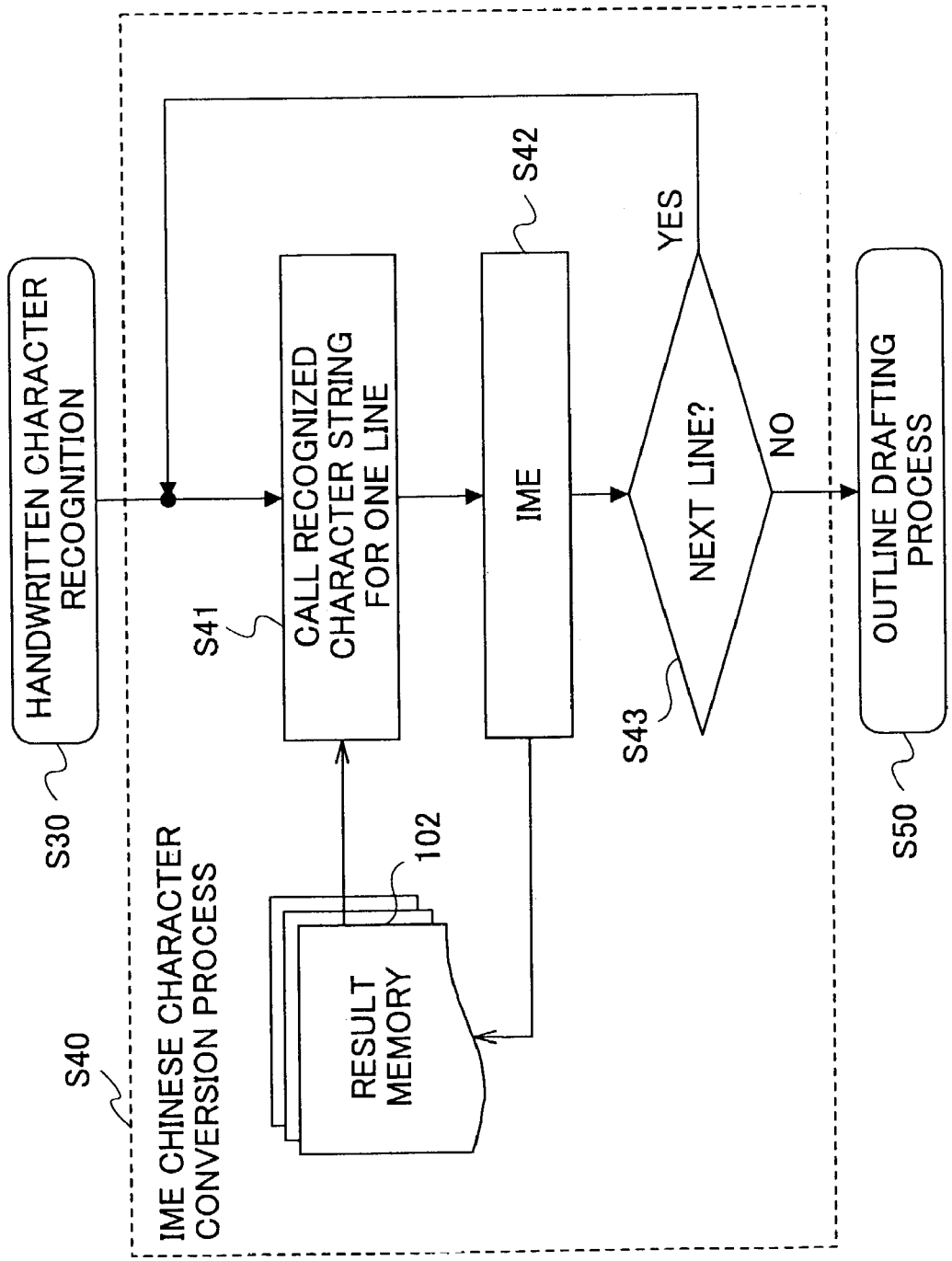
FIG. 39 is a flow chart for illustrating an IME Chinese character conversion process.

FIG. 39 is a flow chart for illustrating the IME Chinese character conversion process, which is described in detail below.

Upon receiving the process after the determination of whether or not a next line exists in step S35 of the above-described handwritten character recognition process of step S30, the recognized character string of one line is called by referring to the result memory 102 (step S41). As shown in FIG. 38, the recognized character strings are stored in the result memory 102 for each line, and thus, the above calling process of step S41 can be easily performed.

The called recognized character string is sent to an IME (Input Method Editor) such as MS-IME or ATOK. Consequently, the IME sends back the Chinese character converted results of the recognized character string, so that this result can be written onto the recognized character string stored in the result memory 102 (step S42). Alternatively, the result memory 102 may secure a region for storing the IME Chinese character-converted character string.

Subsequently, it is determined whether or not a next line exists in the result memory 102 (step S43), and when a next line does exist (step S43-Yes), the process goes back to the process of calling the recognized character string of one line. When the next line does not exist (step S43-No), the process moves on to the outline drafting process of step S50.

In this way, handwriting information can be stored as the stroke information and the line information and can be batch processed for recognition at an arbitrary timing chosen by the user rather than progressively converting the handwritten characters into typed text. Also, the recognized character string can be sent to the IME for Chinese character conversion, thereby simplifying the Chinese character conversion process.

Next, the outline drafting process that follows the IME Chinese character conversion process is described.

Figure 40:
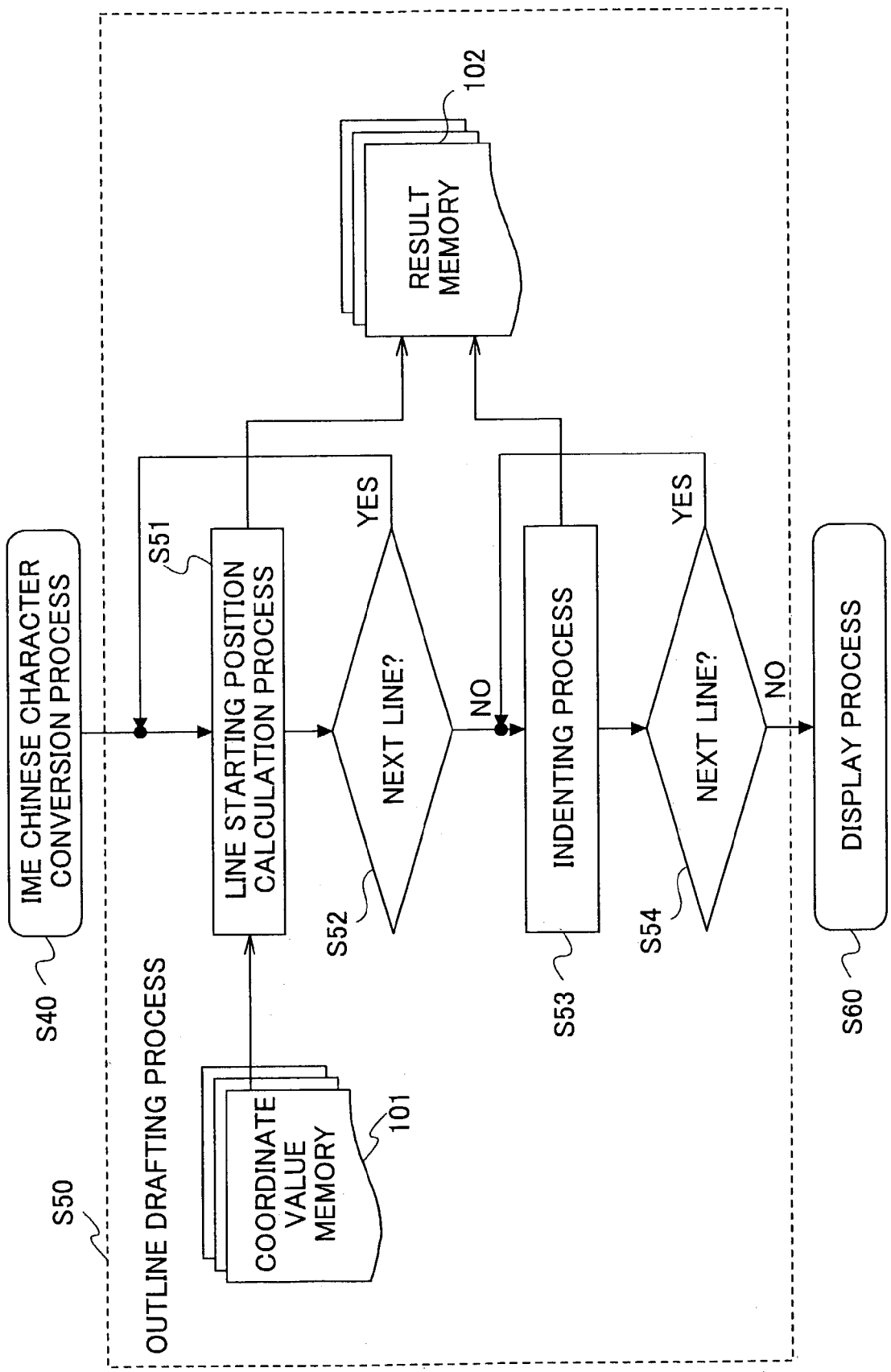
FIG. 40 is a flow chart for illustrating an outline drafting process.

FIG. 40 is a flow chart for illustrating the outline drafting process, which is described in detail below.

First, in a line starting position calculation process, the line starting position is calculated for each line by referring to the coordinate value memory 101 (step S51), and the results are stored to the result memory 102. Then, it is determined in the next step S52 whether or not a next line exists, and if a next line does exist (step S52-Yes), the process goes back to step S51 wherein the line starting position calculation process is performed so as to determine the coordinate value of the starting position of each line. Specifically, by determining in each of the lines the minimum values of the x coordinate and the y coordinate of the coordinates points belonging to a respective line, the top-left coordinates of the line are obtained and this is regarded as the line starting position. When a next line is not found (step S52-No), the process is moved to the next step.

Next, for each of the line starting positions obtained from the above line starting position calculation process, the x coordinate of a line is compared with that of the line above, starting with the line with the smallest y coordinate value. Thus, a process of indenting the lines is performed, the results being stored in the result memory 102 (step S53). The above process is performed according to the order of the y coordinate values of the line, starting with the line with the smallest y coordinate value, because the user will not necessarily input character strings in the order of the y value coordinates. For example, in a case where a first, second, and third line are written and afterwards a fourth line is inserted in between the first and second lines, the appropriate indent position cannot be obtained if the above process is performed in the order, of the line numbers. Also, 'the line above' is referred to as the line having a y coordinate value corresponding to its starting position that is next in order with respect to the y coordinate value of the starting position of the line being processed.

Subsequently, it is determined whether or not a next line exists (step S54), and when a next line to forgo the above indenting process does exist (step S54-Yes), the process goes back to step S53 and the indenting process is repeated. When the next line does not exist (step S54-No), the process moves on to the display process of step S60.

In the following, the line starting position calculation process is described in further detail.

Figure 41:
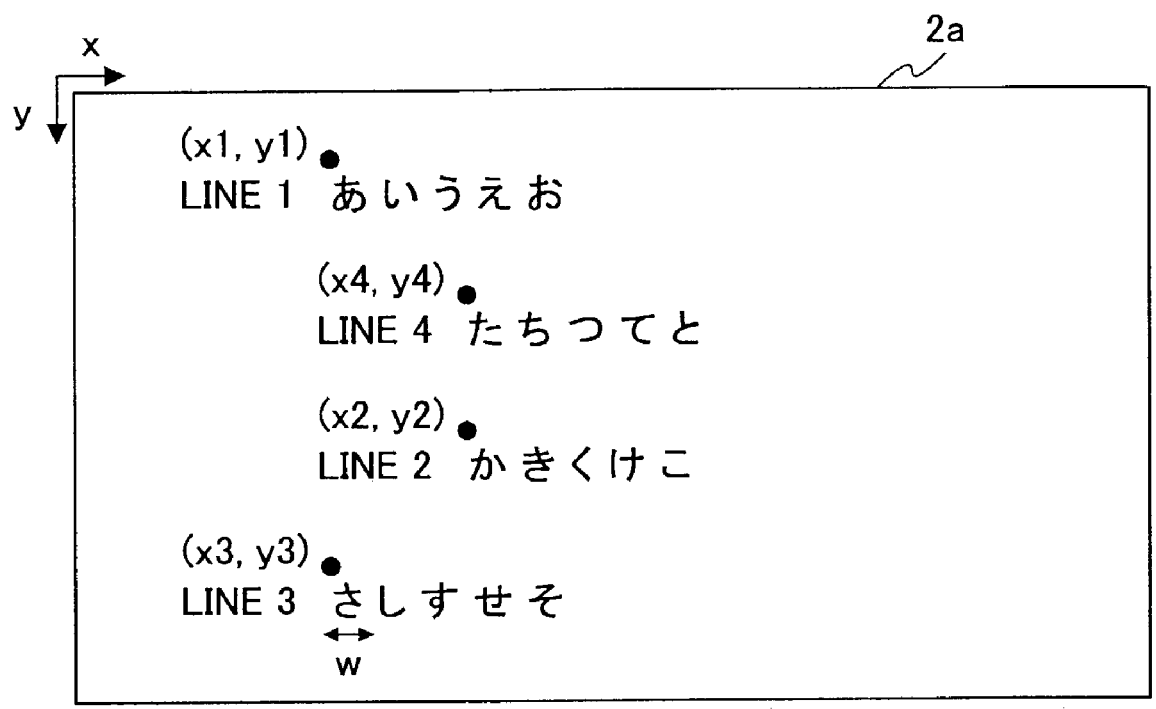
FIG. 41 is a diagram for illustrating a line starting position calculation process.

FIG. 41 is a diagram for illustrating the line starting position calculation process.

For example, in a case where four lines of character strings are written in the handwriting input region 2a, as shown in FIG. 41, the starting positions of the lines are obtained as the coordinate values (x1, x2) for line 1, (x2, y2) for line 2, (x3, y3) for line 3, and (x4, y4) for line 4. These coordinate values are stored as the line starting position in the line information of each line in the result memory 102.

Next, in the following, the indenting process is described in further detail.

FIG. 42 is a diagram for illustrating the indenting process.

The indenting process is a process of setting the line number corresponding to the indent number, the parent line number, and the subordinate line number of each line stored in the result memory 102. There is only one value for the indent number and the parent number, respectively, but the subordinate number may possibly have a plurality of values.

First, the x coordinate value of the line with the character string "かきくけこ" written thereon in the handwriting region 2a is denoted as xp and the x coordinate value of the line above having the character string "あいうえお" written thereon is denoted as xq, and a value S is obtained from subtracting xq from xp.

Figure 42C:
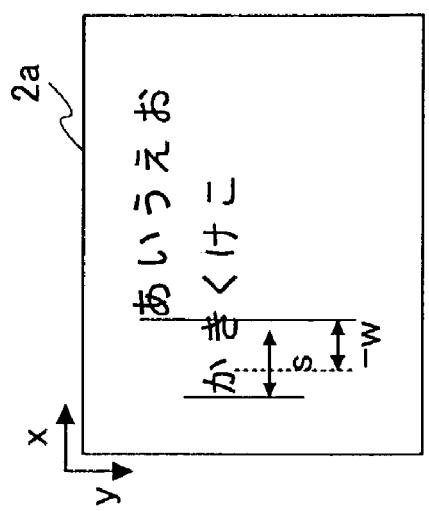
FIGS. 42A–42C are diagrams for illustrating an indenting process.
Figure 42B:
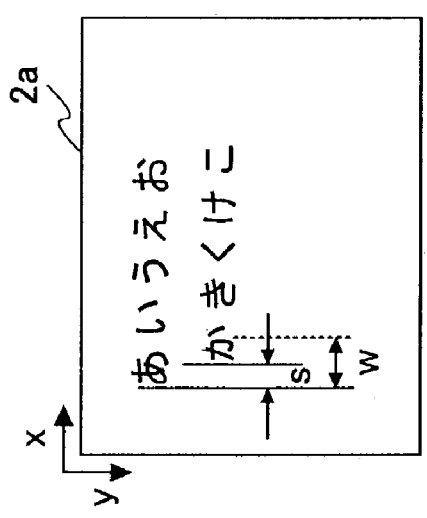
Figure 42A:
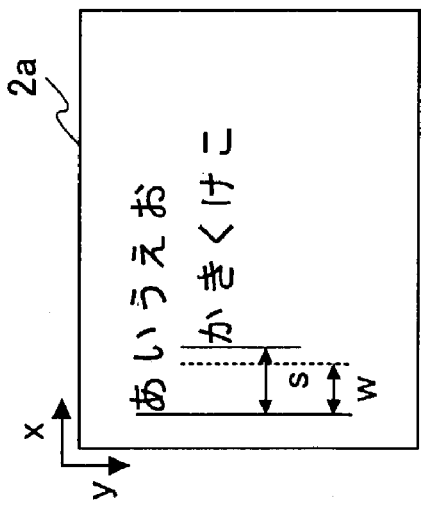

If S is greater than W (i.e. the indent width), as shown in FIG. 42A, then the line above will be the parent line and the line to be processes will be the subordinate line. If S is greater than −W and less than W (−W<S<W), as shown in FIG. 42B, then the line to be processed and the line above are in equivalent positions. If S is less than −W, as shown in FIG. 42C, the parent line number is traced back for the value of a quotient Q obtained from dividing S by −W with respect to the parent line number of the line situated right above. It is noted that herein, W represents the indent width, and this value can be preset by the user.

As a specific example, the indenting process performed on the diagram shown in FIG. 41 is described.

Upon searching for the line with the smallest y coordinate value, line 1 with a y coordinate value of y1 is detected and this becomes the first line to be processed. Since there is no line above line 1, the indent number of this line is set to "0", the parent line number to "0", and no value is set for the subordinate line number. Upon searching for the next smallest y coordinate value, line 4 is detected and this becomes the next line to be processed. Thus, the line above line 4 is line 1. Here, the value S4, obtained by subtracting the x coordinate value x1 of line 1 from the x coordinate value x4 of line 4, is greater than the indent width W. Thereby, line 1 will be the parent line and line 4, the subordinate line. In this process, "4" is added to the subordinate line number item in the line information of line 1; the indent number of line 4 which is the value obtained from adding 1 to the indent number of line 1 is set to "1"; and the parent line number of line 4 is set to "1". Then, upon searching for the next smallest y coordinate value, line two becomes the line to be processed, and line 4 becomes the line above line 2. As in the above description, the value S2=x2−x4 is obtained, and in this case the value of S2 is greater than −W and less than W. Thus, line 4 and line 2 are placed in equivalent indent positions. Therefore, the indent number of line 2 is the same as that of line 4; and the parent line number is also the same as that of line 4, this being "1".

Subsequently, upon searching for the next smallest y coordinate value, line 3 is determined to be the next line to be processed, and the line 2 becomes the line above line 3. Then as in the above process, the value S3=x3−x2 is obtained, and in this case, S3 is less than −W. Thus, line 3 is superordinate in relation to line 2. Since the quotient Q obtained by dividing S3 by −W is "1", the parent line number of line 2 is traced back, for the value of Q, namely, the parent number is traced back to a value one rank higher with respect to that of line 2. In this case, since the parent line number of line 2 is "1", the parent line number of line 1 is referred to, and since the indent number of line 1 is "0" and its parent line number is "0", the indent number of line 3 is set to "0" and its parent line number is also set to "0". Since a next line does not exist, the results obtained from the above-described process are stored in the result memory 102, and then the process moves on to the display process of step S60.

Next, the display process following the outline drafting process is described in further detail.

Figure 43:
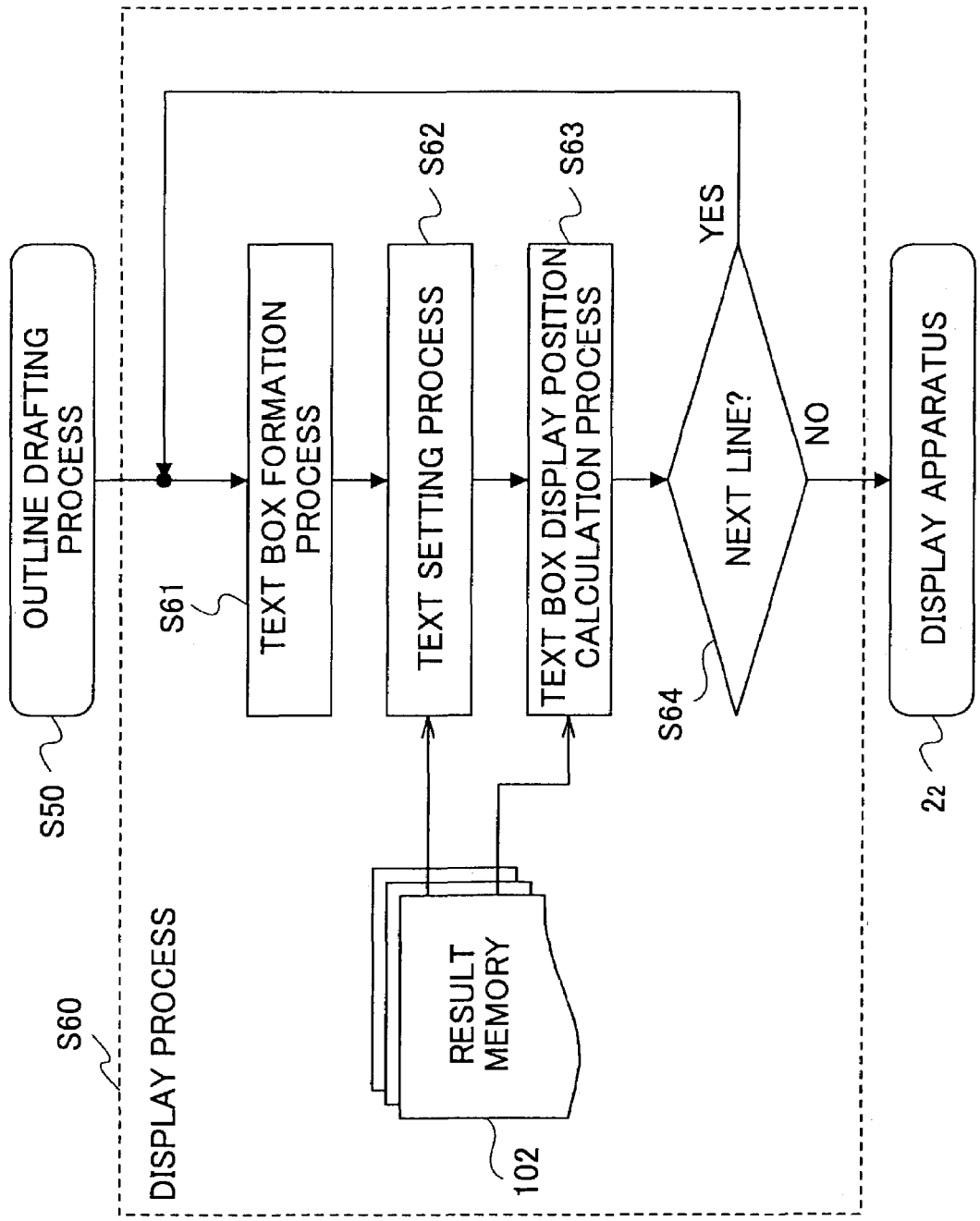
FIG. 43 is a flow chart for illustrating a display process.

FIG. 43 is a flow chart for illustrating the display process.

In the display process of step S60, the data stored in the result memory 102 are displayed on the display apparatus $2_2$.

In this process, first, a textbox is made for each of the lines through a textbox making process (step S61). The textbox can be easily made using programming tools such as Visual C++ or Visual Basic. Then in a text providing process, the recognized character strings stored in the result memory 102 are provided as the text (step S62). Further, in a textbox display position calculation process, the display position of the textbox of line n is set to (W×In, yn), provided that Yn denotes the y coordinate value of the line starting position of line n and In denotes the indent number of line n (step S63).

Next, a determination of whether or not a next line on which the above-described process is to be performed exists is made (step S64), and when there is a next line to be processed (step S64-Yes), the process goes back to step S61 and the above-described process is repeated on all the line information stored in the result memory 102 and the results displayed on the display apparatus $2_2$. When a next line does not exist (step S64-No), the process moves on to the user operation determination process of step S70.

Next, the user operation determination process following the display process is described in further detail.

Figure 44:
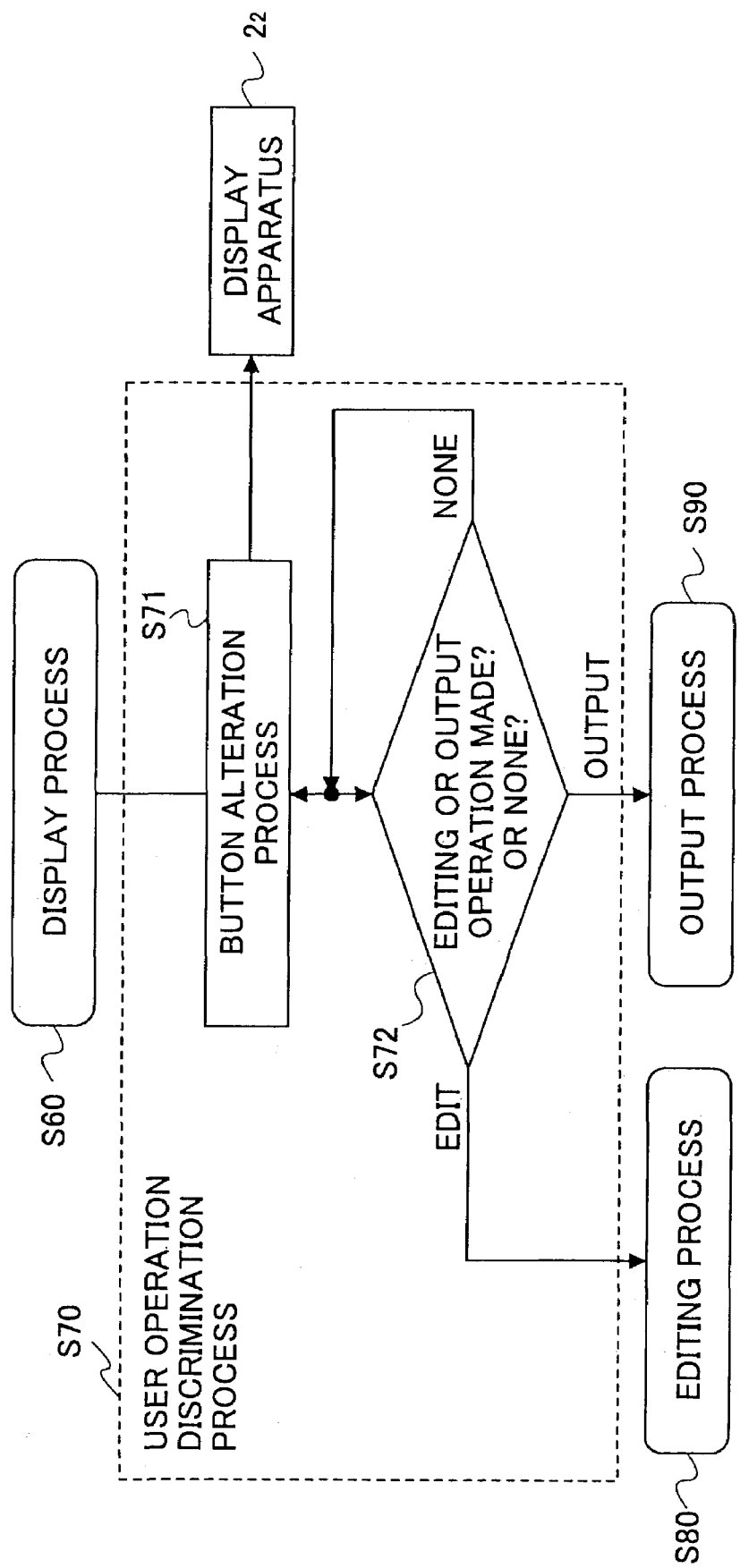
FIG. 44 is a flow chart illustrating the user operation determination process.
Figure 45:
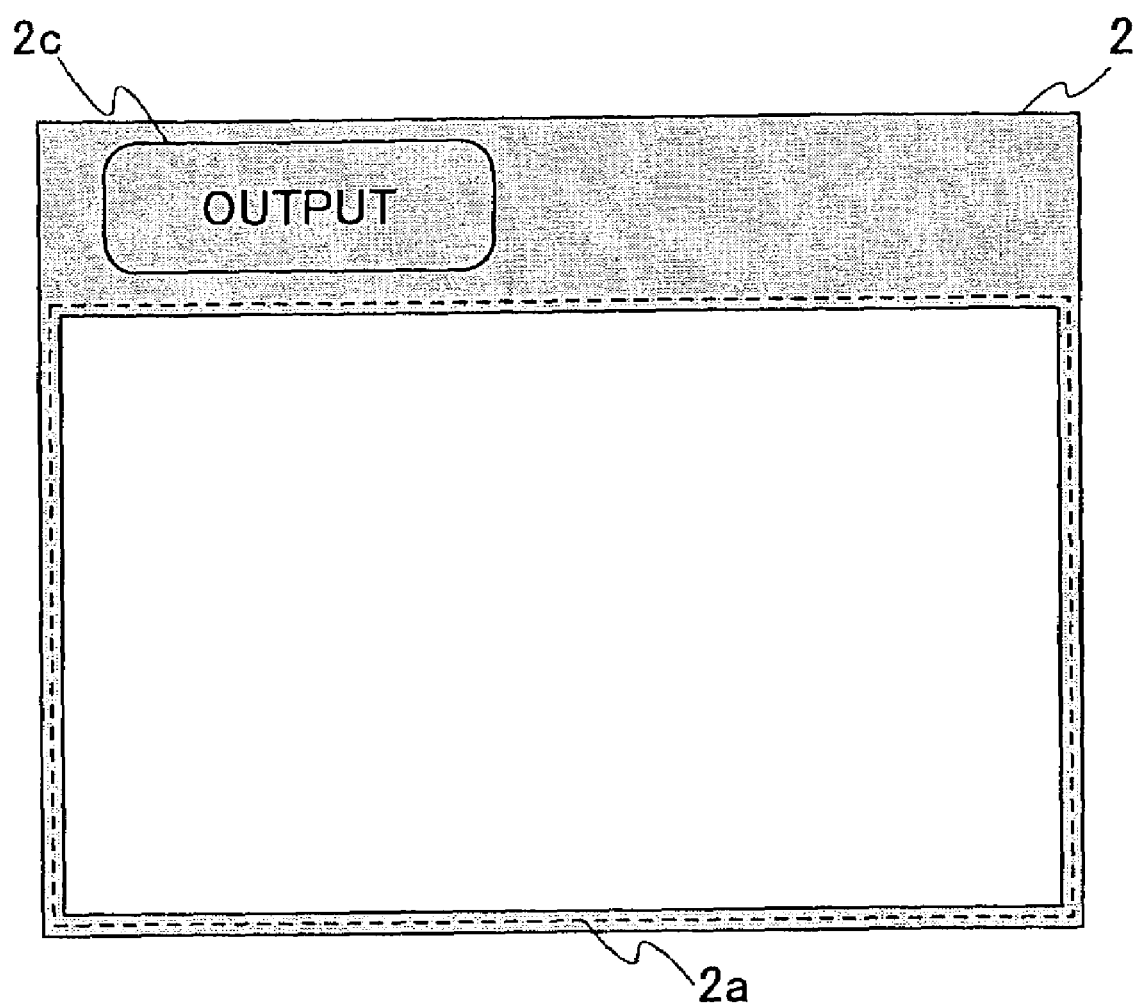
FIG. 45 is a diagram showing a screen display of the handwriting information processing apparatus according to the second embodiment when the user operation determination process is performed.

FIG. 44 is a flow chart illustrating the user operation determination process; and FIG. 45 is an example of the handwriting input screen when the user operation determination process is performed.

As for the user operation, there is the editing process for correcting the outlined information, and the outputting process for storing the obtained information in a storage medium or sending this via e-mail. First, upon the initiation of the user operation determination process, a button alteration process is performed wherein the previously-described "recognition" button 2b of FIG. 31 disappears and an "output" button 2c is displayed, as shown in FIG. 45 (step S71). Then, in step S72, monitoring is performed to see whether the user has input something in the handwriting input region 2a or has pushed the "output" button 2c. In the case where an input has been made in the handwriting input region 2a (step S72-Edit), the process moves on to the editing process of step S80. On the other hand, in a case where the "output" button 2c has been pressed (step S72-Output), the process moves on to the output process of step S90. In this way, the output of the user operation determination process of step S70 can go in two different directions.

Next, the editing process, which is the first one of the output destinations of the user operation determination process is described in further detail below.

Figure 46:
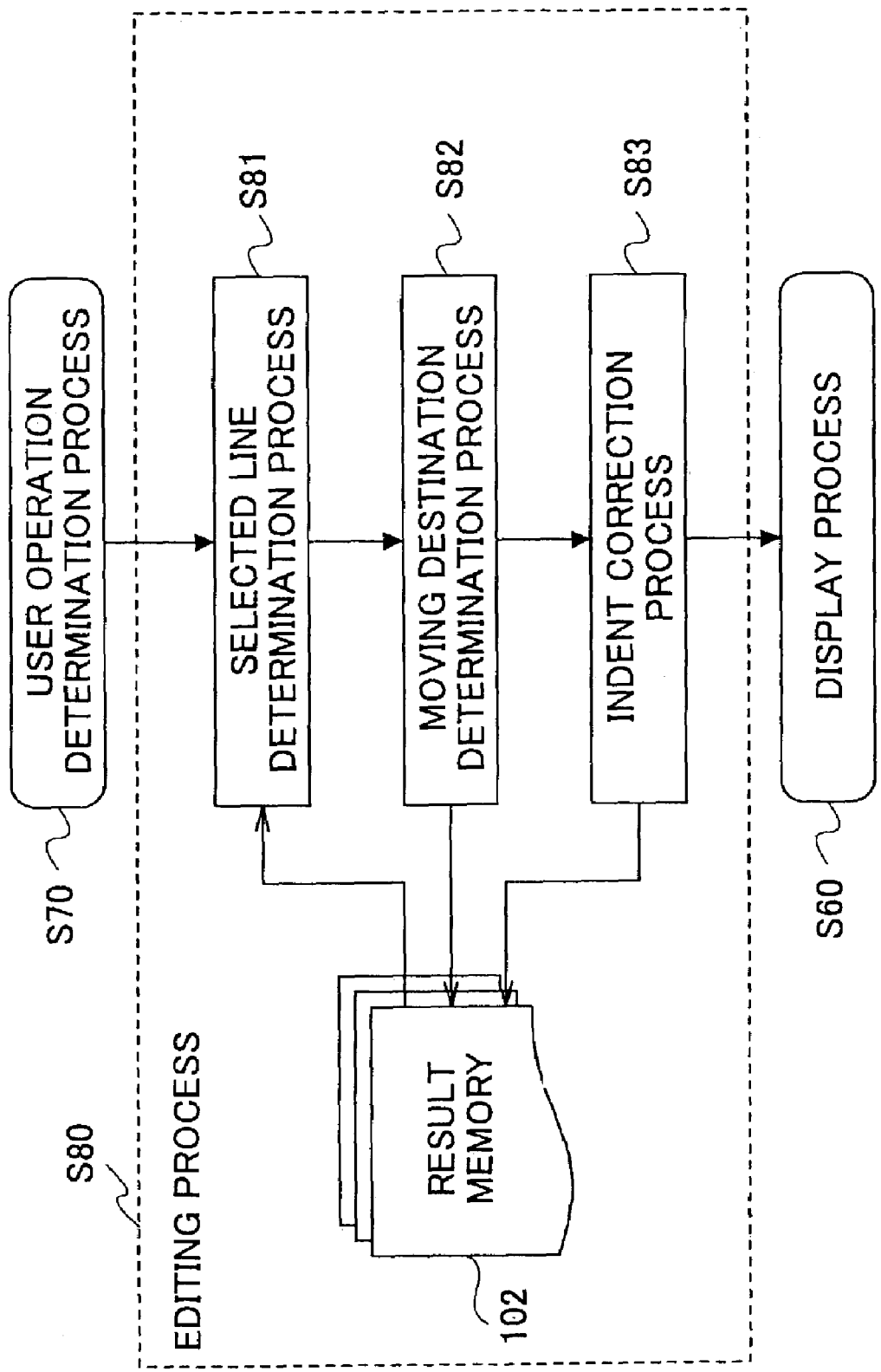
FIG. 46 is a flow chart for illustrating, an editing process.

FIG. 46 is a flow chart for illustrating the editing process.

In the editing process of step S80, the outline information such as the indent position of each of the lines obtained in the outline drafting process is corrected according to the instructions made by the user. In this process, if textboxes are made using a programming tool such as Visual C++ or Visual Basic, the MouseDown, MouseMove, MouseUp messages can be monitored in the textboxes. Each of the textboxes correspond to each of the respective lines stored in the result memory 102, and when a user touches a textbox with the indicating part, a MouseDown message is received and the line that has been selected by the user can be discerned. This in turn enables a selected line determination process of step S81.

Subsequently, thee user moves the indicating part around while still touching the textbox. This is received as a MouseMove message and the amount of movement can be discerned from this action on the user's behalf. Based on the above-obtained movement amount, the displayed position of the textbox can be changed and the user's operation of moving the textbox is realized. Then the user can let go of the textbox at any spot. At this point, the MouseUp message is received, and the moving destination of the textbox is determined, thereby enabling a moving destination determination process (step S82). When the moving destination is determined in the moving destination determination process, the x coordinate value of the gridline (to be described later) and the y coordinate value of the moving destination are written onto the line starting position information of the moved line (the line determined in the selected line determination process) that is stored in the result memory 102 (step S82). Then, an indent correction process is performed at the moving destination, wherein the results are stored in the result memory 102, and the process goes back to the display process of step S60 (step S83).

FIG. 47 is a diagram showing an example of the state of the handwriting input region when the editing process is to be performed.

As described above, in the editing process of step S80, a moving operation of the textbox is performed by the user. Upon this occasion, gridlines indicating the indent width can be provided in the handwriting input region 2a, as shown in FIG. 47, and it can be arranged so that the textboxes can only be moved onto the gridlines. In this way, the textboxes can be precisely moved to the desired indent positions. Here, it is noted that the gridlines can be indicated or hidden depending on the choice of the user.

Figure 48A:
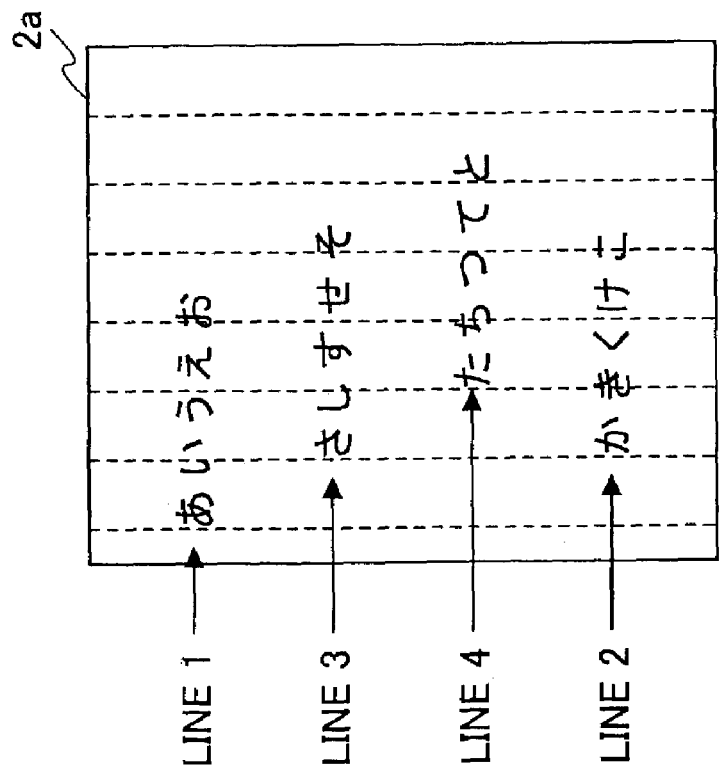
FIGS. 48A and 48B are diagrams illustrating an indent correction process.
Figure 48B:
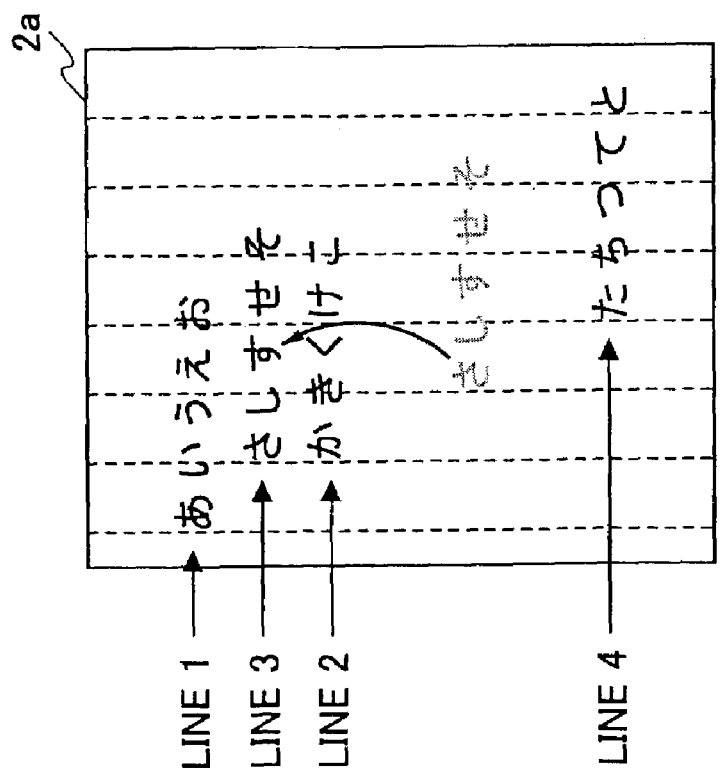

FIGS. 48A and 48B are diagrams illustrating the indent correction process.

In the following, a process of moving the line 3 shown in FIG. 47 to a spot in between line 1 and line 2, as shown in FIG. 48A, is described as an example.

The alteration of the indent number, the parent line number and the subordinate line number in the result memory 102 can be performed in the same manner as that described in the description of the outline drafting process. The line above line 3 is line 1, and since the line 3 is moved to stand under line 1 (subordinate line), "3" is added to the subordinate line number information of line 1, the indent number of line 3 is set to the sum of the indent number of line 1 plus 1, which is "1", and the parent line number of line 3 is set to "1". There are three major differences between this process and the formal outline process. First, in this process, the subordinate line of line 2 needs to be changed with the moving of line 3. This can be realized by referring to the parent line number information of line 3 upon moving the line 3 and eliminating the "3" from the subordinate line number information of line 2 when it is discerned that line 2 is the parent line of line 3. Second, in this process, "4" is included in the subordinate line information of line 3. Thus, when moving the line 3, all the lines that come under the line 3 are moved along with line 3. Thereby, the line starting position information of line 4 stored in the result memory 102 is altered based on the amount of movement in line 3, and the indent number of line 4 is set to the sum of the indent number of line 3 plus 1, which is "2". Further, if line 4 also has subordinate lines, the same process is performed for these lines as well.

Third, in this process, with the moving of line 3 and line 4, the line starting position of line 2 also needs to be changed. The new line starting position of line 2 is obtained by the formula y2=y4+h4+α, wherein y4 denotes the y coordinate value of the line starting position of line 4, h4 denotes the height of the textbox of line 4, y2 denotes the y coordinate value of the line starting position of line 2, and α denotes the distance in between the lines, which is arbitrarily determined by the user. In the case where there are more lines under line 2, the above-described process is repeated for each of these lines as well. Since all the results from the above processes are stored in the result memory 102, the process can then move on to the display process wherein the results can be displayed on the display apparatus $2_2$. As a result of the above-described process, the indent positions of the lines can be corrected as shown in FIG. 48B.

Next, the output process, which is the second one of the output destinations of the user operation determination process, is described in further detail.

Figure 49:
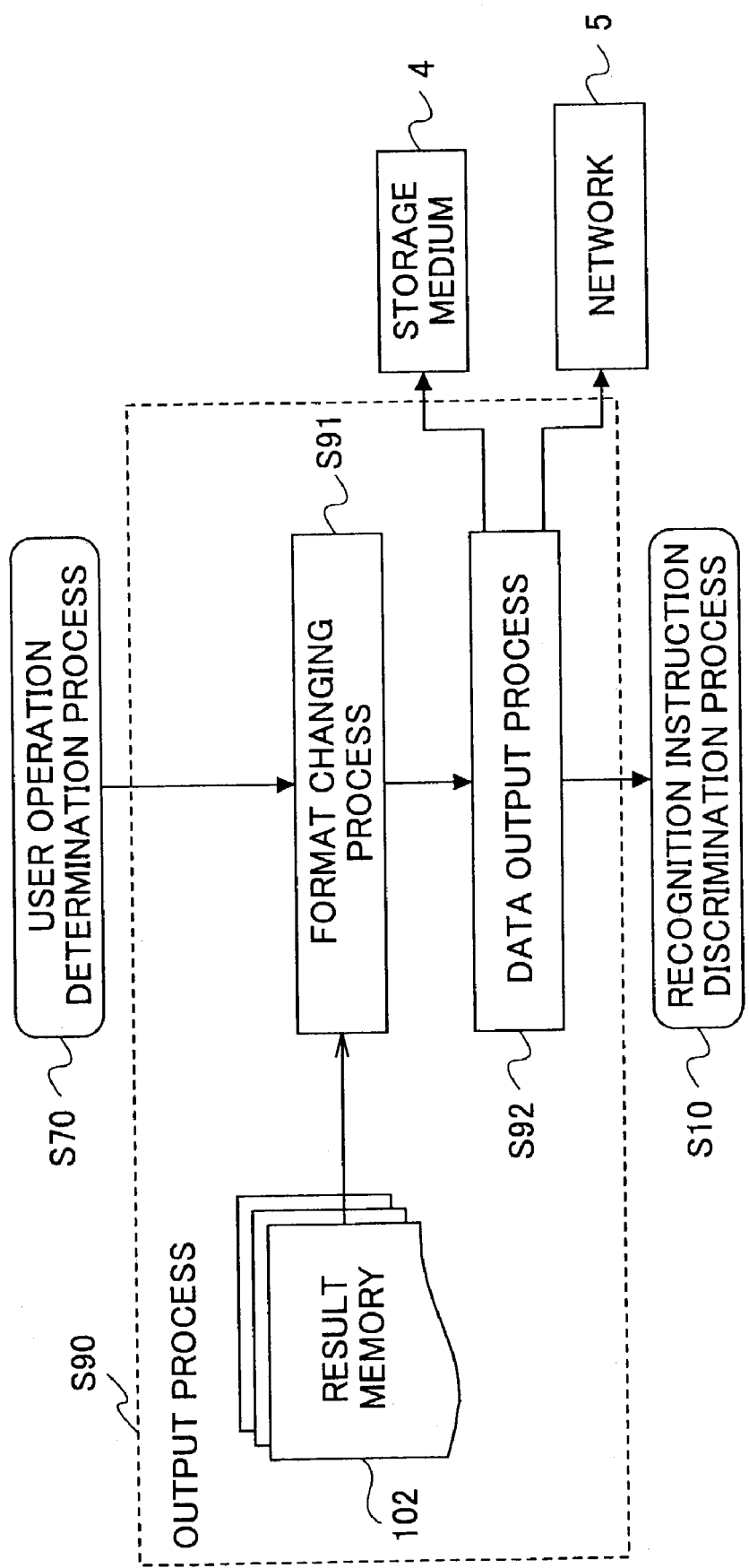
FIG. 49 is a flow chart for illustrating an output process.

FIG. 49 is a flow chart for illustrating the output process.

The output process of step S90 realizes the storing of the recognized character strings and the outline information stored in the result memory 102 into a storage medium such as a hard disk or an optical disk, or the transmission of the above information data to a designated person as an e-mail.

First, as shown in FIG. 49, the information stored in the result memory is converted into text through a format conversion process (step S91). The data in the result memory 102 are called in order from the line data with the line starting position having the smallest y coordinate value and converted into a file format such as html text or TAB text based on the indent number. The user then inputs the necessary information for outputting. The above information would be a file name in the case of storing the data in a storage medium, and an e-mail address and a title in the case of sending the data through a network. The data converted into text in the manner described above are output to a storage medium 4 and a network 5. When the data are output, the process goes back to the recognition instruction discrimination process of step S10 so that handwriting input can be newly performed (step S92). Note that the application used for outputting the data to the network 5 is e-mail software such as Outlook and the like.

According to the above embodiment of the present invention, handwritten information is stored as stroke information and line information and can be batch converted at an arbitrary timing chosen by the user, rather than progressively converting the handwritten characters into type. Also, the indent position can be obtained from the position at which the handwriting information is input so that a formal outline of the character strings can be created, and further, the formal outline may be easily corrected by the user.

Additionally, according to the present embodiment, the above outlined character strings can be stored in a storage medium or sent to someone via e-mail upon entering an e-mail address and a title.

Here, it is noted that the present invention, is not limited to the above-described preferred embodiments, and various changes and modifications are possible without departing from the scope of the present invention. For example, according to the above-described embodiments, the handwriting input/display apparatus 2 and the computer 1 are configured to be two separate components; however, the computer may be implemented within the handwriting input/display apparatus so that the handwriting input/display apparatus itself becomes the actual handwriting information processing apparatus.

Finally, this patent application claims the benefit of the earlier filing date of Japanese Patent Application No. 2002-002946 filed Jan. 10, 2002, and is based on Japanese Patent Application No. 2002-002946 and Japanese Patent Application No. 2001-292620, the entire contents of which are hereby incorporated by reference.

What is claimed is:

1. A handwriting information processing apparatus, comprising:
    a coordinate input part that detects a handwriting input made by a user and outputs a coordinate value;
    a processing part that performs predetermined processes based on said coordinate value output from said coordinate input part; and
    a display part that displays an output of said processing part,
    wherein said processing part comprises:
        a coordinate value storing part that stores all of the coordinate values output by said coordinate input part along with stroke information and line information of said handwriting input;
        a handwritten character recognition part that recognizes handwritten characters in a batch based on the coordinate values, the stroke information, and the line information stored in said coordinate value storing part;
        an outline drafting part that calculates an indent position of each line based on the coordinate values and the line information stored in said coordinate value storing part, obtains outline information of a character string, and drafts an outline;
        a result storing part that stores the character string obtained by said handwritten character recognition part and the outline information obtained by said outline drafting part; and
        an edit processing part that corrects said outline information based on information stored in said result storing part.

2. The handwriting information processing apparatus as claimed in claim 1, wherein said processing part further comprises a Chinese character conversion part that performs a Chinese character conversion by handing a character string obtained by said handwritten character recognition part to an Input Method Editor.

3. The handwriting information processing apparatus as claimed in claim 1, further comprising:
    an outline draft storing part that stores said character string of the drafted outline in a storage medium; and
    an outline draft transmitting part that converts said character string of the drafted outline for e-mail transmission, and sends the converted outline draft to a designated e-mail address.

4. A computer-readable medium storing a computer-readable program, which is read and executed by a central processing unit to perform a handwriting character batch conversion method comprising a coordinate input step of detecting a handwriting input made by a user and outputting a coordinate value, a processing step of performing predetermined processes based on said coordinate value output by said coordinate input step, and a display step of displaying an output from said processing step, wherein said processing step comprises:
    a coordinate value storing step of storing all of the coordinate values output by said coordinate input step along with stroke information and line information of said handwriting input;
    a handwritten character recognition step of recognizing handwritten characters in a batch based on the coordinate values, the stroke information, and the line information stored by said coordinate value storing step;
    an outline drafting step of calculating an indent position of each line based on the coordinate values and the line information stored in said coordinate value storing step, obtaining outline information of a character string, and drafting an outline;
    a result storing step of storing the character string obtained by said handwritten character recognition step and the outline information obtained by said outline drafting step; and
    an edit processing step of correcting said outline information based on information stored by said result storing step.

5. The storage medium as claimed in claim 4, wherein said processing step further comprises a Chinese character conversion step of performing a Chinese character conversion by handing a character string obtained by said handwritten character recognition step to an Input Method Editor.

6. The storage medium as claimed in claim 4, wherein said handwriting character batch conversion method further comprises:

an outline draft storing step of storing said character string of the drafted outline in a storage medium; and an outline draft transmitting step of converting said character string of the drafted outline for e-mail transmission, and sending the converted outline draft to a designated e-mail address.

7. A computer-readable program embodied in a computer-readable medium, which program is executed by a computer to perform a handwriting character batch conversion method comprising a coordinate input step of detecting a handwriting input made by a user and outputting a coordinate value, a processing step of performing predetermined processes based on said coordinate value output by said coordinate input step, and a display step of displaying an output from said processing step, wherein said processing step further comprises:

a coordinate value storing step of storing all of the coordinate values output by said coordinate input step along with stroke information and line information of said handwriting input; and a handwritten character recognition step of recognizing handwritten characters in a batch based on the coordinate values, the stroke information, and the line information stored by said coordinate value storing step;

an outline drafting step of calculating an indent position of each line based on the coordinate values and the line information stored in said coordinate value storing step, obtaining outline information of a character string, and drafting an outline;

a result storing step of storing the character string obtained by said handwritten character recognition step and the outline information obtained by said outline drafting step; and an edit processing step of correcting said outline information based on information stored by said result storing step.

8. The program as claimed in claim 7, wherein said processing step further comprises a Chinese character conversion step of performing a Chinese character conversion by handing a character string obtained by said handwritten character recognition step to an Input Method Editor.

9. The program as claimed in claim 7, wherein said handwriting character batch conversion method further comprises:

an outline draft storing step of storing said character string of the drafted outline in a storage medium; and an outline draft transmitting step of converting said character string of the drafted outline for e-mail transmission, and sending the converted outline draft to a designated e-mail address.

10. A handwriting information processing apparatus, comprising:

a coordinate input part that detects a handwriting input made by a user and outputs a coordinate value;

a processing part that performs predetermined processes based on said coordinate value output from said coordinate input part; and a display part that displays an output of said processing part, wherein said processing part comprises:

a coordinate value storing part that stores all of the coordinate values output by said coordinate input part along with stroke information and line information of said handwriting input;

an outline drafting part that calculates an indent position of each line based on the coordinate values and the line information stored in said coordinate value storing part, obtains outline information of a character string, and drafts an outline;

a result storing part that stores the character string obtained by said handwritten character recognition part and the outline information obtained by said outline drafting part; and an edit processing part that corrects said outline information based on information stored by said result storing part.

* * * * *